United States Patent [19]

Mizuno et al.

[11] Patent Number: 5,406,052
[45] Date of Patent: Apr. 11, 1995

[54] PULSED ARC WELDING EQUIPMENT

[75] Inventors: Masanori Mizuno; Yoshiaki Katou; Osamu Nagano, all of Aichi; Yoichiro Tabata, Hyogo; Shigeo Ueguri, Hyogo; Yoshihiro Ueda, Hyogo, all of Japan

[73] Assignee: Mitsubishi Denki Kabushiki Kaisha, Tokyo, Japan

[21] Appl. No.: 602,232

[22] PCT Filed: Feb. 27, 1990

[86] PCT No.: PCT/JP90/00244

§ 371 Date: Oct. 26, 1990

§ 102(e) Date: Oct. 26, 1990

[87] PCT Pub. No.: WO90/09856

PCT Pub. Date: Sep. 7, 1990

[30] Foreign Application Priority Data

Feb. 28, 1989 [JP] Japan .................................. 1-46803
Feb. 28, 1989 [JP] Japan .................................. 1-46804
Jun. 20, 1989 [JP] Japan .................................. 1-157415
Jun. 20, 1989 [JP] Japan .................................. 1-157416
Jun. 20, 1989 [JP] Japan .................................. 1-157417
Jun. 20, 1989 [JP] Japan .................................. 1-157418
Jun. 20, 1989 [JP] Japan .................................. 1-157419

[51] Int. Cl.⁶ .................................................. B23K 9/09
[52] U.S. Cl. ................................................ 219/130.51
[58] Field of Search .................. 219/130.51, 137 PS, 219/130.51

[56] References Cited

U.S. PATENT DOCUMENTS

| 4,438,317 | 3/1984 | Ueguri et al. |
|---|---|---|
| 4,485,293 | 11/1984 | Tabata et al. ................. 219/130.51 |
| 4,497,997 | 2/1985 | Bodewig ...................... 219/130.51 |
| 4,546,234 | 10/1985 | Ogasawara et al. ........... 219/130.51 |
| 4,553,018 | 11/1985 | Kondo et al. .................. 219/130.51 |

FOREIGN PATENT DOCUMENTS 61-54512 11/1986 Japan .
61-266180 11/1986 Japan .
62-45025 9/1987 Japan .
63-48633 9/1988 Japan .
63-56029 11/1988 Japan .
64-02477 1/1989 Japan .
64-10315 2/1989 Japan .
1-254385 10/1989 Japan .

OTHER PUBLICATIONS

Welding Journal, Aug. 1985, *Study of Metal Transfer in Pulsed GMA Welding*, by S. Ueguri, K. Hara and H. Komura, pp. 242-s through 250-s.

*Primary Examiner*—Clifford C. Shaw
*Attorney, Agent, or Firm*—Sughrue, Mion, Zinn, Macpeak & Seas; Richard C. Turner

[57] ABSTRACT

The welding equipment according to the present invention divides the pulsed electric current fed to a base metal in the course of a welding process into a plural number of pulse groups, performing instantaneous control over the base electric current period and the base electric current value applied to each of the pulse intervals of the individual pulses within such a group of pulsed electric currents and to each of the groups of pulsed electric currents, the pulse peak value and pulse width of each pulse, and such instantaneous control over a short circuit period and an arc period in the course of performance of the short circuiting transfer arc welding process, in accordance with the detected arc length, in such a manner that an ideal target arc length is thereby achieved. The welding equipment is capable of achieving the separation and transfer of molten globules to the base metal with regularity and also reducing the fluctuations in the short circuit period and the arc period in the short circuiting transfer arc welding process, offering the advantage that the equipment can control the growth and separation of molten globules without being affected by the phenomenon of magnetic arc blow of the arc and can achieve improvements on the quality of weldments even if fluctuations should occur in the shape of welded joints and in the position of the earthing point in operation with the actual arc.

44 Claims, 53 Drawing Sheets

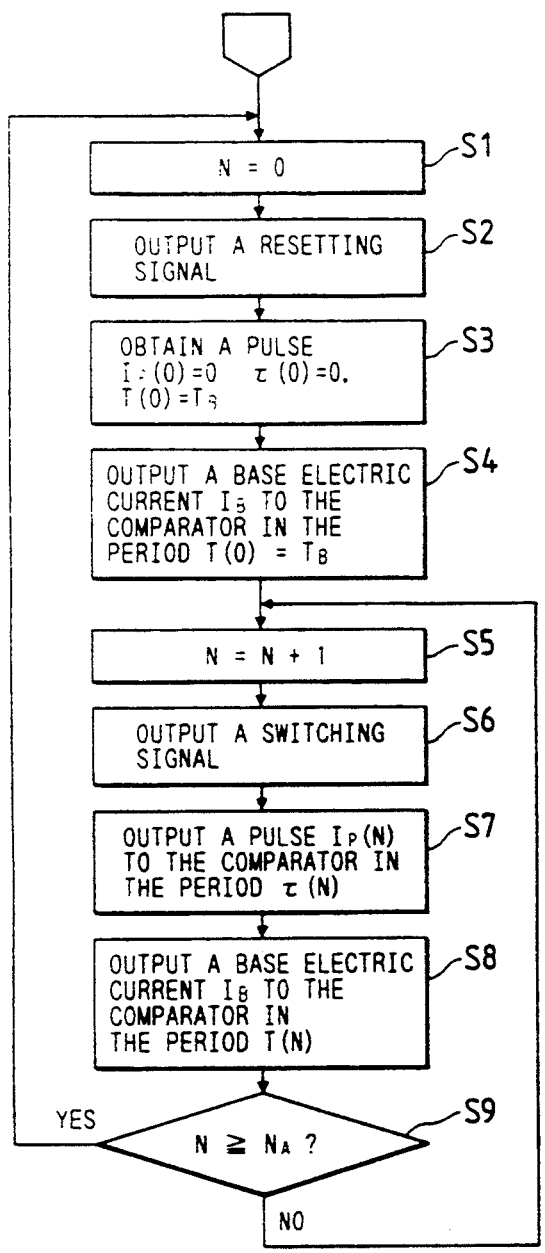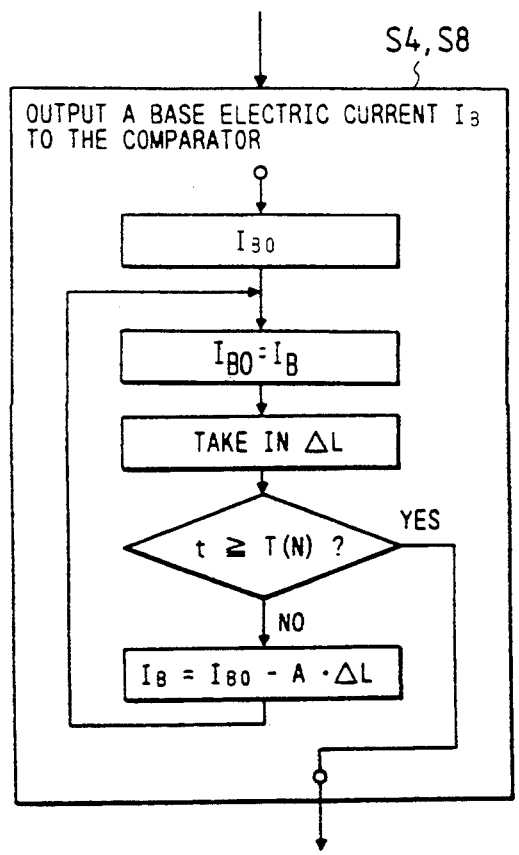

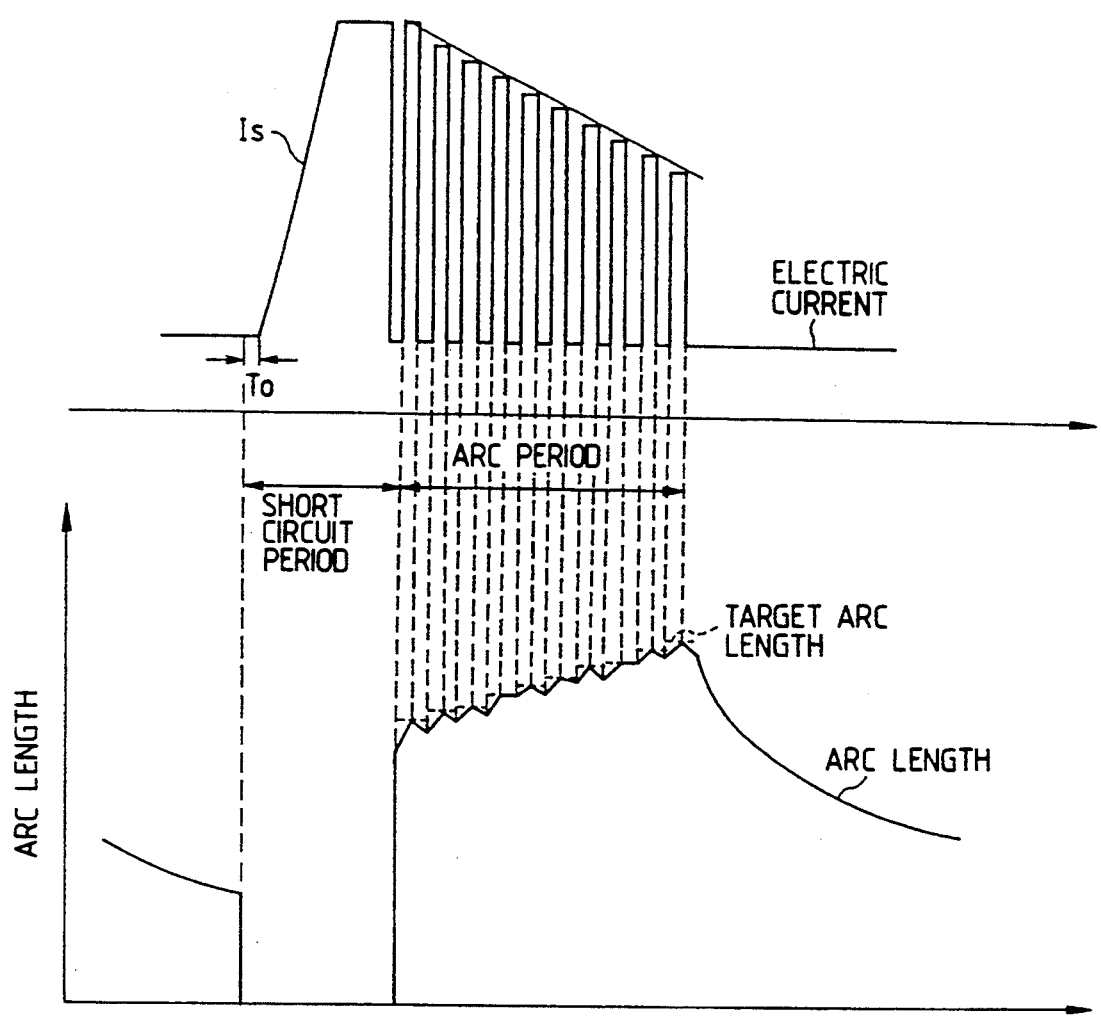

OUTPUT FROM THE ARC LENGTH DETECTING DEVICE (84)

VALUE SET IN THE ELECTRIC VOLTAGE SETTING DEVICE (9)

INSENSITIVE PERIOD T

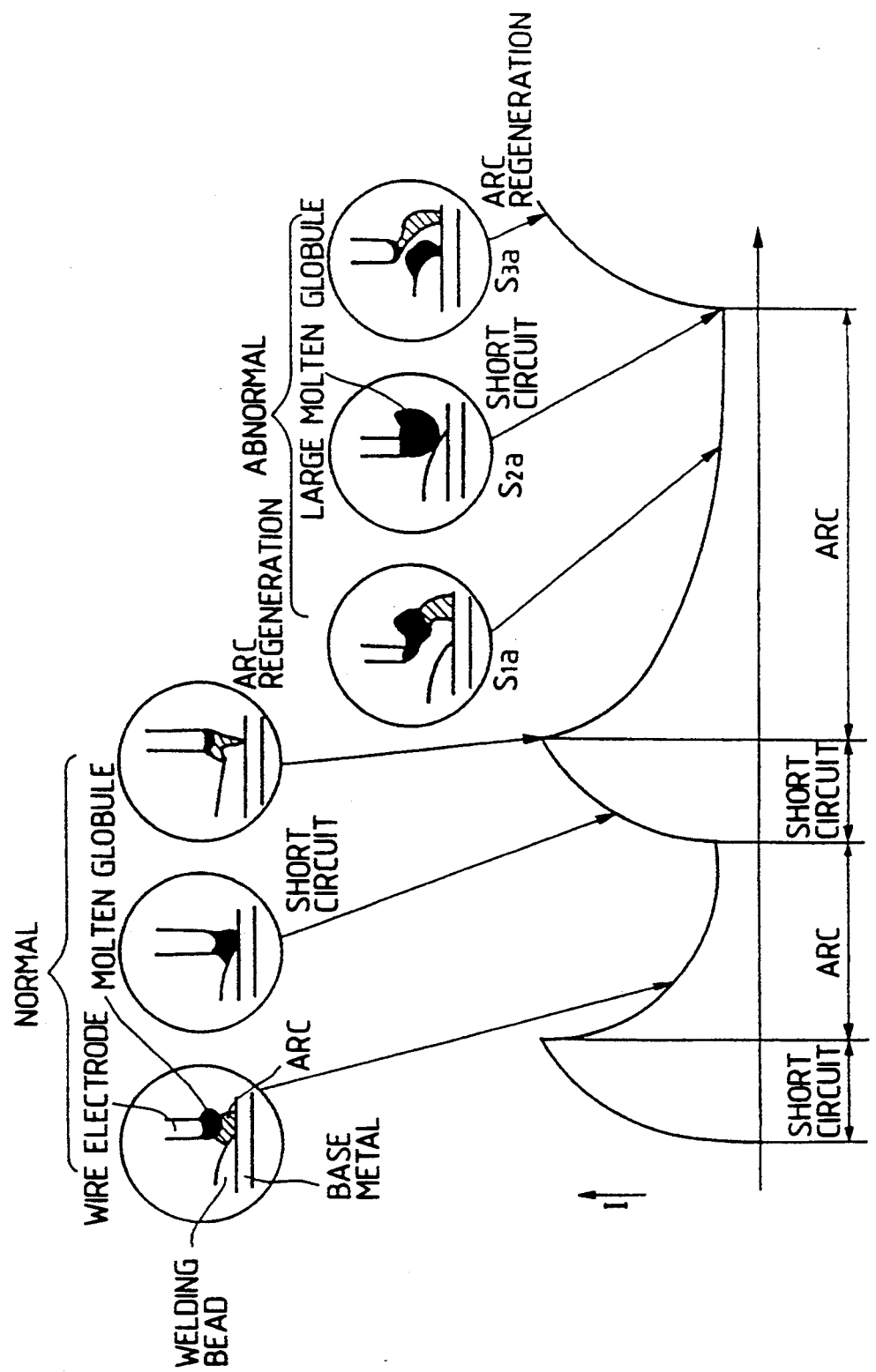

PULSED ARC WELDING EQUIPMENT

TECHNICAL FIELD

The present invention relates to a pulsed arc welding system and more particularly, to pulsed arc welding system designed to achieve regularity and controllability during the fusion and separation of an electrical discharge electrode, so that high-quality welding performance is attained.

BACKGROUND ART

One example of the related prior art is found in the pulsed arc welding system disclosed in Japanese Patent Application Laid Open No. 19177-1982 and another such example is found in the short circuiting transfer arc welding system disclosed in Japanese Patent No. 54585-1987.

The pulsed arc welding system in Japanese Patent Application Laid Open No. 19177-1982 performs a welding process by executing the following procedures. First, the system generates a pulsed arc electric current between a consumable welding wire electrode (hereinafter simply referred to as the "wire electrode") and the base metal. Then the system fuses the base metal and the wire electrode by applying the heat generated by a pulsed arc of electric current. Next, the system cuts off the tip of the molten wire electrode by applying the electromagnetic pinching force of such a pulsed arc electric current to the tip of the wire electrode. Finally, the system intermittently transfers molten globules of the wire electrode to the base metal (this transfer is called "spraying transfer". The advantage of this system are as follows. First, the system is capable of performing a welding process with a pulsed electric current in an area where this welding has an average electric current lower than that of a direct current arc welding system. Second, the system can perform the welding process to a thinner base metal. Third, the system can attain the spraying transfer thereby eliminating the spatter which would otherwise occur in the course of welding.

Also, the short circuiting transfer arc welding system disclosed in Japanese Patent No. 54585 performs a similar welding process. The welding system periodically generates an arc of electric current between the wire electrode and the base metal. The heat generated by this arc of electric current melts, the base metal and the wire electrode. Subsequently, the welding system transfers the molten globule formed on the tip of the wire electrode to the base metal by a short circuiting transfer. Consequently, this system is capable of securing a stable welding state by periodically generating an arc of electrical current, and then transferring the molten globule by short circuit transfer.

However, in order to achieve high-quality welding by the pulsed arc welding process, it is necessary to eliminate the spatter which tends to occur in the molten globule during the welding process. In addition, it is necessary to prevent the occurrence of undercuts (i.e., defects in the shape of the welding beads) and to form separated molten globules which are approximately identical size.

In order to eliminate the spatter, it is necessary to prevent the wire electrode and the base metal from touching each other (i.e., short circuiting). In order to prevent the occurrence of undercuts, it is necessary to shorten the arc length. Both of these requirements can be satisfied if the molten globules are formed into fine particles when they are separated from the wire electrode during the spraying transfer. Moreover, in order to create separated molten globules that are substantially the same size, the same pulse form should be repeated periodically in the waveform of the pulsed arc electric current.

The operation of conventional pulsed arc welding systems are shown in FIG. 54. In FIG. 54, $\tau$ expresses the pulse width, $I_B$ expresses the base electric current, and $I_f$ represents the pulsed peak electric current.

FIG. 54($a$) illustrates the operation of a conventional welding system in an atmosphere comprising 100 percent $CO_2$ gas. In this atmosphere, the width $\tau$ of the pulsed arc is narrow in relation to the molten globule on the wire electrode. FIG. 54($b$) illustrates the operation of a conventional welding system in an atmosphere comprising argon gas and 20 percent $CO_2$ gas. In this atmosphere, the width $\tau$ of the pulsed arc is relatively wide in relation to the molten globule on the wire electrode. The welding systems illustrated in FIG. 54($a$) and FIG. 54($b$) cannot perform high quality welding. In the welding system shown in FIG. 54($b$), the base electric current $I_B$ is set at a high level and the pulse width $\tau$ is narrow. Consequently, the molten globule at the tip of the wire electrode cannot be separated until the molten globule changes from its shape in the state $P_0$ into its shape in the state $P_{a1}$ and further into a large-sized lump shown in the state $P_{a2}$.

In the welding system shown in FIG. 54($b$), the base electric current $I_B$ is set at a low level and the pulse width $\tau$ is wide. Consequently, the pulsed electric current exerts an electromagnetic force F in the upward direction, the molten globule on the tip of the wire electrode changes from the shape in state $P_0$ into the shape in state $P_b$ in other work, the shape of the molten globule constricts and the molten globule is elevated and begins to rotate at a high velocity. As a result of this elevation, two consequences may occur. First, the rotating molten globule may separate from the wire electrode and scattered as spatter over areas other than the base metal as shown in state. Second, the molten globule may stick again to the wire electrode as in the state $Pb_2$.

Other disadvantages of the conventional pulsed arc welding equipment occur depending on the value of the pulsed peak electric current $I_P$. When the value of the pulsed peak electric current $I_P$ is set at a low level, the molten globule formed at the tip of the wire electrode is only slightly lifted up by the pulses, so that the molten globule cannot be separated until it grows into a large-sized drop. Consequently, the growth of the molten globule formed on the tip of the wire electrode into a large-sized drop results in the formation of a short circuit between the molten globule and the base metal. As a result, a lot of spatter is scattered in the area around the weldment during the welding process or (i.e. is a defect in the welding beads) is formed. On the other hand, setting the value of the pulsed peak electric current $I_P$ at a high level will require an increased capacity of the power source unit for the welding equipment. This requirement increases the weight and cost of the welding equipment.

In an attempt to overcome these disadvantages, the present inventors filed, prior to the present invention, applications for patents, No. 309388-1987 and No. 265083-1988, as published in Japanese Patent Laid Open No. 254385-1989. These applications taught a pulsed arc welding system which produces fine particles of molten globules during the process of transferring them to the base metal. Also, the welding system performs the transfer of the molten globules in an orderly manner by moderating the force that lifts up the molten globule formed on the tip of a wire electrode. The welding system moderates the force by dividing one pulsed electric waveform into a plurality of groups formed of pulsed electric currents (i.e. pulse groups). These pulsed electric currents as wide as one or more pulse widths are arranged in one or more types of pulse intervals. These pulse groups are repeated in every period, and a discharge electric current waveform is obtained by duplicating a continuous base electric current over such pulse groups.

However, in the event the arc welding is performed as the wire electrode is being moved in a constant direction over the base metal, the magnetic field which is formed in the welding space of this pulsed arc welding system has a different distribution which depends on the paths of the electric current flowing from the welding torch to the arc and from the arc to the base metal. In other words, the distribution of the magnetic field in the welding space will be different from one case to another, depending on the differences in the shape of welded joints and the differences in the ground points. The electromagnetic force is exerted on the arc, depending on the distribution of the magnetic field and the direction of the arc current, and causes a magnetic arc blow. A magnetic arc blow is a phenomenon in which the magnetic force makes the arc lean in relation to the base metal.

A magnetic arc blow makes it utterly impossible to perform any welding work in a favorable condition. One reason is that it becomes difficult to perform any regular separation of molten globules due to an extension which takes place in the length of the arc as the molten globule is lifted up by the deflecting arc. This problem is shown in (A-1) through (C-1) and (A-3) through (C-3) in the illustrations of the individual processes for the separation of the molten globule presented in FIG. 55. As a result of the extension of the arc the separated molten globule is flung into the area outside the welding beads.

Also, the short circuiting transfer arc welding system will similarly have a disturbance in the period for the repetition of the short circuiting and the arcing. This is due to a change in the timing of the short circuiting of the molten globule when the molten globule is formed and growing on the tip of the wire electrode. As shown in $S_{1a}$ through $S_{3a}$ in FIG. 56, the growing molten globule is pushed upward by a deflection of the arc by a magnetic arc blow. As the result of such a disturbance, there are problems such as the formation of irregularities on the welding beads, fluctuations in the depth of weld penetration, and a resultant failure in securing sufficient strength in the weld.

The present invention has been designed to overcome the various problems described above, and it is an object of the present invention to offer a pulsed arc welding system which is capable of performing arc welding in a reliable manner by preventing irregular growth in the molten globule due to factors such as the phenomenon known as magnetic arc blow and external disturbances and also by securing the regular transfer of the molten globule in the direction of the welding beads.

SUMMARY OF THE INVENTION

According to the first embodiment of the invention, the pulsed arc welding system comprises a pulse group waveform setting device and a pulse width setting device in which the individual pulse peak values and the pulse widths are predetermined for groups of pulsed electric currents having one or more pulse width and pulse peak values; a detected arc length signal which detects a signal corresponding to the arc length between the tip of the molten globule and the base metal; a target arc length setting device which contains the target arc length signals which are set according with the groups of pulsed electric currents; a pulse output control circuit which outputs the pulse starting signal for the next pulse to be generated when the detected arc length signal mentioned above has attained the length specified in the target arc length signal as found through a comparison of the detected arc length signal with the target arc length signal; and a pulsed electric current waveform shaping device which controls the periods of the base electric currents which are transmitted for each of the pulse intervals of the individual pulses and for each of the intervals of the individual groups of pulsed electric currents, by sending switching signals to the pulse group waveform setting device, the pulse width setting device, and the target arc length setting device, thereby renewing the contents stored in the respective memories. The switching signal, are transmitted after the output of a discharge electric current, which is formed of pulses having a pulse peak value and a pulse width set upon the reception of the input of the predetermined values receives from the pulse group waveform setting device and the pulse width setting device, as well as the base electric current, and outputting the discharge electric current which consists of pulses having the renewed pulse peak value and the renewed pulse width value, together with the base electric current, according to the input of the pulse starting signal. The pulsed arc welding system of the present invention performs the separation and transfer of the molten globule in an orderly manner to the base metal through elimination of any extreme lift-up of the molten globule by determining, on the basis of the arc length, the state of the molten globule as lifted up by the electromagnetic force in the pulse period and by applying the next pulse while performing control for varying the base electric current period (i.e., the length of the arc) in proportion to the detected arc length, in such a manner so as to restore the lifted molten globule to the original target arc length.

The pulsed arc welding equipment according to the second of the invention comprises: a pulse group waveform setting device and a pulse width setting device in which the individual pulse peak values and the pulse width values are predetermined for groups of pulsed electric currents having one or more pulse width and pulse peak values; a pulse interval setting device in which pulse intervals are predetermined; an arc length detecting device which detects the signal corresponding to the arc length between the tip of the wire electrode and the base metal; a target arc length setting device in which the target arc length signals are predetermined according to the groups of pulsed electric currents; a differential signal output device which determines the differential output between the detected arc length signal and the target arc length signal mentioned above; and a pulsed electric current waveform shaping device which sends switching signals to the pulse group waveform setting device, the pulse width setting device, the pulse interval setting device, and the target arc length setting device, thereby renewing the contents stored in their memories, after the output of a discharge electric current which is formed of pulses having a pulse peak value and a pulse width value that depends on the input of the values predetermined received from the pulse group waveform setting device, the pulse width setting device, and the pulse interval setting device, as well as the base electric current which is transmitted for each of the individual pulse intervals and for each of the periods of the individual groups of pulsed electric currents, then yields the discharge electric current which is formed of a pulse having the renewed pulse peak value and the renewed pulse width, and additionally controls the base electric current in the prescribed pulse intervals, according to the differential output from the differential signal output device, after the pulses are transmitted. This pulsed arc welding system, which controls the individual pulse intervals of the groups of pulsed electric currents and the value of the base electric current that is transmitted for every pulse interval of each group of pulsed electric currents according to the differential output from the differential signal output device, determines the state of the molten globule that is being lifted up by the electromagnetic force in the pulse on the basis of the arc length and controls the next pulse it applies by varying the value of the base electric current in the prescribed base electric current period (i.e. the pulse interval) in accordance with the detected arc length and the target arc length in such a manner that the molten globule in the lifted state will be restored to its original target arc length. Consequently, the welding system restores the molten globule lifted during pulse period to its original proper state good response and, therefore, enables the proper separation and transfer of the molten globule to the base metal.

Moreover, the pulsed arc welding equipment according to the third embodiment of the invention has a new construction in the sense that it comprises the differential signal output device according to the second embodiment of the invention as well as the elements contained in the first embodiment of the invention. Therefore, the welding system comprises an apparatus for the variable control of the pulse intervals (i.e. the base electric current periods) according to the detected arc length and an apparatus for the variable control of the base electric. The pulsed electric current waveform shaping device of this welding system controls the pulse intervals (i.e. the base electric current periods) of the output of the pulsed electric current on the basis of a pulse starting signal generated by the pulse output control circuit and on the basis of comparison of the detected arc length signal and the target arc length signal. The welding system's control of the value of the base electric current also depends on the differential output signal generated from the differential signal output device. The differential input signal depends on the comparison of the detected arc length signal with the target arc length signal. Thus, this pulsed arc welding system determines the state of the molten globule lifted up by the electromagnetic force in the pulse period by the arc length, controls the lifted molten globule in such a way as to restore it to its original target arc length, and applies the next pulse after checking the original state of the molten globule. Consequently, the welding system is able to achieve the separation and transfer of the molten globule to the base metal in a more regular manner by welding in an arc length base on the target arc length.

Furthermore, the pulsed arc welding system according to the fourth embodiment of the invention further comprises a separation detecting device, which generates a separating signal upon the separation of the molten globule on the basis of the arc length value detected by the arc length detecting device, and a correcting circuit, which generates and outputs a new target arc length signal. The new target arc length signal is generated by adding a correcting signal to the target arc length signal that is outputted from the target arc length setting device during the pulse group feeding period on the groups of pulsed electric currents and after the detection of the separation of the molten globule by the separation detecting device. The fourth embodiment is formed by adding these two devices to a welding system according to the first embodiment of the invention. In this embodiment, the pulsed electric current waveform shaping device is designed to transmit switching signals, in synchronization with the pulse starting to the pulse group waveform setting device, the pulse width setting device, and the target arc length setting device at the time when the pulsed electric current is transmitted. As a result the peak value, the pulse width, and the target arc length are renewed in such a manner that the renewed values will be suitable for the next pulsed electric current. This pulsed electric current waveform shaping device controls the period of the base electric current to be fed for every pulse interval of each pulse and for every interval of the groups of pulsed electric currents on the basis of the input of the pulse starting signal. In addition to the results achieved by the first embodiment, the pulsed arc welding system according to the fourth embodiment, further improves the welding results because the fluctuations of the time of the separation, which can be canceled out, will occur only when an external disturbance occurs as the target arc length signal of the groups of pulsed electric current pulses after the separation of the molten globule. However, the next instance that the time of the separation has small fluctuations, the system will compensate for the fluctuations since the system is designed to change the target arc length signal value. The system check for time of the separation of the molten globule by comparing fluctuations of the value of the signal from the arc length detecting device with the value obtained by the addition of a predetermined correcting signal value to the value of the target arc length signal. This comparison occurs when the system detects the separation of the molten globule. Therefore, the system can detect fluctuations even if fluctuations occur in the separation of the molten globule because of factors such as the position of the welding torch and a deformation in the shape of the base metal.

Moreover, the pulsed arc welding equipment according to the fifth embodiment comprises: a pulse group waveform setting device and a pulse interval setting device, in which the individual pulse peak values and the pulse interval values are predetermined for the groups of pulsed electric currents having one or more pulse width values and pulse peak values; an arc length detecting device, which detects a signal corresponding to the arc length between the tip of the wire electrode and the base metal; a target arc length setting device in which the target arc length signals are predetermined according to the groups of pulsed electric currents; a pulse width control circuit, which outputs a pulse terminating signal, which terminates the pulse sent out when it compares the detected arc length signal with the target arc length signal determines that the detected arc length signal has attained the length indicated by the target arc length signal; and a pulsed electric current waveform shaping device, which controls the pulse width of each pulse by transmitting switching signals to the pulse group waveform setting device, the pulse interval setting device, and the target arc length setting device, thereby renewing the contents in the memories of each device. The switching signals are transmitted after the output of a discharge electric current, which is formed of pulses that have a pulse peak value that depend on the input pulse terminating signal from the pulse group waveform setting device and the pulse interval setting device and a base electric current, which is transmitted during the period of the set pulse interval. The pulse width of each pulse is controlled by transmitting and terminating the pulses having the renewed peak value on the basis of the input of the pulse terminating signal. This pulsed arc welding system controls the pulse width of the output pulse by using the pulse terminating signal when the detected arc length value has attained the target arc length. The welding system controls the pulse width by setting a target arc length signal at a maximum distance to which the molten globule is lifted up in the pulse period, determining the lift of the molten globule by the electromagnetic force in the pulse period on the basis of the detected arc length signal corresponding to the arc length and by conducting the base electric current, by bringing the pulse to a stop when the detected arc maximum distance signal attains a length equivalent to that indicated by the target arc length signal. Therefore, the welding system is capable of preventing the molten globule from being lifted up in an irregular manner by the pulses and, as the result of this capability, can achieve the regular proper separation and transfer of the molten globule to the base metal.

Furthermore, the pulsed arc welding equipment according to a sixth embodiment further comprises a short circuit device and arc determining device which determine the short circuit period and the arc period according to the detected arc length signal generated by the arc length detecting device, a short circuiting electric current waveform setting device, which causes the short circuiting electric current to flow in the short circuit period on the basis of the short circuit determining signal, and an inverter, which generates an arc determining signal by the inversion of the short circuit determining signal. These devices constitute new parts in the construction of this pulse welding system. This welding system furnishes a pulsed arc electric current to the side of the power source when an arc determining signal is generated from the short circuit device and the arc determining device. This arc determining signal is generated when the electric voltage detected by the electric voltage detecting device has increased with the result that the molten globule at the tip of the wire electrode is burned off by the conduction of the short circuiting electric current and by the action of the pulsed electric current waveform shaping device. In addition to the effects described with reference to the example of the fifth preferred embodiment, the pulsed arc welding system according to this embodiment, which is capable of and furnishing a flow of a short circuiting electric current in the short circuit period, determining the short circuit period, can improve the welding process, not only in the pulsed arc welding process, but also in the short circuiting transfer arc welding process in which the separation of the molten globule is achieved by short circuiting. In addition, the welding system can perform a welding process with small fluctuations in the short circuit period and in the arc period. Thus, welding can be performed with small irregularity in the shape of the welding beads and with small fluctuations in the depth of weld penetration.

Moreover, the pulsed arc welding equipment according to a seventh embodiment comprises a pulse group waveform setting device, a pulse width setting device, and a pulse interval setting device, in which the individual pulse peak values, pulse width values, pulse interval values are predetermined for the groups of pulsed electric currents having one or more kinds of pulse widths and pulse peak values; an arc length detecting device, which detects a signal corresponding to the arc length between the tip of the wire electrode and the base metal; a target arc length setting device which has predetermined target arc length signals corresponding to the groups of pulsed electric currents; a pulse peak value control circuit, which receives the differential output between the detected arc length signal and the target arc length signal; and a pulsed electric current waveform shaping device, which controls the pulse peak value of each pulse by transmitting switching signals to the pulse group waveform setting device, the pulse width setting device, and the pulse interval setting device, and the target arc length setting device, thereby renewing the contents in the memories of each device. The switching signals are transmitted after the output of a discharge electric current which is formed of pulses which pulse peak value is corrected according to the differential output after the output of, and a base electric current, which is transmitted during the period of the set pulse interval. The pulse width value depends on the reception of the input for the setting of the pulse group waveform setting device and the pulse interval setting device and the input of the correcting signal mentioned above. The pulse peak value is controlled by outputting and terminating the pulses having the renewed peak value on the basis of the input of the pulse terminating signal, and by correcting the renewed pulse peak value in accordance with the differential output mentioned above. This pulsed electric current waveform shaping device produces a pulsed electric current in a waveform that is shaped according to the setting signals received from the individual setting devices and also controls the pulse peak value according to the differential output between the detected arc length value and the target arc length outputted from the arc length detecting device and from the target arc length detecting device. The arc length detecting device detects the signal corresponding to the arc length between the tip of the wire electrode and the base metal on the basis of the values detected by the electric current detecting device and the electric voltage detecting device mentioned above. The target arc length setting device contains the target arc lengths set therein to control each of the peak values of the output pulses. Therefore, the pulsed arc welding system according to this invention is capable of accurately controlling the arc length since the system controls the peak value of the pulsed electric current in the pulse period, determining the lift of the molten globule by the electromagnetic force in the pulse period, and making a correction of the peak value on the basis of the differential signal between the detected arc length signal and the target arc length signal.

Furthermore, the pulsed arc welding system according to an eighth embodiment further comprises a short circuit and arc determining device, a short circuiting electric current waveform setting device, and an inverter, which are similar to those provided in the sixth embodiment. These devices constitute new parts of a short circuiting transfer arc welding system, that are added on to the welding system according to the seventh embodiment. The pulsed electric current waveform shaping device of the welding system of the eighth embodiment is given sends a pulsed arc electric current to the power source side, upon the arrival of an arc determining signal. This arc determining signal arrives when a rise in the electric voltage is detected by the electric voltage detecting device upon the occurrence of an arc as the molten globule at the tip of the wire electrode is burned off by the conduction of the short circuiting electric current. This short circuit electric current is fed to the power source side from the short circuiting electric current waveform shaping device on the basis of a short circuit determining signal generated by the short circuit device and arc determining device while the system is in the initial-phase state. In addition to the effects produced by the seventh embodiment, this welding system, which is designed to determine a short circuit period and to let a short circuiting electric current flow during such a short circuit period, is not only capable of accurately controlling the arc length in the pulsed arc welding process but also capable of controlling the arc length in the short circuiting transfer arc welding process. The separation of the molten globule is achieved by short circuiting. In addition, the welding system can perform a welding process with small fluctuations in the short circuiting period and in the arcing period. Thus, welding can be performed with small irregularity in the formation of the welding beads and with small fluctuations and with small fluctuations in the depth of weld penetration.

Furthermore, the pulsed arc welding system according to a ninth embodiment further comprises a pulse peak value control circuit similar to the circuit provided in the seventh embodiment. The ninth embodiment is able to control the pulse width on the basis of the pulse terminating signal sent out of the pulse width control circuit and also control of the pulse peak value on the basis of the correcting signal sent out of the pulse peak value control circuit. This pulsed arc welding system controls the peak value of the pulsed electric current during the pulse period by correcting the peak value according to the differential signal between the detected arc length signal and the target arc length signal and by determining the lift of the molten globule by the electromagnetic force in the pulse period according to the detected arc length signal corresponding to the arc length. The target arc length signal is set at the maximum distance to which the molten globule is lifted up in the pulse period, and the system stops the pulse and lets the base current flow when the detected arc length signal attains the distance equivalent to the maximum distance indicated by the target arc length signal, thereby accurately restraining the molten globule that is lifted up in the pulse period. Also the system stops the pulse always after it has performed a check on the arc length at the maximum distance of the lift of the molten globule. Thus, the system can weld with high accuracy. Furthermore, since arc length is limited by the target arc length, the pulsed arc welding system according to this embodiment accurately achieves the separation and transfer of the molten globule to the base metal.

Moreover, the pulsed arc welding equipment according to a tenth embodiment further comprises a pulse peak value control circuit similar to the one in the seventh embodiment and a short circuiting transfer arc welding equipment similar to the one in the sixth embodiment. The tenth embodiment is able to control the pulse width on the basis of the pulse terminating signal sent out of the pulse width control circuit and also control the pulse peak value on the basis of the correcting signal sent out of the pulse peak value control circuit. After the transfer to the arc period subsequent to the short circuit period. In addition to the effects of the ninth embodiment, this pulsed arc welding system is capable of determining the short circuit period and furnishing a flow of a short circuiting electric current in the short circuit period. Therefore the system is capable of accurately controlling the arc length not only in the pulsed arc welding process but also in the short circuiting transfer arc welding process which achieves the separation of the molten globule by the effect of a short circuit. Consequently, the system can perform a welding process with small fluctuations in the short circuit period and in the arc period. Thus, welding can be performed with small irregularity in the formation of the welding beads and with small fluctuations in the depth of the weld penetration.

Moreover, the pulsed arc welding system according to the eleventh embodiment further comprises a pulse group period setting device, which is comprised of a flip-flop, pulse group electric charge amount setting device, and a short circuit and arc determining device. In addition, eleventh embodiment further comprises a pulsed electric current waveform shaping device, which incorporates a built-in short circuiting electric current waveform shaping device which sends out a short circuiting electric current when a short circuit determining signal is input from the short circuit and arc determining device. The welding equipment according to this embodiment is constructed in the form of a short circuiting transfer arc welding system designed in such a manner that the pulsed electric current waveform shaping device creates the short circuiting electric current on the basis of the short circuit determining signal received, from the short circuiting electric current waveform shaping device. The system furnishes the pulsed arc electric current to the power source side upon the arrival of the arc determining signal. The arc determining signal arrives when the electric voltage as detected by the electric voltage detecting device rises as a result of the burn out of the molten globule at the tip of the wire electrode by the conduction of this short circuiting electric current. Since this welding system controls the base electric current period (i.e., the pulse interval) by determining a short circuit period, enabling the flow of a short circuit current in the short circuit period, determining in the extent that the arc period the molten globule is lifted up by the electromagnetic force in the pulse period on the basis of a signal corresponding to the detected arc length as determined in the base electric current period, and sending out the next pulse when the detected arc length signal falls below the target arc length signal. Therefore, this system eliminates the irregular lift of the molten. Thus, the system achieves the separation of the molten globule by short circuiting. Consequently, this welding system can perform a welding process with small fluctuations in the short circuit period and in the arc period. Thus, the system can weld with small irregularity in the formation of the welding beads and with small fluctuations in the depth of the welding penetration.

Moreover, the pulsed arc welding equipment according to the twelfth embodiment comprises: a pulse group waveform setting device and a pulse width setting device, which contain the predetermined individual pulse peak values and the individual pulse widths for the groups of pulsed electric currents having one or more pulse widths and pulse peak values; a pulse interval setting device, in which the individual pulse intervals are predetermined; an arc length detecting device, which detects a signal according to the arc length between the tip of the wire electrode and the base metal; a target arc length setting device, which has target arc length signals which are predetermined according to the groups of pulsed electric currents mentioned above; a differential signal output device, which determines the differential output between the detected arc length signal and the target arc length signal; a short circuit and arc determining device, which determines the short circuit period and the arc period; and a pulsed electric current waveform shaping device which comprises a short circuiting electric current waveform shaping device that outputs a short circuiting electric current on the basis of the short circuit determining signal. The pulsed electric current wave form shaping device feeds switching signals to the pulse group waveform setting device, the pulse width setting device, the pulse interval setting device, and the target arc length setting device, respectively, thereby renewing the contents in the memories of each device. The switching signals are transmitted after the output of a discharge electric current which is formed of pulses that have a pulse peak value and a pulse width that depend on the reception of the arc determining signal determined by the pulse group waveform setting device, the pulse width setting device, and the pulse interval setting device, and that depends on the base electric current, which is transmitted during each pulse interval and during each period of the group of pulsed electric currents. The pulse interval setting device sends out the pulses having the renewed pulse peak value and the renewed pulse width, corrects the renewed pulse peak value according to the differential output. The device also controls the value of the base electric current at the prescribed pulse intervals, after the pulse is sent out, according to the differential output from the differential signal output device. This short circuiting transfer arc welding system controls the value of the base electric current which is supplied for every pulse interval and for every pulse group interval, as set in the groups of pulsed electric currents, by means of the pulsed electric current waveform shaping device. Furthermore, the welding system controls the value of the base current according to the differential output from the differential signal output device which determines the differential output between the detected arc length signal from the arc length detecting device and the target arc length signal from the target arc length setting device, when the operation has shifted to the arc welding process. Although the molten globule is lifted up in the pulse period by the electromagnetic force due to a magnetic arc blow affecting the arc, this system is capable of restraining the elevation of the molten globule without changing the pulse intervals within the pulse group by determining this state of lifted molten globule in reference to the arc length and by performing control. The state is determined by correcting the value of the base electric current in the base electric current period according to the differential signal that indicates the difference between the arc length and the target arc length. As a result the arc length in the state of the elevated molten globule is restored to the original arc length. Therefore, the system is capable of accurately restoring the molten globule from its elevated state to its original state in the pulse period and thereby is capable of controlling the arc length according to the target arc length.

Furthermore, the welding system according to the thirteenth embodiment further, comprises the differential signal output device according to the second embodiment. Moreover, the thirteenth embodiment is in the form of a short circuiting transfer type arc welding system which is capable of variably controlling the pulse interval (i.e., the base electric current period) accordance to the detected arc length and variably controlling the value of the base electric current in accordance with the detected arc length. In addition, by the pulsed electric current waveform shaping device, of the system is capable of controlling the pulse intervals (i.e., the base electric current period) of the pulsed electric current to be transmitted by applying the pulse starting signal. The application of the pulse starting signal depends on the comparison between the detected arc length signal and the target arc length signal by the pulse output control circuit. Furthermore, the welding system can control the value of the base electric current by evaluating the differential output obtained from the differential signal output device and determining the difference between the detected arc length signal and the target arc length signal. This system is designed to control the start time of the pulse controlling the base electric current value $I_B$ in the base period by correcting the base electric current $I_B$ in the base period according to the differential signal between the detected arc length signal and the target arc length signal in the base period, by determining the state of the molten globule lifted up by the electromagnetic force in the pulse period, and by sending out the next pulse when the arc length signal falls to or below the length indicated by the target arc length signal. Therefore, the base electric current value $I_B$ approaches the target arc length with good responsiveness. Also the system can accurately transmit pulses upon confirmation of the target arc length; and can further furnish pulses in accordance with the fluctuations in the phenomena even if fluctuations should occur in the phenomena under the influence of external disturbances. Consequently, the system can produce the effect of more stable welding performance.

Furthermore, the welding system according to the fourteenth embodiment further comprises an arc length detecting device according to the eleventh invention, a pulse group electric charge amount setting device, and a pulse group period setting device comprising a flip-flop in its pulsed electric current waveform control circuit. The pulse group period setting device also consists of a pulse group generator, a flip-flop, an inverter, a differentiating circuit, a target arc length setting device provided with a lower limit target arc length setting device and an upper limit target arc length setting device which have a lower limit target arc length and an upper limit target arc length set in them, respectively, for the purpose of controlling the pulse width and pulse interval of each pulse to be output, and a pulse output control circuit. The pulse output control circuit comprises a first comparator which compares the detected arc length value and the lower limit target arc length and transmits forth a pulse starting signal on the basis of the difference of the comparison and a second comparator which compares the detected arc length value and the upper limit target arc length and transmits a pulse terminating signal on the basis the difference of the comparison. The pulse output control circuit also transmits a pulse starting signal and a pulse terminating signal in order to increase the pulsed electric current output from the pulse group generating device when the detected arc length value falls to or below the lower limit target value and to terminate the pulsed electric current when the detected arc length value attains the upper limit target arc length. This welding system controls the pulse widths and pulse intervals within a pulse group in such a manner that the detected arc length will be within the range from the upper limit target arc length signal to the lower limit target arc length signal and determine, the molten globule lifted up by the electromagnetic force of the pulse group in the arc period according to a signal corresponding to the detected arc length. This welding system can prevent welding effects such as those resulting in undercuts and a lack of uniformity in the welding beads, and those relating to the elimination of the lift of the molten globule in excess of the prescribed range under the influence of external disturbances. Consequently, the welding system can produce welded works of higher quality.

Furthermore, the welding system according to the fifteenth embodiment is constructed in the form of a short circuiting transfer arc welding system. In addition to the elements of the fourteenth embodiment, the fifteenth embodiment further comprises a short circuit and arc determining device and a short circuiting electric current waveform shaping device and is designed to transmit short circuiting electric current to the power source side via an analog switch which transmits the electric current in response to a short circuit determining signal. In addition, the fifteenth embodiment is also designed to give the power source side the pulsed arc electric current from the pulse group generating device upon the reception of the arc determining signal. The arc determining signal is renewed when a rise in the electric voltage is detected in the electric voltage detecting device due to the generation of an arc as the molten globule at the tip of the wire electrode is burned out by the conduction of the short circuiting electric current. In addition to the effects achieved in preferred embodiment according to the fourteenth invention, this welding system is capable of determining the short circuit period and causing the short circuiting electric current flow in the short circuit period. Therefore, this welding system is capable of accurately controlling the arc length not only in the pulsed arc welding process but also in the short circuit transfer arc welding process which performs the separation of the molten globule by short circuiting. Consequently, the welding system performs a welding process with small fluctuations in the short circuit period and the arc period. Thus, welding can be performed with small irregularity in the formation of the welding beads and with small fluctuations in the depth of the weld penetration.

Moreover, the welding system according to the sixteenth embodiment further comprises a pulse peak control circuit. In addition to the construction according to the fourteenth embodiment, the pulse peak control circuit comprises a differential signal output device which finds the differential output between the detected arc length value, which is output from the arc length detecting device according to the seventh embodiment, and the upper limit target arc length, which is output from the upper limit target arc length setting device of the target arc length setting device. The welding system is able to correct the pulse peak value, which is set in the pulse group waveform setting device, according to the differential output by sending out the differential output as a pulse peak correcting signal to the pulsed electric current waveform shaping device of the pulse group generating device. This welding system controls the pulsed electric current in the pulse period by correcting the current on the basis of the signal that represents the difference between the detected arc length signal and the upper limit target arc length signal and by determining the lift of the molten globule by the electromagnetic force in the pulse period according to the detected arc length signal that corresponds to the arc length. As a result, this welding equipment is capable of accurately controlling the arc length.

Moreover, the welding system according to the seventeenth embodiment is constructed in the form of a short circuiting transfer arc welding system. This welding system combines the pulse peak value control circuit according to the sixteenth embodiment with the construction according to the fifteenth embodiment. This welding system is designed to furnish the power source side with a pulsed arc electric current transmitted out of the pulse group generating device upon the reception of the arc determining signal. The arc determining signal is received when a rise in the electric voltage is by the electric voltage detecting device due to the generation of an arc as the molten globule at the tip of the wire electrode is burned out as the result of the conductance of the short circuit electric current. The short circuiting electric current is transmitted from the short circuiting electric current waveform shaping device in response to the short circuit determining signal generated by the short circuit and arc determining device and is transmitted the power source side in the initial-phase state in the system. The pulse group generating device receives a pulse peak correcting value at the time the differential output from the pulse peak value control circuit which comprise a differential signal output device which outputs the differential output between the detected arc length value output from the arc length detecting device and the upper limit target arc length output from the upper limit target arc length setting device. The pulse peak value control circuit corrects the pulse peak value, which is set in the pulse group waveform setting device, in accordance with the differential output. In addition to the effects achieved by the welding system according to the sixteenth embodiment, this welding n-system, which is capable of determining the short circuit period and having a short circuiting electric current flow in the short circuit period, is also capable of accurately controlling the arc length not only in the pulsed arc welding process but also in the short circuiting transfer arc welding process which performs the separation of the molten globule by short circuiting. Therefore, the welding system can perform a welding process with small fluctuations in the short circuit period and the arc period. Thus, welding can be performed with small irregularity in the shape of the welding beads and with small fluctuations in the depth of the weld penetration.

Moreover, the welding system according to the eighteenth embodiment comprises an arc length detecting device and a comparator according to the first embodiment in its pulsed electric current control circuit. The welding system also comprises an electric voltage setting device, a comparator, which compares the arc length signal generated by the arc length detecting device and the electric voltage value set by the electric voltage setting device and outputs a signal if the arc length signal is less than or equal to the set electric voltage value, and an electric current waveform setting circuit, which generates the prescribed group of pulsed electric currents on the basis of the output from the comparator. The groups of pulsed electric currents transmitted from the electric current waveform setting circuit are controlled in such a manner that their conduction begins when the arc length signal generated from the arc length detecting device is less than or equal to the set electric voltage value. In other words, the flow of the group of pulsed electric currents begins when the arc length signal has attained a predetermined minimum arc length value. This welding system is designed to control the start of the conduction of the pulsed electric current or the start of the conduction of a group of pulsed electric currents when the detected arc length value has fallen to or below the set value. Therefore, welding system can reliably perform the separation and transfer of the molten globule while preventing the molten globule at the tip of the wire electrode to form any short circuit with the base metal.

Moreover, the welding system according to the nineteenth embodiment comprises in that a timer circuit is provided between the comparator and the electric current waveform setting circuit according to the eighteenth embodiment. Also, the welding system controls the beginning of the conduction of the groups of pulsed electric currents from the electric current waveform setting circuit when the value from the arc length detecting device has been less than or equal to the set in electric voltage setting device, for a prescribed duration of time. In addition to the effects achieved by the eighteenth embodiment, the welding system according to this embodiment is capable preventing the erroneous start of the conduction of the group of pulsed electric currents when the arc length apparently declines to zero by the effect of an abnormal short circuit phenomenon which occurs in the period of the group of pulsed electric currents. Thus, the welding system attains regularity in the growth and separation of the molten globule.

Next, the welding system according to the twentieth embodiment comprises the pulsed electric current waveform control circuit according to the eighteenth embodiment. In addition to the eighteenth embodiment, this welding system comprises base electric current period maintaining circuit, that controls the operations for the start of conduction of the group of pulsed electric currents transmitted from the electric current waveform setting circuit. This welding system controls the groups of pulsed electric currents, which are sent out of the electric current waveform setting circuit, inhibiting the start of the conduction of the groups of pulsed electric currents during the insensitive period of time set up by the base electric current period maintaining circuit after the start of a shift from the groups of pulsed electric currents to the base current and by initiating the conduction of the groups of pulsed electric currents when the detected arc length signal falls to or below the set electric voltage value in the period of time when the insensitive period is canceled. Since the welding system is designed to control the start of the conduction of a pulsed electric current or a group of pulsed electric currents when the detected arc length signal has fallen to or below the set value after the elapse of the insensitive period, this welding system is capable of preventing an erroneous control operation that may occur under the influence of the phenomenon of a momentary short circuit caused by the vibrations of a molten globule. These vibrations occur immediately after the start of a shift from a group of pulsed electric currents to the base electric current. In addition, the welding system is capable of achieving the separation and transfer of the molten globule at the tip of the wire electrode with certainty without any short circuit of the molten globule with the base metal.

Furthermore, the welding system according to the twenty-first embodiment is designed so that the insensitive period for the base electric current maintaining circuit according to the twentieth embodiment is converted by means of a period converter in accordance with the output from a wire feeding speed setting device which sets the speed at which the wire electrode is fed. Now, when the wire feeding speed is increased, it is necessary to increase the quantity of the wire melted and separated in a unit of time in accordance with such an increase in the feeding speed. Thus welding system is designed to change the insensitive period according to such an increase in the wire quantity. Consequently, it is possible to vary the base electric current itself to increase the number of the groups of pulsed electric currents which can be applied in the unit of time. This feature makes it possible to control operations according to the wire feeding speed to inhibit an erroneous start of the conduction of any group of pulsed electric currents. Thus, the welding system can achieve regularity in the growth and separation of the molten globule. Thus, in addition to the effects achieved by the twentieth embodiment, this welding system is capable of controlling the base electric current period by varying insensitive period made according to the wire feeding speed and is capable of performing the optimum control in accordance with the wire feeding speed over the pulses or the groups of pulsed electric currents applied per unit of time.

BRIEF DESCRIPTION OF THE DRAWINGS

Of these Figures, FIG. 1 illustrates the configuration of the pulsed arc welding system in one example of the first embodiment;

FIG. 2 is a circuit diagram illustrating one example of the first embodiment of the arc length detecting device shown in FIG. 1;

FIG. 3 is a waveform chart illustrating the output waveform in relation to FIG. 1;

FIG. 4 is an operating time chart for the pulsed electric current waveform shaping device shown in FIG. 1;

FIG. 5 is a waveform chart illustrating the actions and effects of the equipment in the configuration shown in FIG. 1;

FIG. 6, FIGS. 7(a) and 7(b) and FIG. 8 illustrate the second embodiment and are drawings corresponding to FIG. 1, FIG. 4, and FIG. 5, respectively;

FIG. 12 is a configuration drawing illustrating the pulsed arc welding system in one example of the fourth embodiment;

FIG. 13 is a waveform chart illustrating the output waveforms in relation to FIG. 12;

FIG. 14 is an operating time chart for the pulsed electric current waveform shaping device shown in FIG. 12;

FIG. 15 is a configuration drawing illustrating the pulsed arc welding system in one example of the fifth embodiment;

FIG. 16 is a circuit diagram illustrating one example of the pulse group electric charge amount setting device shown in FIG. 15;

FIG. 17 is a waveform chart illustrating the output waveforms in relation to FIG. 15;

FIG. 18 is a flow chart illustrating the operations in the pulsed electric current waveform shaping device shown in FIG. 15;

FIG. 19 is a waveform chart illustrating the actions and effects in the configuration given in FIG. 15;

FIG. 20, FIGS. 21(a), 21(b), 21(c), FIG. 22 and FIG. 23 illustrate the sixth embodiment;

FIG. 20 is a drawing corresponding to FIG. 15;

FIG. 22 is a drawing corresponding to FIG. 19;

FIG. 23 is a drawing corresponding to FIG. 18;

FIG. 32 is a configuration drawing illustrating the pulsed arc welding system in one example of the eleventh embodiment;

FIG. 33 is an operating time chart for the pulsed electric current waveform shaping device shown in FIG. 32;

FIG. 34 is a waveform chart illustrating the output waveforms in relation to FIG. 32;

FIG. 35 is a waveform chart illustrating the actions and effects in the configuration shown in FIG. 32;

FIG. 40 is a configuration drawing illustrating the pulsed arc welding system in one example of the fourteenth embodiment;

FIG. 41 is a circuit diagram illustrating one example of the pulse group generating device for the configuration shown in FIG. 40;

FIG. 42 is a waveform chart illustrating the output waveforms in the configuration shown in FIG. 40;

FIG. 43 is a flow chart illustrating the operations of the target arc length setting device shown in FIG. 40;

FIG. 44 is a waveform chart illustrating the actions and effects in the configuration shown in FIG. 40;

FIG. 45 is a drawing corresponding to FIG. 40;

FIG. 46 is a drawing corresponding to FIG. 43;

Next, FIG. 54 (a) and FIG. 54 (b) are schematic diagrams illustrating the transfer of the molten globule in respect of the waveform of the pulsed arc discharge electric current in the conventional welding process; and FIG. 55 and FIG. 56 illustrate the phenomenon of a magnetic arc blow in the conventional welding process.

DETAILED DESCRIPTION OF THE PREFERRED EMBODIMENTS

Figure 1:
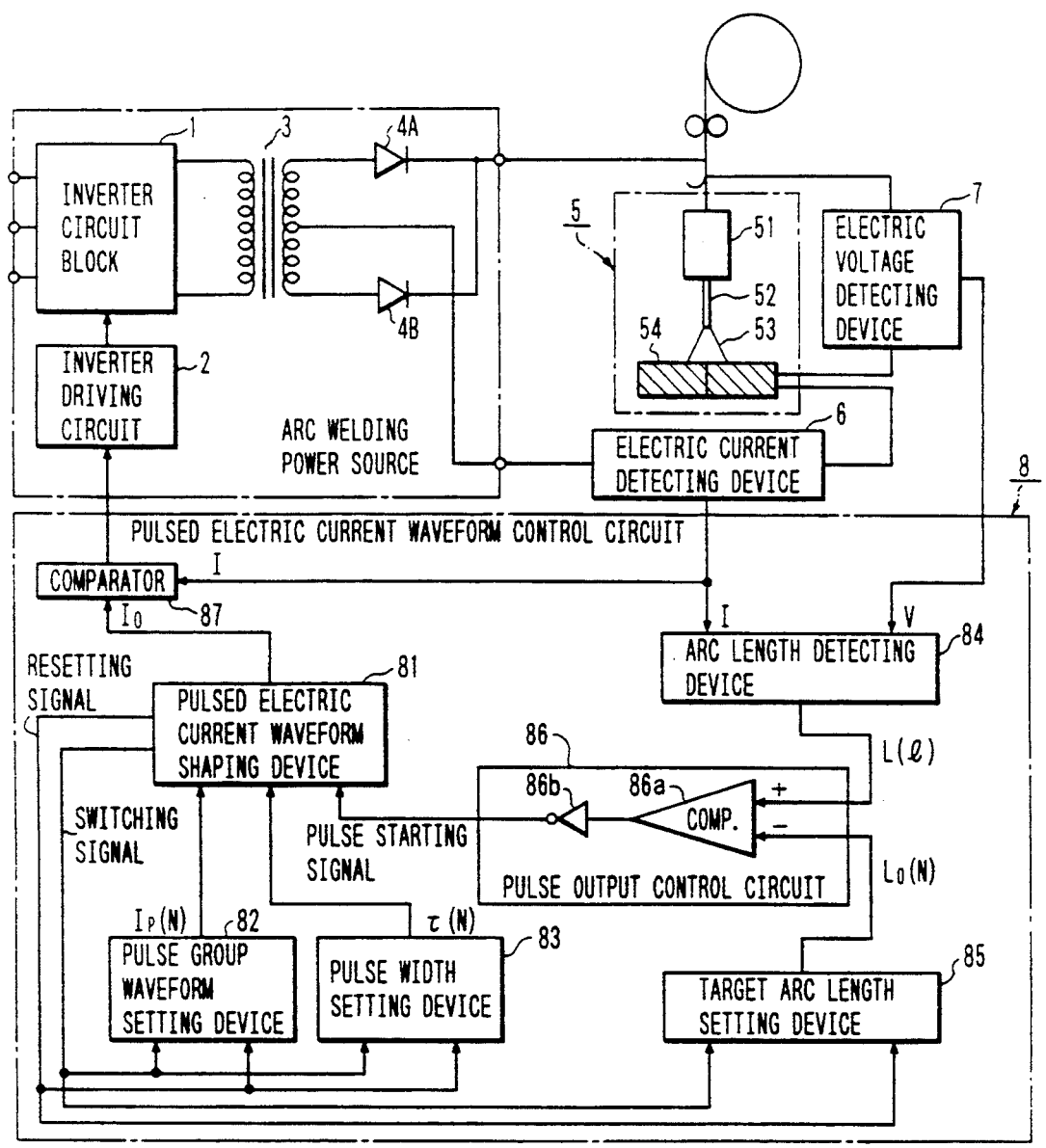
FIG. 1 through FIG. 5 illustrate the first embodiment.

FIG. 1 is a configuration drawing illustrating the pulse welding system in one example of the first embodiment. In this drawing, the reference number (1) denotes an inverter circuit block which is driven and controlled by the inverter driving circuit (2). The reference number (3) denotes a high frequency transformer. The reference numbers (4A) and (4B) denote high frequency diodes. The reference number (5) denotes an arc loading zone which is composed of a welding torch (51), a wire electrode (52), which is a wire electrode formed into a wire and fed from a wire reel, an arc discharging device (53), and a base metal (54). Arc welding is performed with a desired group of pulses transmitted from the inverter circuit block (1) to the welding torch (51) via the high frequency transformer (3) and the high frequency diodes (4A) and (4B).

Moreover, the reference number (6) denotes an electric current detecting device which detects the electric current flowing to the arc loading zone (5), and the reference number (7) denotes an electric voltage detecting device which detects the electric voltage between the electrodes in the arc loading zone (5). The reference number (8) denotes a pulsed electric current waveform control circuit which controls the waveforms of the 5 groups of pulses output from the inverter circuit block (1). The pulsed electric current waveform control circuit (8) controls the inverter circuit block (1) mentioned on the basis of the detected electric current value found by the electric current detecting device (6) and the detected voltage value found by the electric voltage detecting device (7). This pulsed electric current waveform control circuit (8) comprises a pulsed electric current waveform shaping device (81), a pulse group waveform setting device (82) which stores the individual pulse peak values $I_P(N)$ of the pulse groups in it, and a pulse width setting device (83) which stores the individual pulse widths $\tau$ (N) for the groups of pulses the pulsed electric waveform (8) determines the pulsed electric currents $I_0$. The waveforms of the pulsed electric currents $I_0$ are shaped by the pulsed electric current waveform shaping device (81), which receives the setting signals from the pulse group waveform setting device (82) and the pulse width setting device (83), and the pulsed electric current waveform shaping device (81) also receives a pulse starting signal from a pulse output control circuit (86). The pulse output control circuit (86) receives signals from the arc length detecting device (84) and a target arc length setting device (85). The arc length detecting device (84) detects the signal L (l) corresponding to the arc length between the tip of the wire electrode (52) and the base metal (54) on the basis of the values I and V detected respectively by the electric current detecting device (6) and the electric voltage detecting device (7). The target arc length setting device (85) contains the target arc lengths $L_0$ (N) set therein for controlling the individual peak values $I_P$ (N) of the pulses which are output to a comparator (86a) of the pulse output control circuit (80). The comparator 86(a) compares the detected arc length value L (l) and the target arc length $L_0$ (N) and outputs an ON-signal if $L(l) > L_0$ (N), and outputs an OFF-signal if $L(l) < L_0$ (N). An inverter (86b) inverts the ON- signal and the OFF-signal and outputs a pulse starting signal. In other words pulse output control circuit (86) sends out a pulse starting signal when the detected arc length L(l) falls to or below the target arc length $L_0$ (N). This pulse starting signal the output pulses from the pulsed electric current waveform shaping device (81). The pulsed electric current waveform shaping device (81) transmits switching signals to the pulse group waveform setting device (82), the pulse width setting device (83), and the target arc length setting device (85) in synchronization with the transmission of the pulsed electric currents. As a result the peak value $I_P(N)$, the pulse width $\tau$ (N) are renewed, and the target arc length $L_0$ (N) in a manner to correct the next pulsed electric current. Moreover, the pulsed electric current $I_0$ transmitted from the pulsed electric current waveform shaping device (81) is compared with the pulsed electric current I generated from the electric current detecting device (6) by the comparator (87). The comparator (87) then transmits ON-OFF instructions to the inverter driving circuit (2).

Figure 2:
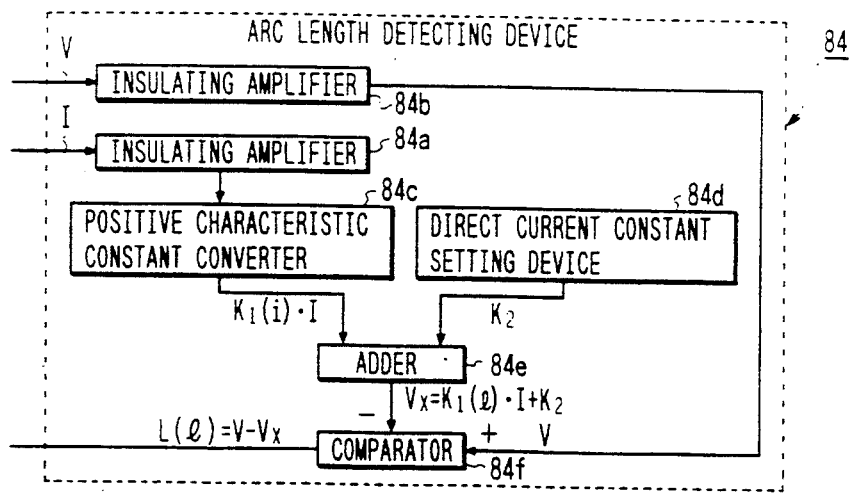

The arc length detecting device (84) is made in the construction shown in FIG. 2. The arc length detecting device (84) comprises insulating amplifiers (84a) and (84b), a positive characteristic constant converter (84c).

The positive characteristic constant converter (84c) receives the detected electric current I via the insulating amplifier (84a) and determines a positive characteristic constant ($K_1(i)$). I for the electric voltage of the arc by multiplying the detected electric current value I with $K_1(i)$. The arc length detecting device (84) also comprises a direct current constant setting device (84d), which sets an offset electric voltage constant $K_2$ and an adder (84e), which adds up the respective outputs from the positive characteristic constant converter (84c) and the direct current electric voltage constant setting device (84d). The arc length detecting device (84) further comprises a comparator (84f). The comparator (84f) outputs a value of the are length, L (l)=V−$V_x$, by subtracting the output of the adder (84e) ($V_x=K_1(i)\cdot I+K_2$), from the electric value V, detected by the electric voltage detecting device (7).

The arc electric voltage V can be expressed by the equation, V=R(i)·I+A l+B, wherein R(i) expresses a positive characteristic constant, I expresses an arc electric current, A expresses a proportional constant for the arc length, l expresses the arc length, and B expresses the minimum electric voltage. The voltage $V_x$ may be expressed by the equation, $V_x=K_1(i)\cdot I+K_2$, when the positive characteristic constant is expressed by $K_1(i)$, the current expressed by l, and the offset electric voltage is expressed by $K_2$ as is known in circuit theory. Therefore, the difference obtained by their comparison, namely, L(l)=V−$V_x$, is found to be: L(l)=V−$V_x$={R(i)−$K_1(i)$} I+A l+B−$K_2$. When the values R(i) and $K_1(i)$ are selected in such that R(i)≃$K_1(i)$, then the equation becomes L(l)≃A l+(B−$K_2$). Consequently, the value L(l) is a function of the arc length only. Therefore, depending on the way how the values for A, B, and $K_2$ are selected, the difference obtained by the comparison, L(l)=V−$V_x$, will be a signal corresponding to the arc length, and therefore the actual arc length can be detected.

Figure 3:
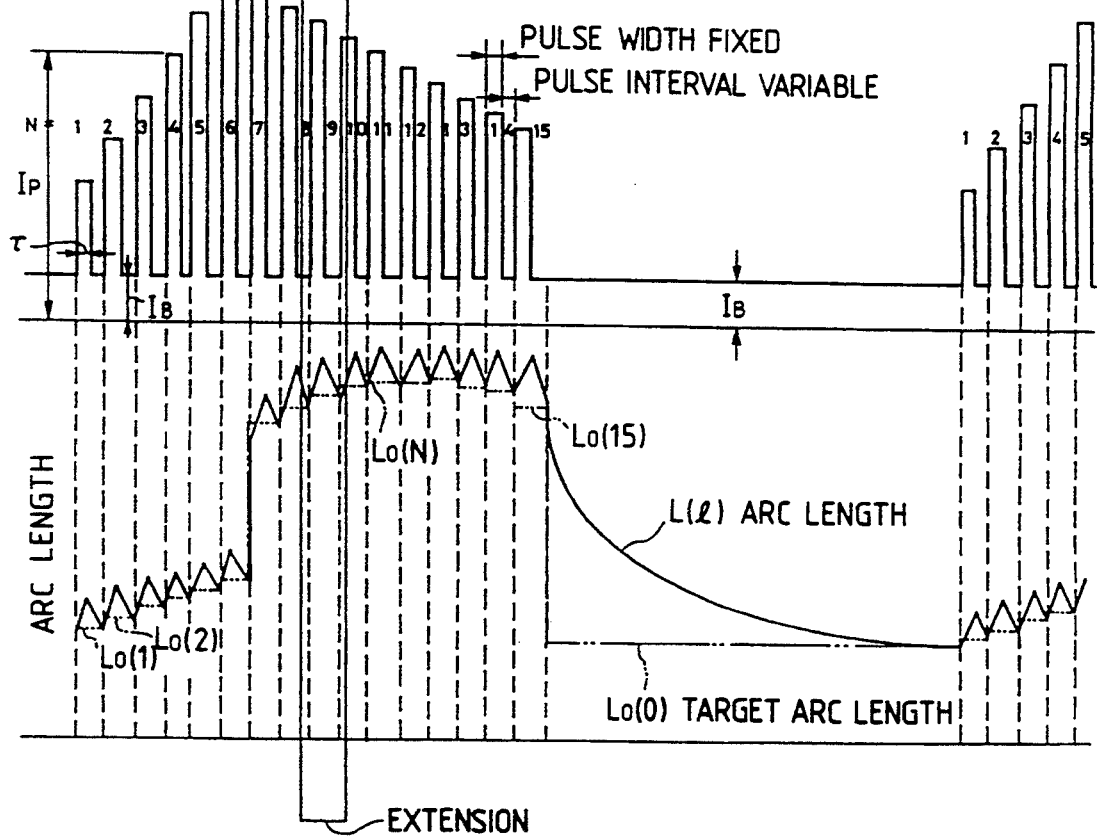

Next, the operations of the welding system in this preferred embodiment are described with reference to the waveform charts given in FIG. 3 and FIG. 5 and also with reference to the flow chart illustrating the operations of the pulsed electric current waveform shaping device (81) given in FIG. 4. First, the peak values $I_P$ (N) and the pulse width values $\tau$ (N) for the individual pulsed electric currents that form the groups of pulsed electric currents, N=0 through 15 (for which $I_P(0)=0$ and $\tau$ (0)=0 when N=0) are set in the pulse group waveform setting device (82) and the pulse width setting device (83), as shown in FIG. 3. The signals $L_0$ (N) (wherein, $L_0$ (0) expresses a signal corresponding to the target arc length, when N=0), which correspond to a plural number of target arc lengths, are set in the target arc length setting device (85).

Figure 4:
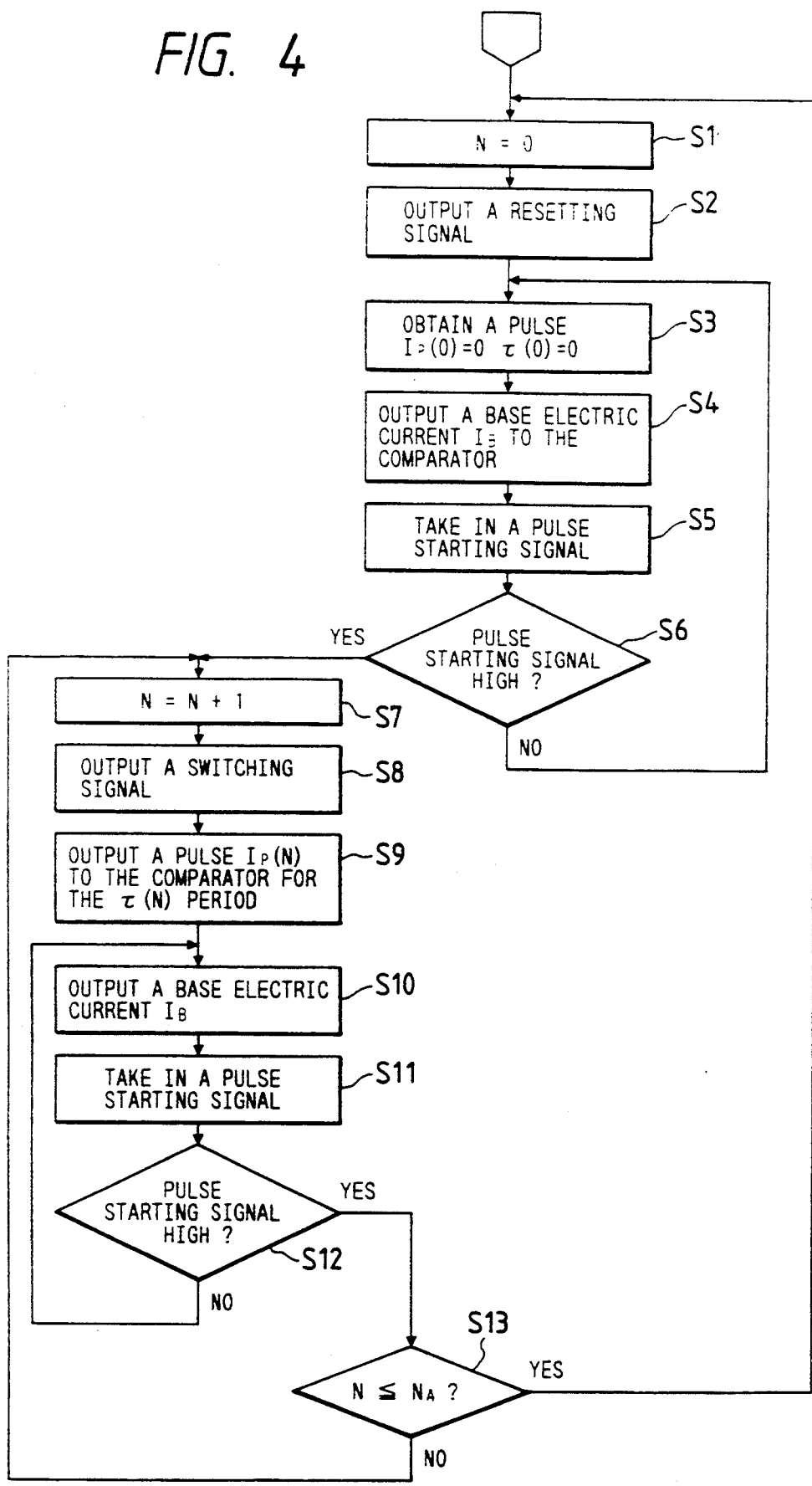

The pulsed electric current waveform shaping device (81) first sets the repeating loop N at N=0, as shown in FIG. 4, and sends resetting signals to the pulse group waveform setting device (82), the pulse width setting device (83), and the target arc length setting device (85) (steps S1 and S2). Then the pulsed electric current waveform shaping device (81) obtains a pulse peak value $I_P(0)=0$ and a pulse width $\tau$ (0)=0 respectively from the pulse group waveform setting device (82) and the pulse width setting device (83), respectively. The pulse group waveform setting device (83) and the pulse width setting device (83) have been initialized by these resetting signals, (step S3). The pulsed electric current waveform shaping device (81) obtains a prescribed base electric current $I_B$ from the build-in base electric current output device (not illustrated in the Figure) and outputs the electric current to the comparator (87) (step S4).

After a pulsed electric current $I_0$ (only $I_B$ in this case) is transmitted from the pulsed electric current waveform shaping device (81) to the comparator (87) and the comparator (87) with an transmits an ON-signal to the inverter driving circuit (2), an inverter driving signal is transmitted from the inverter driving circuit (2) to the inverter circuit block (1). Consequently, the inverter is thereby driven. With the inverter being driven in this manner, an alternating current waveform processed for its shaping is output to the high frequency transformer (3). Subsequently an output signal from the high frequency transformer (3) is rectified into a direct current waveform by means of the high frequency diodes (4A) and (4B). The resulting pulsed arc electric current is transmitted the arc loading zone (5) and generates a pulsed arc discharge (53). The pulsed arc discharge (53) fuses the base metal (54) and the tip of the wire electrode (52).

The arc length detecting device (84) determines the arc length L (l) on the basis of the detected signals I and V. The detected signals I and V are detected at the same moment by the electric current detecting device (6) and the electric voltage detecting device (7), respectively. The arc length detecting device (84) outputs the detected arc length to the pulse output control circuit (86). Then, the pulse output control circuit (86) receives a target arc length $L_0$ (0) at the particular moment from the target arc length setting device (85) and compares the detected arc length value $L_0$ (0) with the target arc length $L_o$. If $L(0) < L_o$, the pulse output control circuit (86) outputs a pulse starting signal HIGH to the pulsed electric current waveform shaping device (81).

Next, after initialization, the pulsed electric current waveform shaping device (81) receives the pulse starting signal (step S5), renews the repeating loop N (step S7) when the pulse starting signal is HIGH (step S6), and outputs switching signals respectively to the pulse group waveform setting device (82), the pulse width setting device (83), and the target arc length setting device (85) (step S8). Next the pulsed electric current waveform shaping device (81) obtains a pulse peak value $I_P$ (N) and a pulse width $\tau$ (N) according to the state of renewal of the particular loop N and outputs a pulsed electric current $I_0$ (step S9). This procedure renews the target arc length signal $L_0$ (N). After the pulsed electric current is output, the prescribed base electric current $I_B$ is output in the pulse intervals until the next pulse (step S10).

The pulsed electric current $I_0$ obtained in this manner is transmitted to the comparator (87), which compares the pulse electric current $I_0$ with the detected electric current signal I. If $I_0 > I$, the comparator (87) outputs an ON-signal to the inverter driving circuit (2). If $I_0 < I$, the comparator (87) outputs an OFF-signal to the inverter driving circuit (2). A pulsed arc electric current driven by the inverter is transmitted to the arc loading zone (5) and fuses the wire electrode (52) and the base metal (54).

Then, the pulsed electric current waveform shaping device (81) receives a pulse starting signal based on the comparison of the detected arc length signal L (l) and the target arc length signal $L_0$ (N) from the pulse output control circuit (86) (step S11). If the pulse starting signal is HIGH, the pulsed electric current waveform shaping device (81) renews the repeating loop N again and controls the group of pulsed electric currents in such a manner as shown in FIG. 3, and transmitts them to the arc loading zone (5) by repeating the steps from S7 through S13. However, the pulsed electric current waveform shaping device (81) returns to step S1 it is found that $N_A = 15$ at the step S13.

Specifically, the welding system in the example of preferred embodiment given above is designed in such a manner as to prevent the phenomenon of the molten globule from being lifted up by the effect of a magnetic arc blow of the arc. Therefore, the welding system maintains regularity in the separation of the molten globule in the following manner. First, the welding system variably controls the pulse intervals according to the detected arc length. Second, the welding system continues furnish a flow of the base electric current $I_B$ until the detected arc length signal L (l) attains the target arc length signal $L_0$ (N) and after the pulse $I_0$ which has the pulse peak value $I_P$ (N) and the pulse width $\tau$ (N) is transmitted, as shown in the enlarged waveform chart given in FIG. 5. After the target arc length signal $L_0$ (N) is attained, the welding system renews the value N and transmits the pulse $I_0$ which has next the pulse peak value $I_P$(N) and next pulse width $\tau$ (N).

Therefore, according to the first embodiment described above, the welding system receives the state of the molten globule lifted up by the electromagnetic force in the pulse period. on the basis of the arc length the state of the The welding system then applies the next pulse by variably controlling the base electric current period (i.e. the pulse interval) according to the detected arc length in such a manner that the molten globule in its lifted state will be restored to the original target arc length. Therefore, the welding system can eliminate an extreme lift of the molten globule and can perform the separation and transfer of the molten globule in an orderly state to the base metal.

Figure 6:
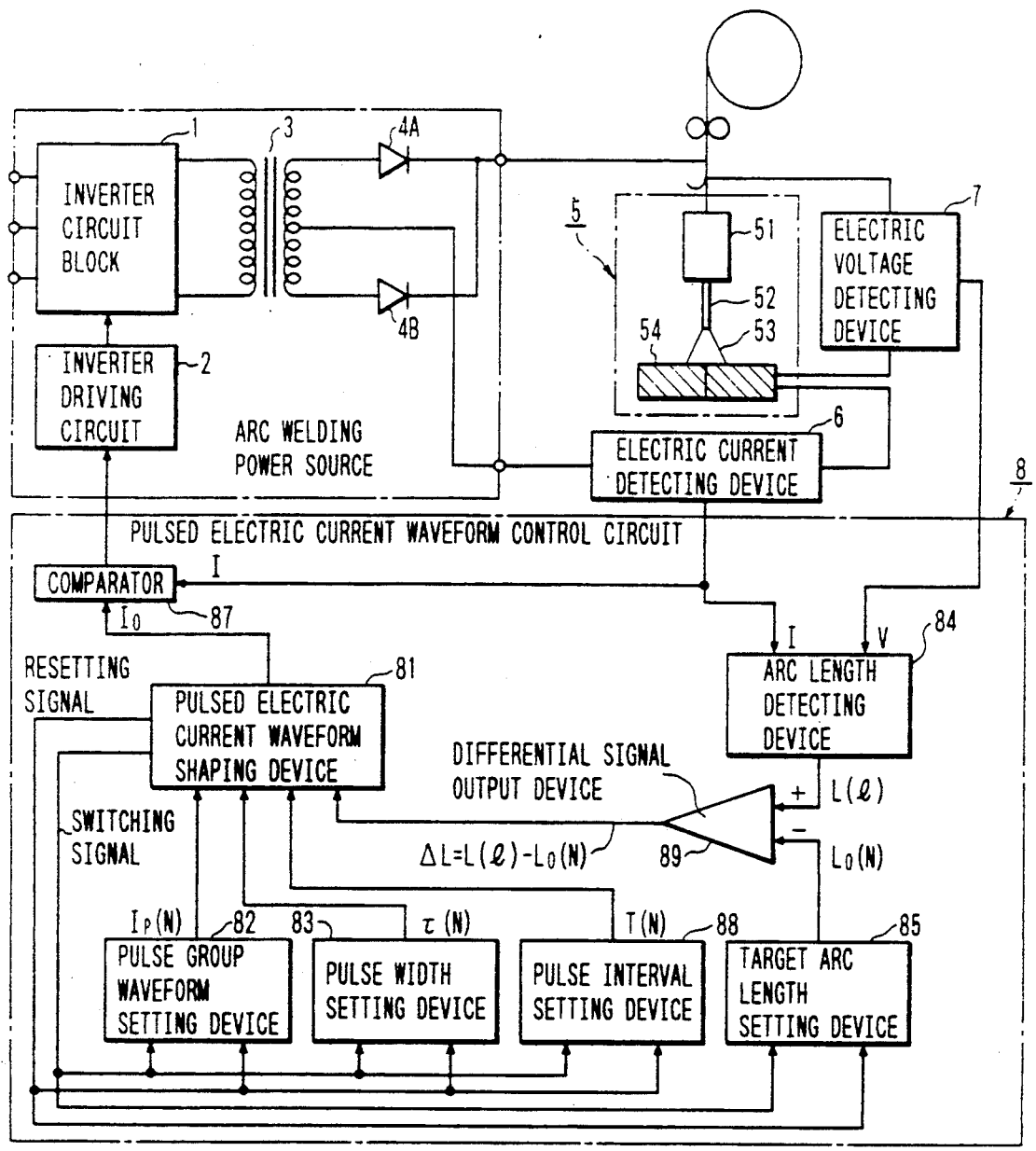

Next, FIG. 6 illustrates one example of the second embodiment. Those component parts included in this Figure that are identical to those shown in FIG. 1 are indicated with the same reference numbers and omitted from the description given hereinbelow. As shown in this FIG. 6, this embodiment is different from that described in the example of the first embodiment because the pulse output control circuit (86) has been eliminated from this construction. Furthermore, the pulsed electric current waveform control circuit (8) of this welding equipment comprises, as a new device a pulse interval setting device (88). The pulse interval setting device (88) contains pulse interval values T (N) at N=0 through 15 for a plurality pulses. The pulse group interval is a constant value, $T_B$, (constant) when N=0, and the pulse interval $T_A$ at N=1 through 15 are also constant values. The set values are analogous to the values of the pulse group waveform setting device (82), the pulse width setting device (83), and the target arc length setting device (85). This welding system further comprises, as a new device a differential signal output device (89). The differential signal output device (89) obtains a differential output, $\Delta L = L$ (l) $- L_0$ (N), by subtracting from the detected arc length signal L (l), which is generated by the arc length detecting device (84), the target arc length signal $L_0$(N), which is generated by the target arc length setting device (85). The welding system according to this embodiment maintains the base electric current $I_B$, which is transmitted at each pulse interval and at each pulse group interval of the group of pulsed electric currents, to the level according to the equation, $I_B = I_{B0} - A \cdot \Delta L$. In the equation $I_{B0}$ expresses the value of the reference base electric current, A expresses a constant and $\Delta L$ expresses the differential output from the differential signal output device (89). The welding system maintains this level of the base electric current $I_B$ by means of the pulsed electric current waveform shaping device (81).

Figure 8:
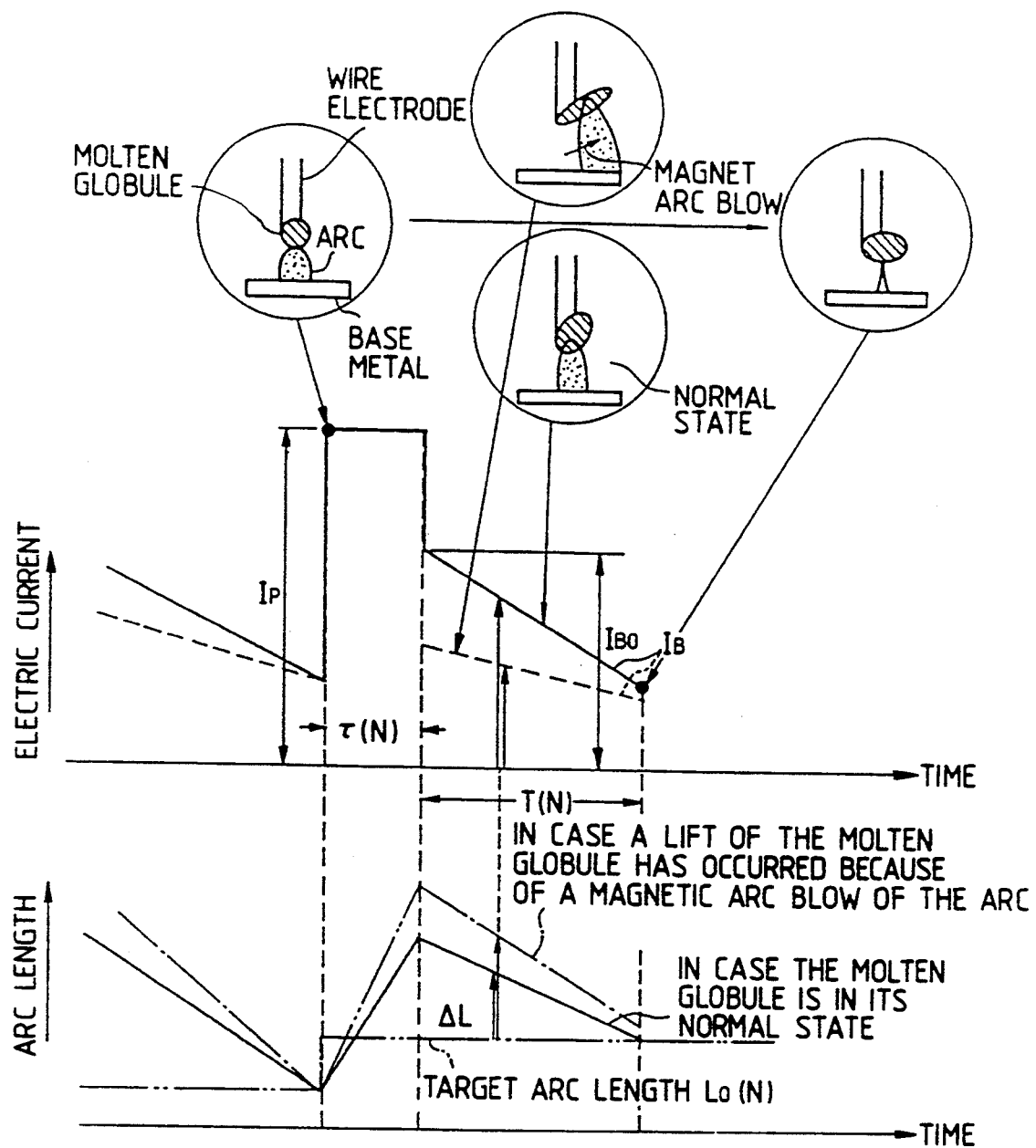

The flow chart presented in FIG. 7 and the waveform chart shown in FIG. 8 illustrates the operations of the pulsed electric current waveform shaping device (81) of the welding system of this embodiment. These two Figures correspond to FIG. 4 and FIG. 5, respectively.

First, as shown in FIG. 7 (a), the pulsed electric current waveform shaping device (81) sets the repeating loop N at the value N=0 and, at the same time, transmits a resetting signal to the pulse group waveform setting device (82), the pulse width setting device (83), the target arc length setting device (85), and the pulse interval setting device (88) (the steps S1 and S2). The pulsed electric current waveform shaping device (81) then obtains a pulse peak value $I_P = 0$, a pulse width $\tau$ (0)=0, and a pulse interval T (0)=$T_B$ (a constant value) from the pulse group waveform setting device (82), the pulse width setting device (83), and the pulse interval setting device (88), respectively. These setting devices have been initialized by the resetting signal. The pulsed electric current waveform shaping device (81) also obtains a prescribed base electric current $I_B$ from a base electric current output device within the device (81) (not illustrated in the Figure) and outputs the base electric current $I_B$ to the pulse interval $T_B$ period comparator (87) (the steps S3 and S4).

The pulsed electric current $I_0$ (only $I_B$ in this case) is transmitted from the pulsed electric current waveform shaping device (81) to the inverter driving circuit (2) by way of the comparator (87). The inverter signal is transferred from the inverter driving circuit (2) to the inverter circuit block (1) and drives the inverter. With the inverter being thus driven, an alternating current waveform, as processed for its shaping, is output to the high frequency transformer (3). The signal output from the high frequency transformer (3) is further rectified into a direct current waveform by the high frequency diodes (4A) and (4B) and this pulsed arc electric current waveform I is fed to the weld zone, namely, the arc loading zone (5).

The arc length detecting device (84) determines an arc length L (l) on the basis of the signals I and V detected by the electric current detecting device (6) and the electric voltage detecting device (7), respectively. The differential signal output device (89), receives the target arc length $L_0$ at the particular moment from the target arc length setting device (85) and outputs the differential output, $\Delta L = L$ (l)$-L_0$ (0) to the pulsed electric current waveform shaping device (81).

As shown in FIG. 7 (b), at such a time, the pulsed electric current waveform shaping device (81) variably controls the base electric current $I_B$ by maintaining the base electric current $I_B$ at a value $I_B = I_{B0} - A \cdot \Delta L$. The pulsed electric current waveform shaping device (81) receives the differential output $\Delta L$ from the differential signal output device (89). The base electric current $I_B$ is regulated in relation to the set reference base electric current value $I_{B0}$, until the period $t = T(0)$ ($= T_B$) (i.e. until the pulse interval T (0)=$T_B$).

Next, initialization of the pulsed electric current waveform shaping device (81) renews the repeating loop N after $t = T(0)$ ($= T_B$) (step S5). Then the pulsed electric current waveform shaping device (81) sends out switching signals respectively to the pulse group waveform setting device (82), the pulse width setting device (83), and the target arc length setting device (85), and the pulse interval setting device (88). As a result, the pulsed electric current waveform shaping device (81) obtains a pulse peak value $I_P(N)$ and a pulse width $\tau$ (N) according to the renewal of the loop N, and yields the output of the pulsed electric current $I_0$ (step S7) and renews the pulse interval T (N) and the target arc length $L_0$ (N). During the pulse interval T (N) between the transmission of a prescribed base electric current $I_B$ is transmitted (the step S8). As shown in FIG. 7 (b), this time, the pulsed electric current waveform shaping device (81) variably controls the base electric current $I_B$ by maintaining the base electric current $I_B$ at a value $I_B = I_{B0} - A \cdot \Delta L$ until the period $t = T_A$ when the pulse interval T (0)=$T_A$ (is attained, Ta is a constant value T(N)=$T_A$ for any N=1 through 15).

The pulsed electric current $I_0$, which is obtained in this manner, is transmitted to the comparator (87). The comparator (87) compares the current with the detected electric current signal I, then transmits an ON-signal, when $I_0 > I$, and transmits an OFF-signal $I_0 < I$ to the inverter driving circuit (2). A pulsed arc electric current I, which is driven by the inverter, is output to the arc weld zone (5). Consequently, the wire electrode (52) and the base metal (54) are fused.

Then, the pulsed electric current waveform shaping device (81) renews the repeating loop N again and repeats the steps S5 through S8 in such a manner that the pulsed electric currents obtained are output to the weld zone (5). The pulsed electric current waveform shaping device (81) returns to step S1 when the value $N_A = 15$ is attained at step S9.

With the operations performed in this manner, the molten globule will be lifted up by the electromagnetic force due to a magnetic arc blow in the pulse period, as illustrated in the enlarged chart given in FIG. 8. However, this system maintains the base electric current value $I_B$ at a value $I_B = I_{B0} - A \cdot \Delta L$ in the base current period by means of the differential signal $\Delta L$ which is the difference between the arc length L (l) and the target arc length $L_0$ (N). The base electric current value $I_B$ is regulated in such a manner that the molten globule is restored from its state of being lifted up to its original arc length. Therefore, the system is able to restrain the lifting of the molten globule without changing the pulse intervals within the group of pulses and is able to accurately restore the lifted globule within the pulse period. Thus, the welding system can the separation of the molten globule and its transfer to the base metal in an orderly manner.

That is to say, the example of preferred embodiment described above variably controls the base electric current according to detected arc length. Therefore, the welding system is able to prevent the phenomenon of the lifting of the molten globule which occurs as a result of the magnetic arc blow of the arc and is able to maintain the regularity in the separation of the molten globule by providing a flow of a base electric current $I_B$ ($= I_{B0} - A \cdot \Delta L$) as determined according to the differential output $\Delta L$. The differential output $\Delta L$ is obtained by the differential signal output device (89) and is the difference between the detected arc length signal L (l)

and the target arc length signal $L_0$ (N) in the period before the next pulse is sent out. As shown in the enlarged waveform chart given in FIG. 8, this period is the period of the pulse interval T (N). The pulse interval T (N) is defined by the pulse interval setting device (88) as occurring after a pulse $I_0$ which has the pulse peak value $I_P$(N) and the pulse width $\tau$ (N), set by the pulse group waveform setting device (82) and the pulse width setting device (83), respectively, is transmitted but before a pulse $I_0$ which has the pulse peak value $I_P$(N) and the pulse width $\tau$ (N) as set next by a renewal of N is transmitted.

Accordingly, the welding system according to the second embodiment described above is capable of accurately and quickly restoring the molten globule that was lifted up in the pulse period to its original state. Therefore, the welding system can perform the separation of the molten globule and transfer it to the base metal in a regular manner. Furthermore, as this welding system applies the next pulse, it can variably control the base electric current according to the detected arc length and the target arc length in the prescribed base electric current period (i.e., the pulse interval) in such a manner that the lifted molten globule will be restored to its original target arc length according to the arc length of the molten globule as it is lifted up by the electromagnetic force in the pulse period.

Figure 9:
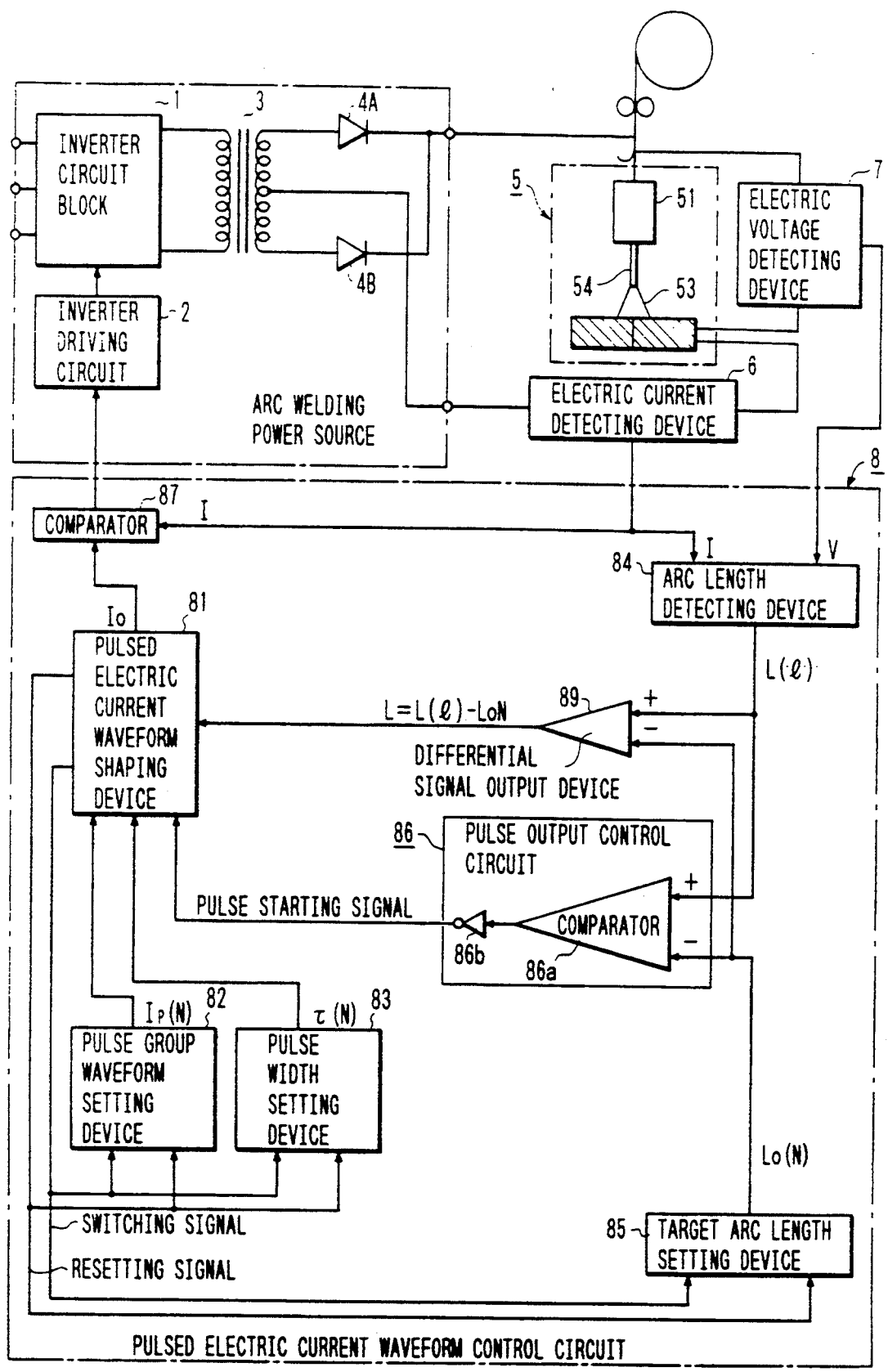
FIG. 9 through FIG. 11 illustrate the third embodiment and are drawings corresponding in the stated order to FIG. 1, FIG. 4, and FIG. 5, respectively.

Moreover, FIG. 9 illustrates one example of the third embodiment. In this of preferred embodiment, the welding system is different from that of the first embodiment because this welding system comprises a differential signal output device (89) according to the second embodiment in the pulsed electric current waveform control circuit (8). Furthermore, the system is capable of variably controlling the pulse interval (i.e., the base electric current period) according to the detected arc length and variably controlling the base electric current value according to the detected arc length, as shown in the configuration presented in FIG. 6. Thus this welding system controls the pulse interval (i.e., the base electric current period), with the pulsed electric current waveform shaping device (81). The pulsed electric current waveform shaping device (81) outputs the pulsed electric current $I_0$ according to the pulse starting signal. The pulsed starting signal is based on the detected arc length signal L (l) and the target arc length signal $L_0$ (N) and is generated from the pulse output control circuit (86). This welding system also controls the value of the base electric current according to the differential output $\Delta L$ calculated by the differential signal output device (89) by subtracting the target arc length signal from the detected arc length signal L (l).

Figure 10:
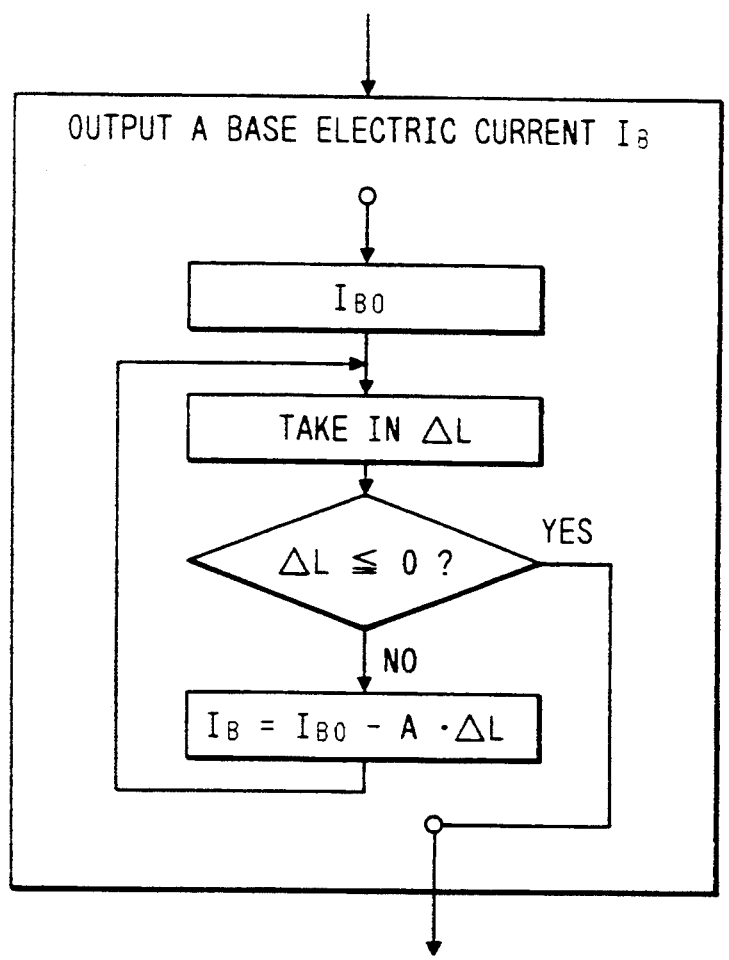

In this example of preferred embodiment, the flow chart for the operations of the pulsed electric current waveform shaping device (81) is approximately the same as the one given in FIG. 4. However, at the steps S4 and S10, the pulsed electric current waveform shaping device (81) receives the differential output $\Delta L$ from the differential signal output device (89) and regulates the base electric current $I_B$ to the value $I_{B0} - A \cdot \Delta L$ on the basis of the value of the reference base electric current $I_{B0}$, as shown in FIG. 10.

Figure 11:
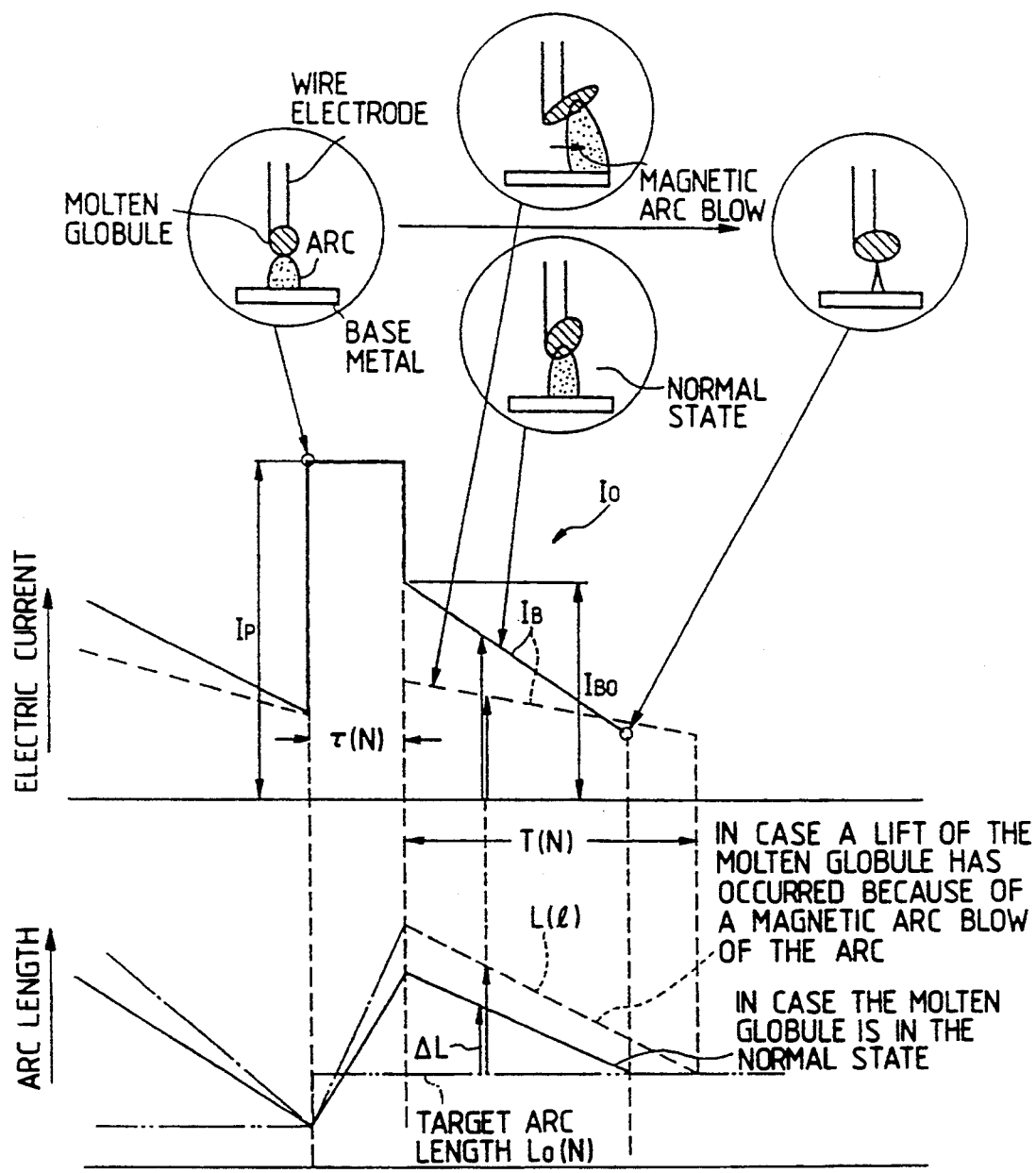

Therefore, according to the example this preferred embodiment, the welding system is capable of separating the molten globule and transferring it to the base metal with favorable responsiveness also the system is able to separate and transfer the molten globule in an arc length according to the target arc length. Thus, the welding system can separate of the molten globule and transfer it to the base metal in a regular manner since this welding system applies the next pulse only after it checks on the original state of the molten globule. The welding system checks the state of the molten global by controlling both the value of the base electric current $I_B$ and the pulse interval T (N) (i.e., the base electric current period) in such a manner that the arc length will correspond with the target arc length in the base electric current period. Therefore, the system can determine the state of the molten globule lifted up by the electromagnetic force due to a magnetic arc blow in the pulse period on the basis of the arc length L (N), as shown in the enlarged waveform chart given in FIG. 11.

Therefore, according to the third invention described in the above example, the welding system determines the state of the molten globule lifted up by the electromagnetic force in the pulse period on the basis of the arc length, controls the prescribed base electric current period (i.e., the pulse interval) in such a manner that the lifted molten globule will be restored to its original target arc length, and always applies the next pulse after confirming the original state of the molten globule. Therefore, the welding system can perform the welding process that is an arc length in approximately equal to the target arc length with favorable responsiveness and can perform the separation of the molten globule and its transfer to the base metal in a more regular manner.

Figure 12:
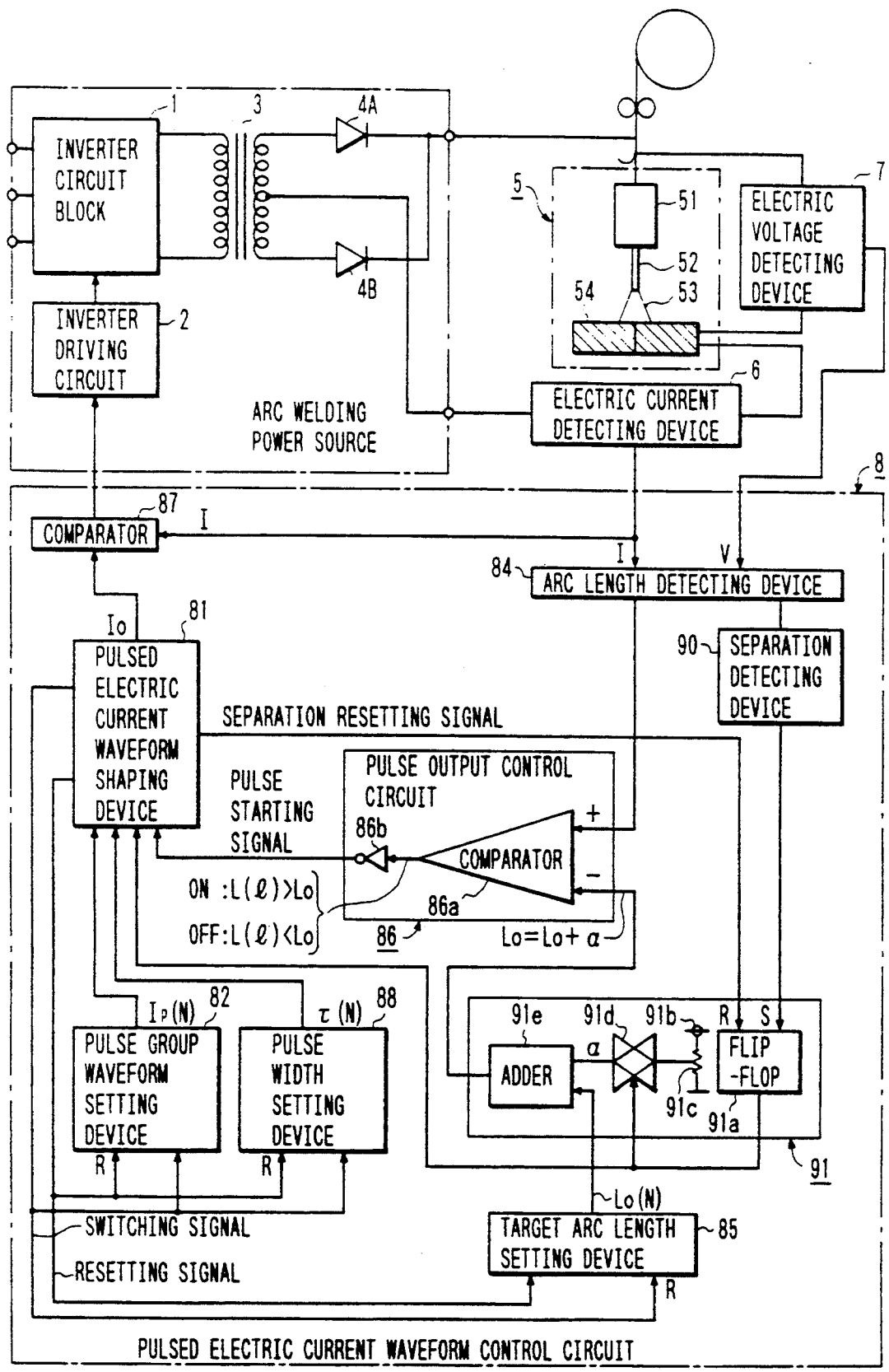
FIG. 12 through FIG. 14 illustrates the fourth embodiment.

Next, FIG. 12 is a configuration drawing illustrating the pulsed arc welding system in one example of preferred the fourth embodiment. In this FIG. 12, the the welding equipment is different from that of the example of the first embodiment because the pulsed electric current waveform control circuit (8) comprises a separation detecting device (90). The separation detecting device (90) obtains a detected separation signal $d_f$ on the molten globule on the basis of a detected arc length value L(l) determined the arc length detecting device (84). This separation detecting device (90) is capable of detecting the separation of the molten globule on the basis of a differential signal $d_f = d/dt\{L\ (l)\}$ on the arc electric voltage since the arc electric voltage L (l) = V − Vx that corresponds to the arc length as detected by the arc length detecting device (84) increases sharply at the time of the separation of the molten globule). Furthermore, this welding system comprises a correcting circuit (91), which generates and outputs a modified target arc length signal. The correcting circuit (91) creates the modified target arc length signal by adding a correcting signal to the target arc length signal. This target arc length signal is outputted from the target arc length setting device (85) during the pulse group sending period for a group of pulsed electric currents after the separation of the molten globule is detected by this separation detecting device (90).

The correcting circuit (91) comprises a flip-flop (91a), which is set according to the detected separation signal $d_f$ and is reset by a separation resetting signal transmitted from the pulsed electric current waveform shaping device (81) when the final pulse in the pulse group period for the group of pulsed electric currents is transmitted. The correcting circuit (90) further comprises a direct current power source (91b), a variable resistor (91c), an analog switch (91d), which is opened on the basis of the output from the flip-flop (91a), and an adder (91e). The adder (91e) transmits the target arc length signal $L_0$ (N) generated by the target arc length setting device (85) to the pulse output control circuit (86) in the ordinary time. The adder (91e) transmits a modified target arc length signal $L_0(N) = L_0(N) + \alpha$ to the pulse output control circuit (86). The modified target arc length signal $L_0(N)$ is transmitted when the separation detecting device (90) performs the separation and sending operations. Therefore that the signal $L_0(N)$ may be input to the arc length detecting device (84) so the arc length detecting device (84) can compare the signal $L_0(N)$ with the detected arc length signal L (l), the adder (91e) obtains the modified target arc length signal by adding the correcting signal $\alpha$, which is set by the variable resistor (91c), to the target arc length signal $L_0(N)$, which is generated by the target arc length setting device (85). The adder (91e) obtains the correcting signal $\alpha$ by way of the analog switch (91d), which is according to the output from the flip-flop (91a). Consequently, the correcting circuit (91) can control the timing of the output of the pulsed electric currents from the pulsed electric current waveform shaping device (81). This pulsed electric current waveform shaping device (81) renews the peak value $I_P(N)$, the pulse width $\tau(N)$, and the target arc length $L_0(N)$ corresponding to the next pulsed electric current. The pulsed electric current waveform shaping device (81) also outputs the switching signals to the pulse group waveform setting device (82), the pulse width setting device (83), and the target arc length setting device (85), in synchronization with the pulse starting signal when the pulsed electric current is sent out. Furthermore, the pulsed electric current waveform shaping device (81) controls the base electric current period transmitted at each pulse interval and at each pulsed electric current group interval for the individual pulses on the basis of the input of the pulse starting signal.

Next, the operations of the system of the preferred embodiment shown in FIG. 12 will be described with reference to the waveform chart given in FIG. 13 and the flow chart illustrating the operations of the pulsed electric current waveform shaping device (81) shown in FIG. 14.

Figure 13:
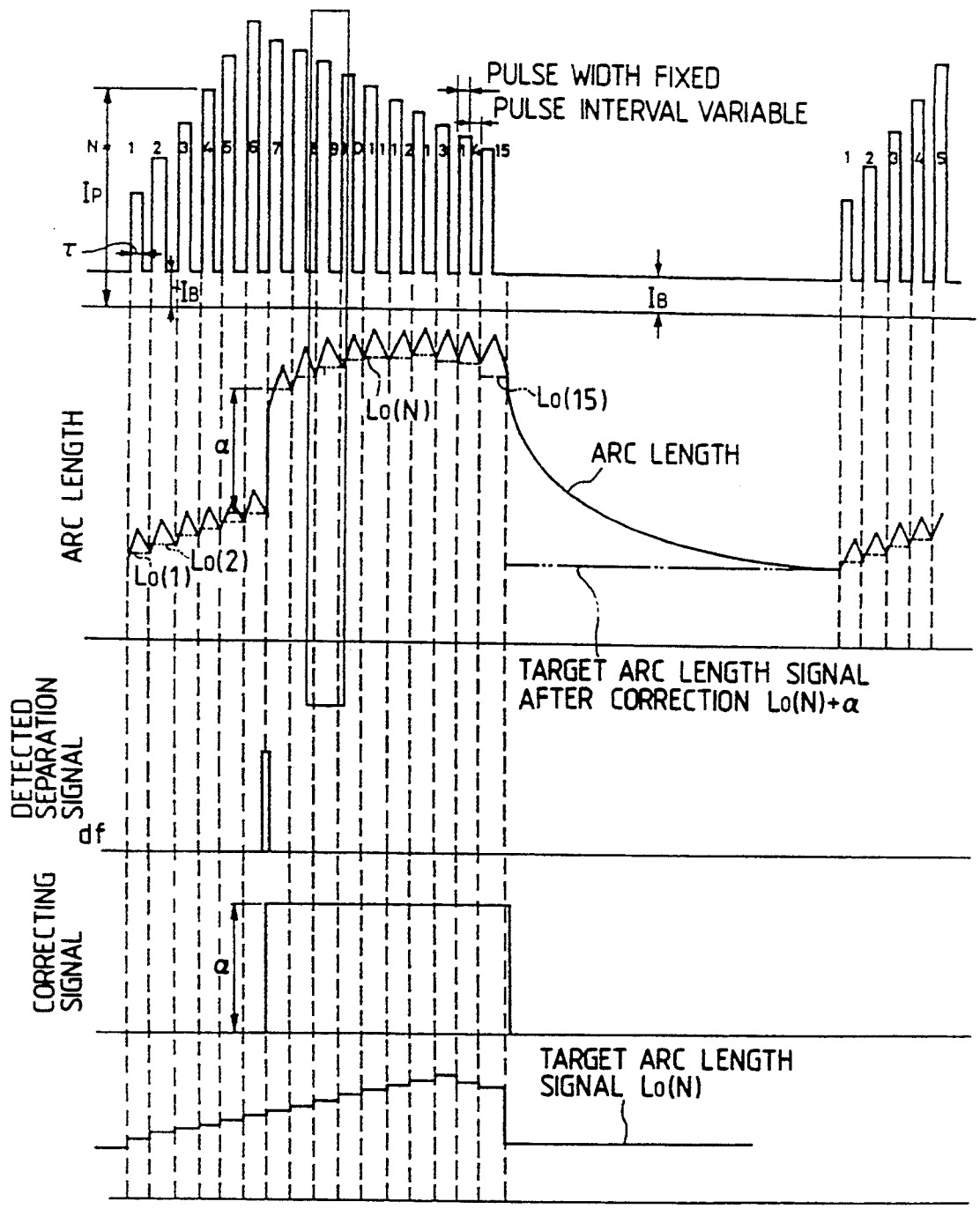
Figure 14:
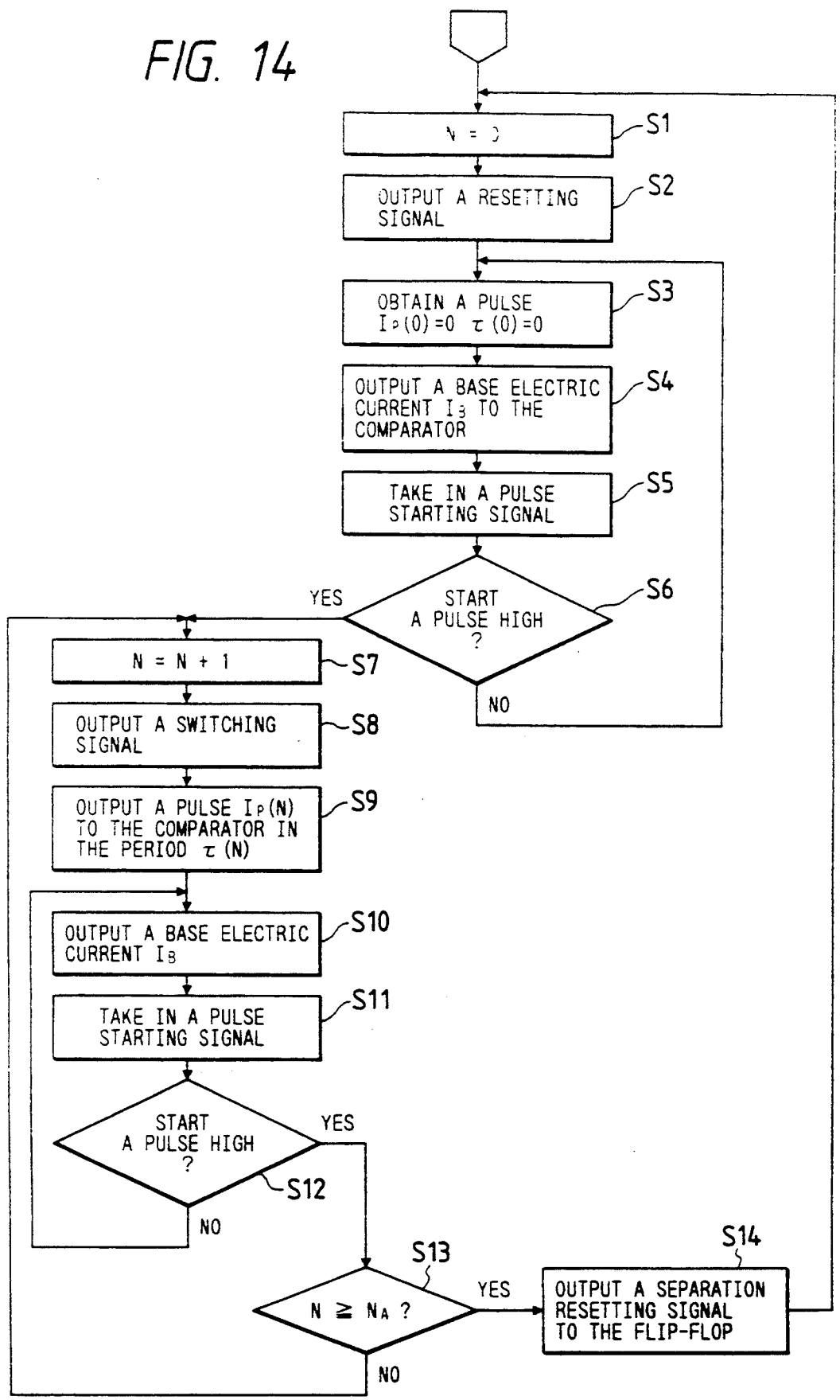

The pulsed electric current waveform shaping device (81) renews the repeating loop N, in the same manner as the system according to the first embodiment, transmits the groups of pulsed electric currents to the arc loading zone (5), as shown in FIG. 13, by repeating the steps S7 through S13 after executing the steps S1 through S6.

Figure 5:
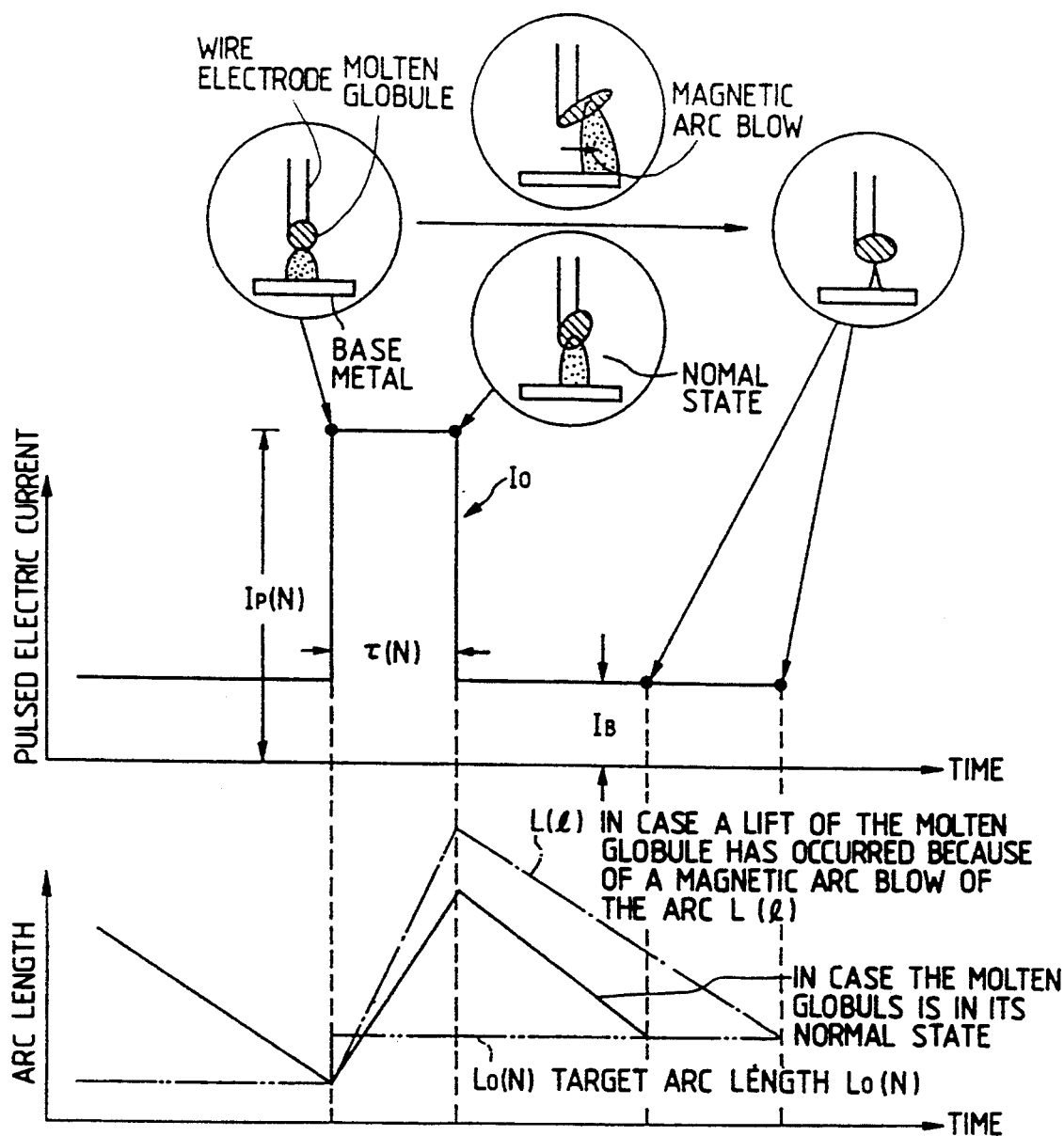

In this regard, the molten globule has not yet attained any sufficient growth while the repeating loop N has not exceeded N=6, as shown in FIG. 5, and the separation detecting device (90) has not detected any. Accordingly, the adder (91e) of the correcting circuit (91) transmits the target arc length signal $L_0(N)$ from the target arc length setting device (85), to the pulse output control circuit (86) as an input signal to be compared with the detected arc length signal L (l) without adding any correcting signal $\alpha$ to the target arc length signal when the separation of the molten globule is detected by the separation detecting device (90), the correcting circuit (91) generates the correcting signal $\alpha$, by receiving the detected separation signal $d_f$. As a result, the correcting circuit (91) changes the target arc length signal $L_0(N)$ according to the separation time by furnishing the pulse output control circuit (86) with a new modified target arc length signal $L_0(N) = L_0(N) + \alpha$. The correcting circuit (91) creates the modified signal by adding the correcting signal $\alpha$ to the target arc length signal $L_0(N)$ generated by the target arc length setting device (85). Consequently, the modified target arc length signal $L_0(N)$ is outputted to the pulse output control circuit (86) from the time of the separation to the time when the final pulse is transmitted in the pulse group period for the group of pulsed electric currents (for example, N=15 in FIG. 13). In other words, the modified target arc length signal $L_0(N)$ is outputted until the separation resetting signal is transmitted from the pulsed electric current waveform shaping device (81). The pulse output control circuit (86) compares the modified signal with the detected arc length signal L(l). This modification of the target arc length signal reduces the fluctuations in the separation time of the next group of pulsed electric currents.

When the repeating loop is renewed in this manner, (for example, when $N_A = 15$ is attained at the step S13) the repeating loop sets a separation resetting signal in the flip-flop (91a) in the correcting circuit (91) (step S14) and returns to the step S1.

Therefore, according to the fourth embodiment in the example of preferred embodiment given above, the welding system improves the performance of the welding process because this welding system is capable of eliminating the fluctuations in the separation time, except at the time of the occurrence of an external disturbance, is also capable of reducing the fluctuations at the next separation time, since the target arc length signal for the group of pulses after the separation will always be as prescribed. This is true because the system compares the value obtained by the addition of a predetermined correcting signal value $\alpha$ to the target arc length signal $L_0(N)$ with the signal value L (l) from the arc length detecting device on the basis of the detected separation of the molten globule. The welding system changes the target arc length signal value only after the confirmation of the separation time for the molten globule, even if fluctuations should occur in the separation of the molten globule because of a change in the position of the welding torch or a deformation the shape of the base metal.

Figure 15:
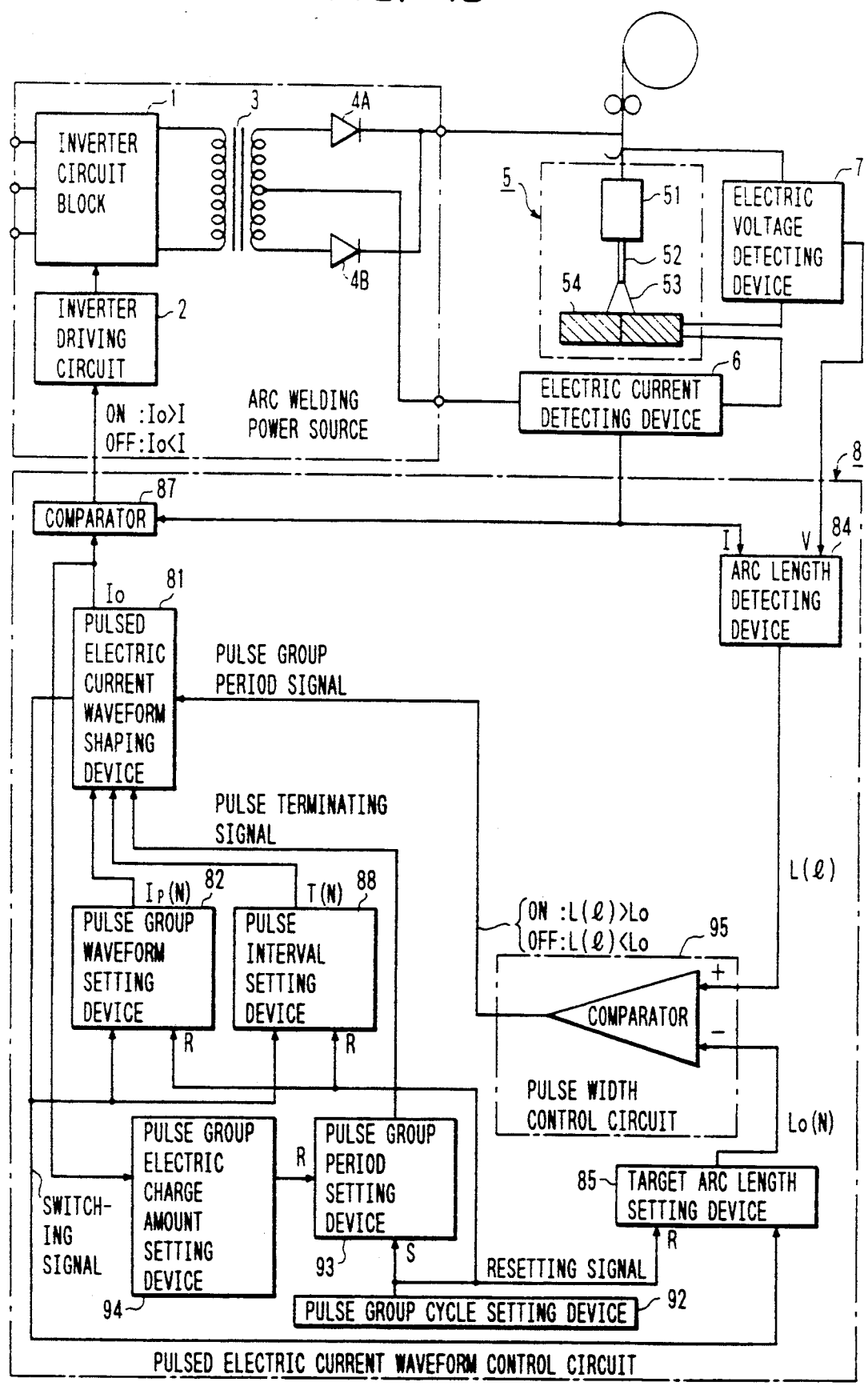
FIG. 15 through FIG. 19 illustrate the fifth embodiment.

FIG. 15 illustrates the pulse welding system in one example of the fifth embodiment. The construction of this welding system differs from the second embodiment because the pulse width setting device (83) and the differential signal output device (89) have been eliminated from this construction. However, the pulsed electric current waveform control circuit (8) comprises, as a new parts of its construction, a pulse group cycle setting device (92), which is formed with pulse group cycles $C_B$ set therein, a pulse group period setting device (93), and a pulse group electric charge amount setting device (94). The pulsed electric current waveform control circuit (81) also comprises a pulse width control circuit (95) which is comprised of a comparator. The comparator compares the detected arc length value L (l) determined by the arc length detecting device (84) and the target arc length $L_0(N)$ set by the target arc length setting device (85). The comparator output an ON pulse terminating signal when L (l) > $L_0(N)$ and output an OFF pulse terminating signal, L (l) < $L_0(N)$. This pulse width control circuit (95) controls the pulse width of the pulses outputted on the basis of the pulse terminating signals when the detected arc length value L (l) has attained the target arc length $L_0(N)$.

Figure 16:
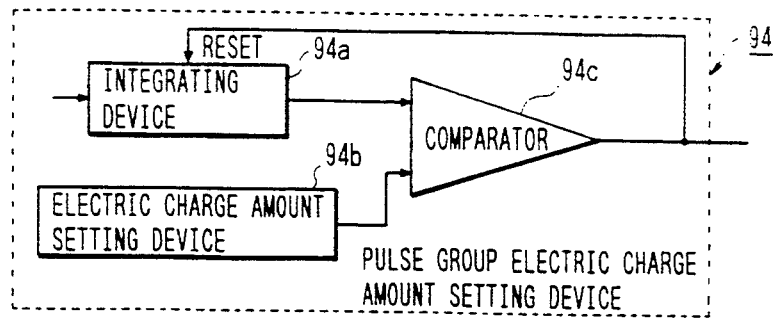

Then, the pulse group electric charge amount setting device (94) comprises an integrating device (94a), which integrates the group of pulsed electric currents output from the pulsed electric current waveform shaping device (81), an electric charge amount setting device (94b), in which the prescribed amounts of electric charge are to be set, and a comparator (94c). The comparator compares the integrated value found by the integrating device (94a) and the set electric charge amount determined by the electric charge amount setting device (94b) and sends out a resetting signal to the pulse group period setting device (93) when the integrated value has attained the set electric charge amount, as shown in FIG. 16. Thus, the welding system is designed to maintain regularity in the growth and separation of the molten globule by maintaining the amount of pulse group electric charge in the pulse group period X constant at all times.

Figure 17:
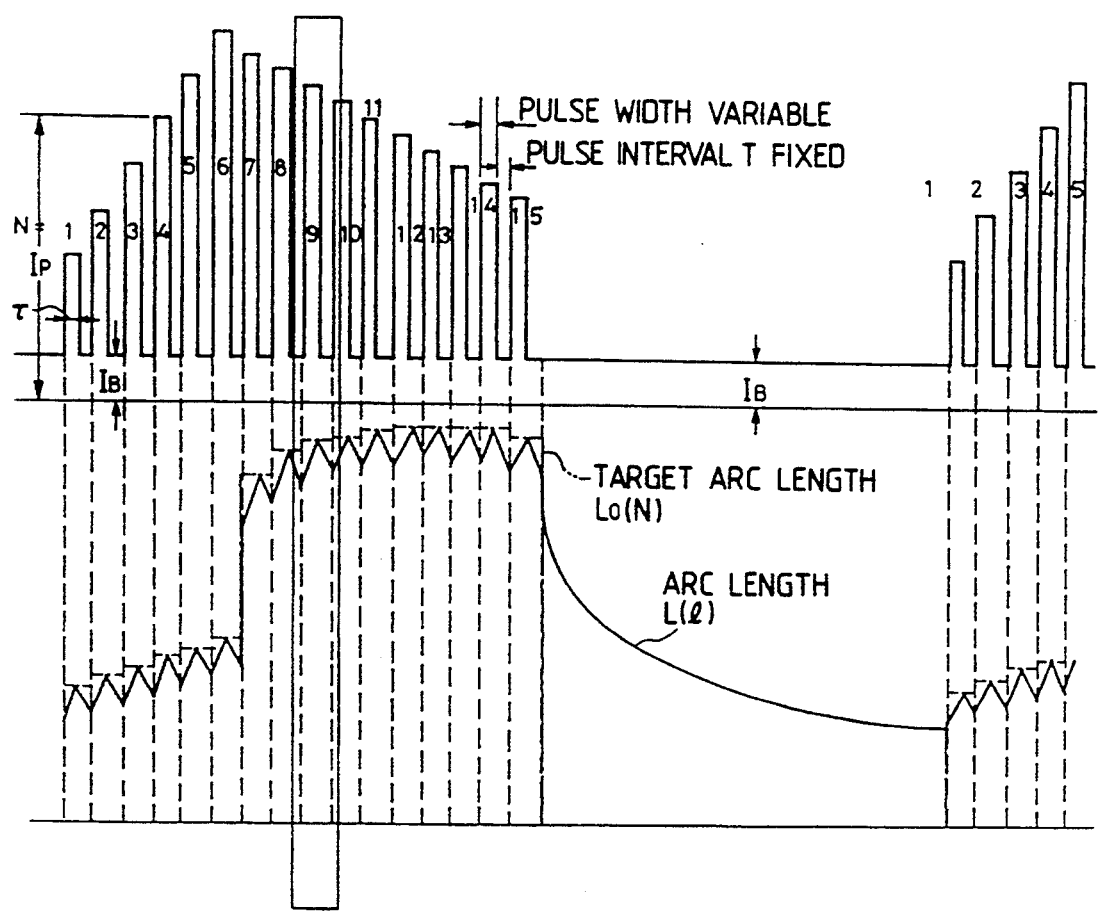

Next, the operations of the welding system in this preferred embodiment are described with reference to the waveform charts shown in FIG. 17 and FIG. 19 and the flow chart illustrating the operations of the pulsed electric current waveform shaping device (81) in FIG. 18. First, as shown in FIG. 17, the pulse group waveform setting device (82) and the pulse interval setting device (88) respectively contain the peak values $I_P$ (N) and the pulse intervals T (N) set therein for the individual pulsed electric currents forming the groups of pulsed electric currents for example, for N=1 through 15. Similarly, the target arc length setting device (85) contains the signals $L_0$ (N) set therein which corresponds to the plural number of target arc lengths for N=1 through 15.

In the FIG. 15, the pulse group period setting device (93) is first set according to the output from the pulse group cycle setting device (92). Also, the pulse group waveform setting device (82), the pulse interval setting device (88), and the target arc length setting device (85) are reset and initalized (i.e., the state with N=1). At this time, the pulsed electric current waveform shaping device (81) performs its operation on the basis of the pulse group period signal output from pulse group period setting device (93).

Figure 18:
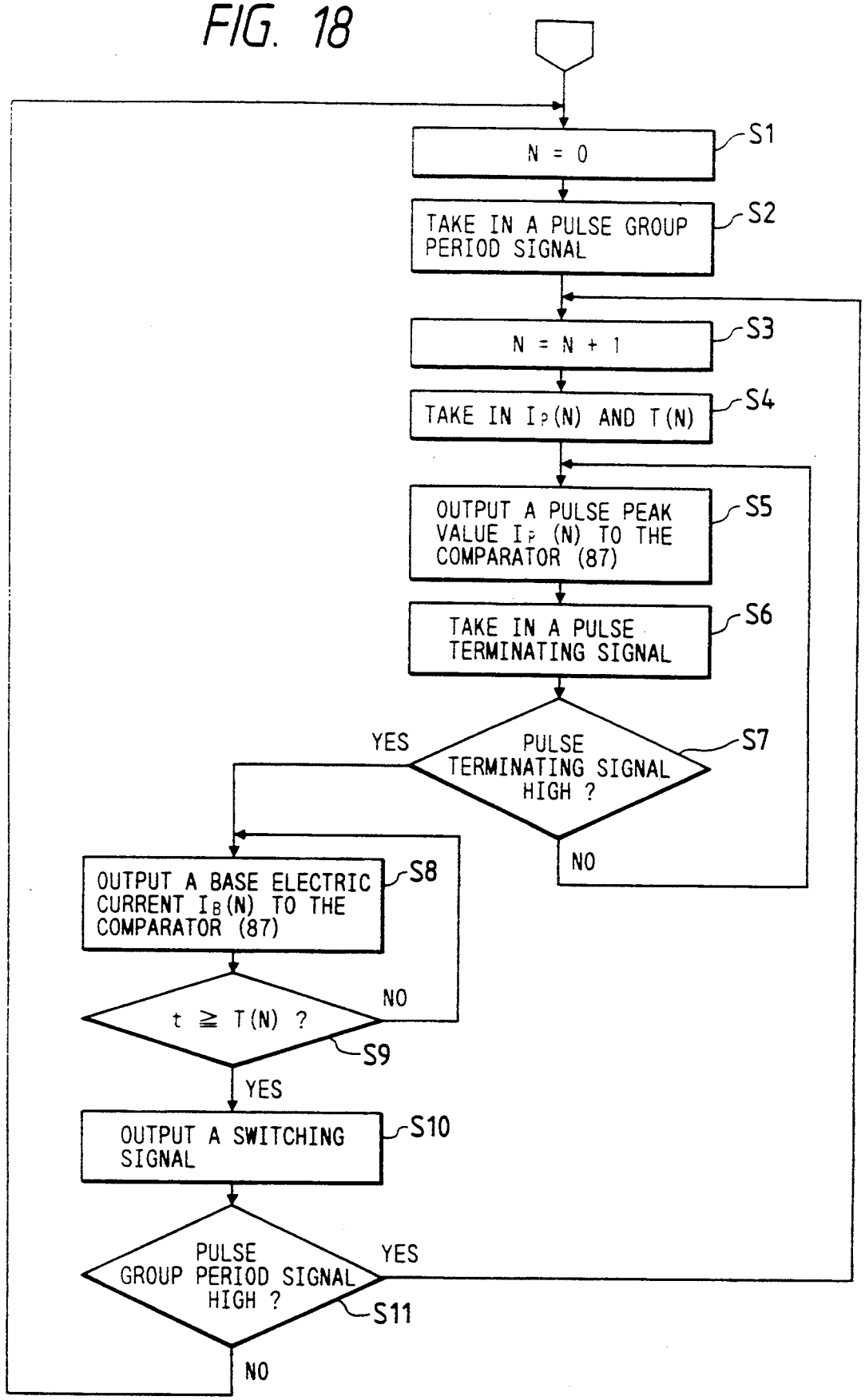
Figure 19:
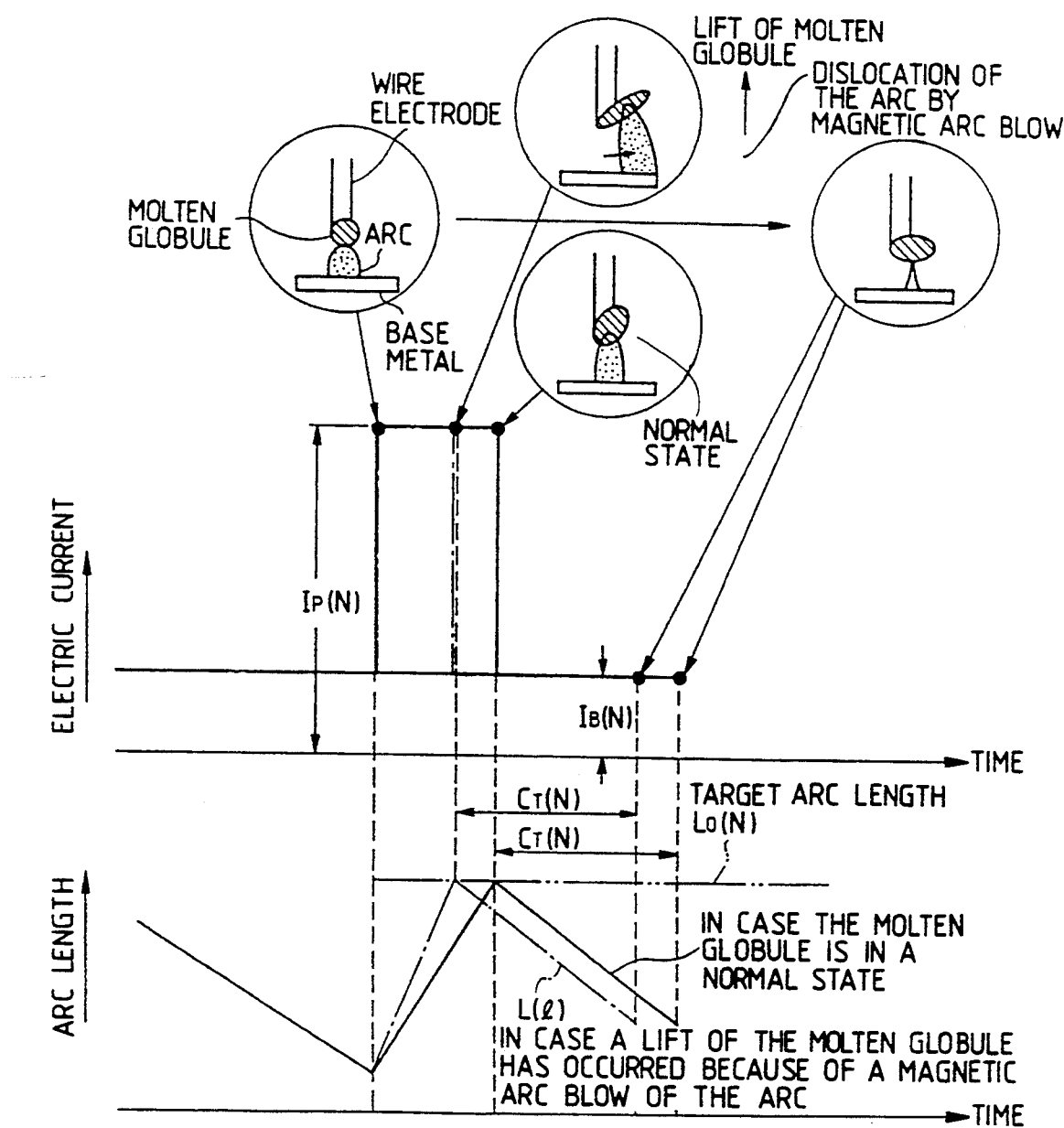

The pulsed electric current waveform shaping device (81), as shown in FIG. 18, initializes the repeating loop N (i.e., N=1) on the basis of the input from the pulse group period signal (steps S1 through S3). The pulsed electric current waveform shaping device (81) obtains the pulse peak value $I_P$ (1) and the pulse interval T (1) from the pulse group waveform setting device (82) and the pulse interval setting device (88), respectively, and outputs the pulse at the peak value $I_P$(1) to the comparator (87).

After the pulsed electric current $I_0$ ($I_B$ in this case) transmitted to the comparator (87), a pulsed arc discharge (53) is formed between the wire electrode (52) and the base metal (54). Consequently, the base metal (54) and the tip of the wire electrode (52) are fused by the pulsed arc discharge (53) in the same manner as in the examples of preferred embodiment of the individual inventions described hereinabove.

The arc length detecting device (84) detects the arc length L (l) according to the signals I and V detected by the electric current detecting device (6) and the electric voltage detecting device (7), respectively and outputs the detected signals I and V to a pulse width control circuit (95). The pulse width control circuit (95) compares the arc length L (l) with the target arc length $L_0$ (1) signal which the circuit receives from the target arc length setting device (85). When L (l)>$L_0$, the pulse width control circuit (95) outputs the HIGH pulse terminating signal to the pulsed electric current waveform shaping device (81).

The pulsed electric current waveform shaping device (81) calculates the prescribed base electric current $I_B$ from a built-in base electric current output device (not illustrated in the Figure). The prescribed base electric current $I_B$ is calculated by inputting a pulse terminating signal (steps S6 and S7) and continually conducting the base electric current $I_B$ until the set pulse interval T (N) is attained (steps S8 and S9). Then, by sending a switching signal to the pulse group waveform setting device (82), the pulse interval setting device (88), and the target arc length setting device (85) (the step S10), the pulsed electric current waveform shaping device (81) renews the repeating loop N. Steps S1 through S11 are repeated until the pulse group period signal attains a low level (the step S11).

Thus, in the preferred embodiment above, the welding system prevents the phenomenon of a lift of the molten globule due to a magnetic arc blow of the arc. Thus, the welding system maintains the regularity in the separation of the molten globule. The welding system also controls the pulse intervals according to the detected arc length by continually furnishing the flow of the pulse $I_0$, which has the pulse peak value $I_P$(N) set by the pulse group waveform setting device (82), until the detected arc length signal L (l) attains the value of the target arc length signal $L_0$ (N). After the target arc length value is attained, the welding system transmits the base electric current $I_B$ in the period of the pulse interval T (N) that is set with the pulse interval setting device (88), as shown in the enlarged waveform chart given in FIG. 19.

In other words, the system according to the fifth embodiment determines the lift of the molten globule by the electromagnetic force in the pulse period according to the detected arc length signal corresponding to the arc length. Thus, with the limit of the lift in the pulse period set in the target arc length signal, the system stops the pulse that furnishes the flow of the base electric current when the detected arc length signal becomes equivalent to the target arc length signal. Consequently, the system can prevent any irregular lift in the molten globule by the pulses and, as the result, can perform the separation of the molten globule and its transfer to the base metal in a regular manner.

Figure 20:
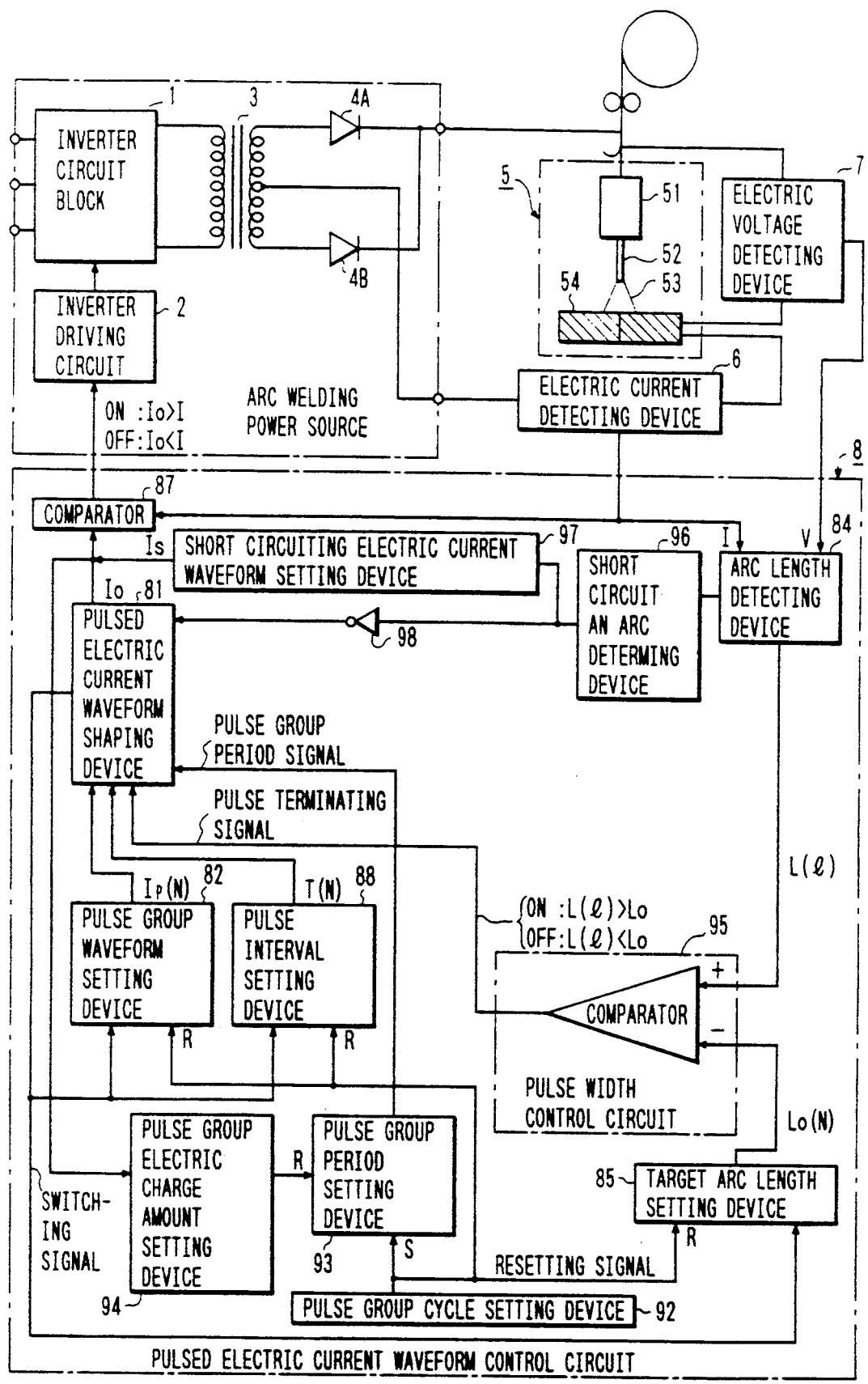

FIG. 20 illustrates one example of the sixth embodiment. The pulsed electric current waveform control circuit (8) comprises in addition to the devices of the fifth embodiment, a short circuit and arc determining device (96), which determines a short circuit period and an arc period according to the signal detected by the arc length detecting device (84), short circuiting electric current waveform shaping device (97), which sets the short circuiting electric current according to a short circuit determining signal, and an inverter (98), which obtains an arc determining signal by inverting the short circuit determining signal. The short circuit electric current flows during the short circuit period.

Figure 21:
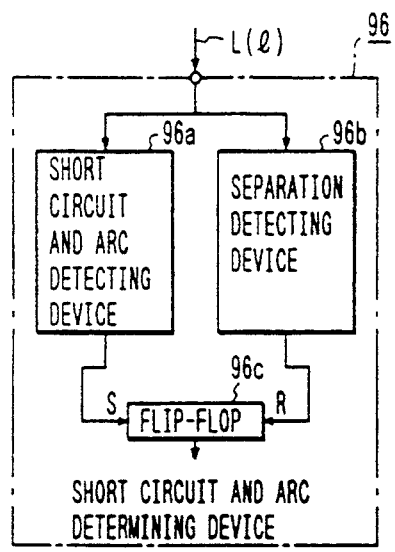
FIG. 21 (a) through FIG. 21 (d) are circuit diagrams for the short circuit and arc determining device and the short circuit electric current waveform shaping device and waveform charts for the individual parts of these devices.
Figure 21:
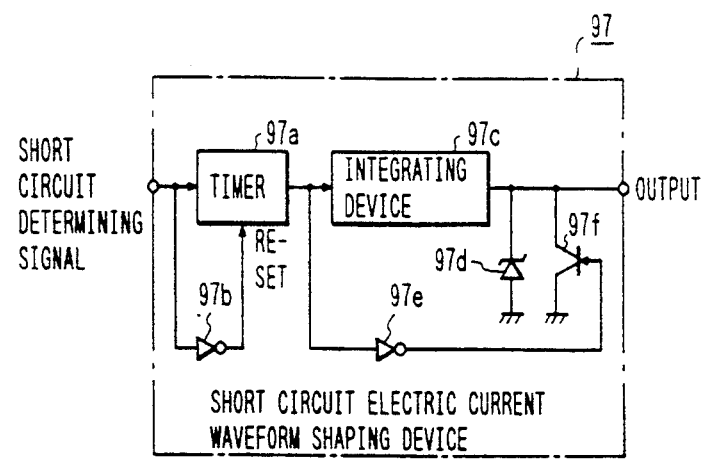

As shown in FIGS. 21 (a), the short circuit and arc determining device (96) comprises a short circuit detecting device (96a), which transmits a short circuit detecting signal when the detected arc length signal L (l) is at or below the prescribed value, a separation detecting device (96b), which detects the separation of the molten globule, and a flip-flop (96c), which outputs a short circuit determining signal. The flip-flop is set by the short circuit detecting signal generated by the short circuit detecting device (96a) and reset by the separation detecting signal generated by the separation detecting device (96b).

Figure 21C:
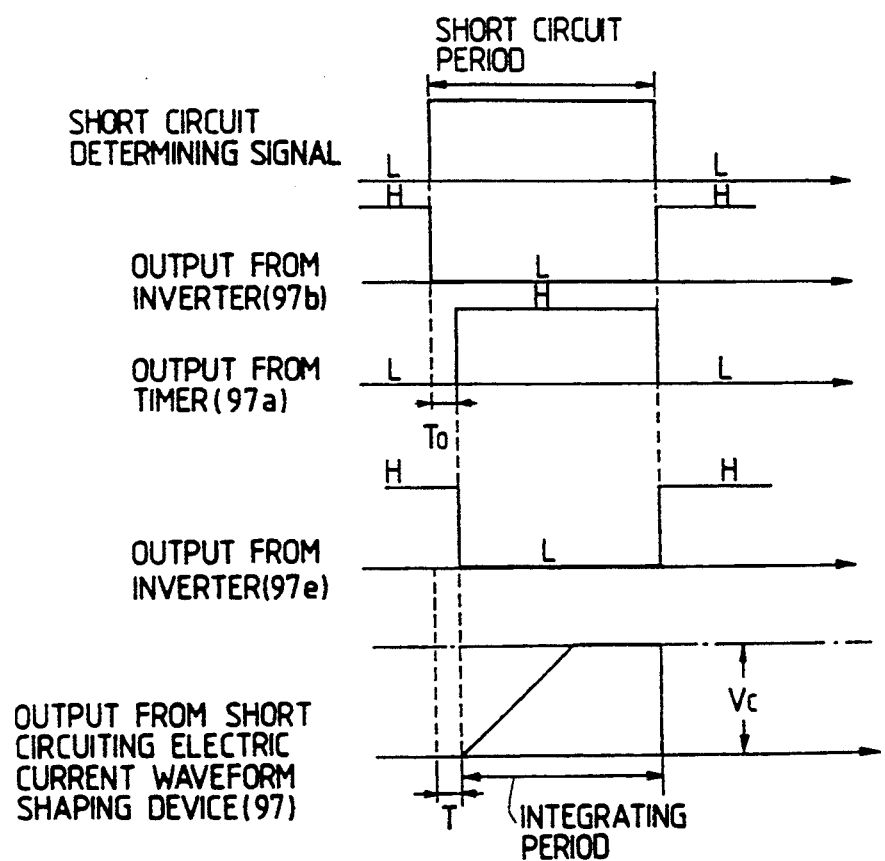

As shown in FIGS. 21(b) and 21(c), the short circuiting electric current waveform shaping device (97) comprises a timer (97a), which transmits its output according to the input of a short circuit determining signal after a prescribed time $T_0$, on an inverter (97b), which resets the timer (97a) by an inverted signal obtained by inverting the short circuit determining signal, an integrating device (97c), which performs an integrating operation on the basis of the output from the timer mentioned above, a Zener diode (97d), which maintains the output from the integrating device at a constant voltage value $V_c$, an inverter (97e), which inverts output of the timer (97a) and a transistor (97f), which, operates as a switch that is controlled by the output from the inverter (97e). In addition, the transistor (97f) controls the transmission of the output of the integrating device. As shown in FIG. 21 (c), this short circuiting electric current waveform shaping device (97) furnishes the comparator (87) with the short circuiting electric current waveform of the individual parts.

The pulsed electric current waveform shaping device (81) furnishes the comparator (87) with a pulsed arc electric current when the arc determining signal has changed from LOW to HIGH. The determining signal changes from LOW to HIGH when the short circuit determining signal generated by the short circuit and arc determining device (96) changes from HIGH to LOW. The short circuit determining signal changes from LOW to HIGH when the detected electric voltage in the electric voltage detecting device (7) rises. The detected electric voltage rises when an arc occurs when the molten globule at the tip of the wire electrode (52) burns out and short circuiting electric current is conducted thereto.

Next, the operations of the pulsed electric current waveform shaping device (81) of the welding system in this preferred embodiment are described with reference to the waveform chart shown in FIG. 22 and the flow chart given in FIG. 23. First, in this short circuiting transfer arc welding system, the tip of the wire electrode (52) is short-circuited to the base metal (54) when the switch of the power source (not shown) is turned on. In this initial state, the short circuit and arc determining device (96) outputs a short circuit determining signal. Also, the pulsed electric current waveform shaping device (81), which outputs out an arc electric current, remains in a non-operating state until the arrival of the inverted signal of the short circuit determining signal (i.e., the arc determining signal) meanwhile, the short circuiting electric current waveform shaping device (97) outputs the short circuiting electric current $I_s$ to the comparator (87) on the basis of the short circuit determining signal (steps S1 through S6).

Consequently, comparator (87) outputs an ON signal to the inverter driving circuit (2), and the inverter drawing circuit (2) outputs an inverter driving signal to the inverter circuit block (1) and drives the inverter. With the inverter being thus driven, an alternating current waveform after its shaping is output to the high frequency transformer (3). The signal output from the high frequency transformer (3) is further processed for its rectification into a direct current waveform by the high frequency diodes (4A) and (4B). The electric current waveform $I_s$ is outputted to the weld zone, (i.e., the weld zone (5). This short circuiting electric current burns out the molten globule growing at the tip of the wire electrode (52) and transfers the molten globule onto the base metal (54).

At this time, the short circuit and arc determining device (96) stops outputting the short circuit determining signal (i.e., an arc determining signal) on the basis of the output from the arc length detecting device (84) step S6). Consequently, the short circuiting electric current waveform shaping device (97) stops sending out the short circuiting electric current $I_s$, and the operation shifts from the short circuit period to the arc period.

Next, the pulsed electric current waveform shaping device (81) receives an inverted signal of the short circuit determining signal (i.e., the arc determining signal) and, sets the repeating loop N at N=1 (step S7). Then, obtaining the pulse peak value $I_P(1)$ and the pulse interval T (1) from the pulse group waveform setting device (82) and the pulse interval setting device (88), respectively, the pulsed electric current waveform shaping device (81) outputs the pulse for the peak value $I_P(1)$ to the comparator (87) (steps S8 and S9).

When the pulsed electric current $I_0$ is outputted from the pulsed electric current waveform shaping device (81) to the comparator (87), a pulsed arc discharge (53) is formed between the wire electrode (52) and the base metal (54), in the same manner as the preferred embodiments described hereinabove. Consequently, the base metal (54) and the tip of the wire electrode (52) are fused by the pulsed arc discharge (53).

The arc length detecting device (84) detects the arc length L (l) on the basis of the signals I and V detected by the electric current detecting device (6) and the electric voltage detecting device (7), respectively. Then, the arc length detecting device (84) outputs the value of the arc length L (l) to the pulse width control circuit (95). Then, the pulse width control circuit (95) receives the signal indicating the target arc length $L_0(1)$ from the target arc length setting device (85) and compares these two values. If, L (l)>$L_0$, the pulse width control circuit (95) outputs the HIGH pulse terminating signal to the pulsed electric current waveform shaping device (81).

The pulsed electric current waveform shaping device (81) receives the pulse terminating signal (steps S10 and S11) and determines the prescribed base electric current $I_B$ from a base electric current output device (not shown). The pulsed electric current waveform shaping device (81) continues conducting the base electric current until the set pulse interval T (N) is attained (steps S12 and S13). Thereafter, the pulsed electric current waveform shaping device (81) outputs switching signals to the pulse group waveform setting device (82), the pulse interval setting device (88), and the target arc length setting device (85) mentioned above (the step S14). Thus, the pulsed electric current waveform shaping device (81) renews the repeating loop N and continues to execute steps S7 through S15 until the pulse group period signal assumes its low level (step S15). After this arc period, the pulsed electric current waveform shaping device (81) returns to the step S1 and shifts to the short circuit period, in which the device (81) repeats steps S1 through S5.

Accordingly, the sixth embodiment describes a welding system that is capable of determining the short circuit period and furnishing a flow of a short circuiting electric current in the short circuit period. As a result, the welding system can accurately perform a welding process not only in the pulsed arc welding process but also in the short circuiting transfer arc welding process, and separates the molten globule with a short circuit with smaller fluctuations in the short circuit period and the arc period and with smaller fluctuations in the uniformity of the welding beads and in the depth of the weld penetration.

Figure 24:
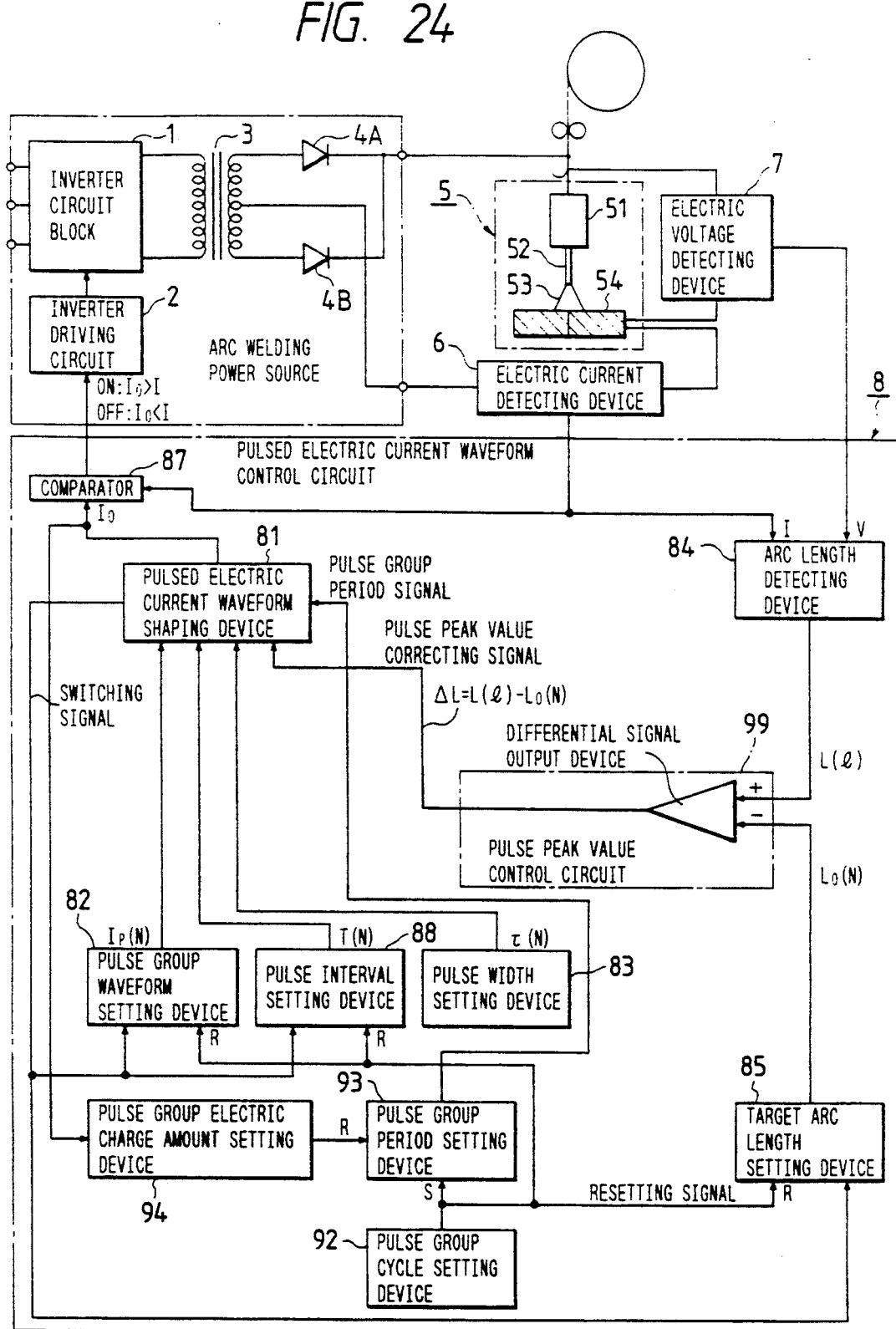
FIG. 24 and FIG. 25 illustrate the seventh embodiment and are a configuration drawing in one example of the seventh embodiment and a flow chart of the operations in the pulsed electric current waveform shaping device, respectively.

FIG. 24 illustrates one example the seventh embodiment. A difference between the seventh embodiment and the pulsed arc welding equipment of the fifth embodiment is that the pulse width control circuit (95) has been eliminated. Another difference is that the pulsed electric current waveform control circuit (8) of the seventh embodiment comprises a pulse width setting device (83), which is formed by storing the individual pulse width $\tau$ (N) therein for the group of pulses, and a differential signal output device, which determines the differential output $\Delta L$. The differential output $\Delta L$ is the difference between the arc length value L (l), which is output from the arc length detecting device (84), and the target arc length $L_0$ (N), which is output from the target arc length setting device (85). The pulsed electric current waveform control circuit (8); further comprises a pulse peak value control circuit (99), which corrects the pulse peak value $I_P(N)$. The pulse peak value $I_P(N)$ is set by the pulse group waveform setting device (82) according to the differential output $\Delta L$ by sending out the differential output $\Delta L$ as a pulse peak correcting signal to the pulsed electric current waveform shaping device (81). Then, the pulsed electric current waveform shaping device (81) receives the setting signals from the individual setting devices and determines the pulsed electric current $I_0$. The pulsed electric current waveform shaping device (81) also controls the pulse peak value according to the differential output $\Delta L = L$ (l)$-L_0$ (N) which is the difference between the detected arc length value L(l) and the target arc length $L_0$ (N). The arc length detecting device (84) detects the arc length value signal L (l) which corresponds to the arc length between the tip of the wire electrode and the base metal according to the value I and the value V detected by the electric current detecting device (6) and the electric voltage detecting device (7), respectively. The target arc length setting device (85) contains the target arc lengths $L_0$ (N) set that correspond to the individual peak values $I_P(N)$ for the pulses to be output.

Next, the operations of the operations of the pulsed electric waveform shaping device (81) of the welding system in this preferred embodiment are described with reference to the flow chart in FIG. 25.

Figure 25:
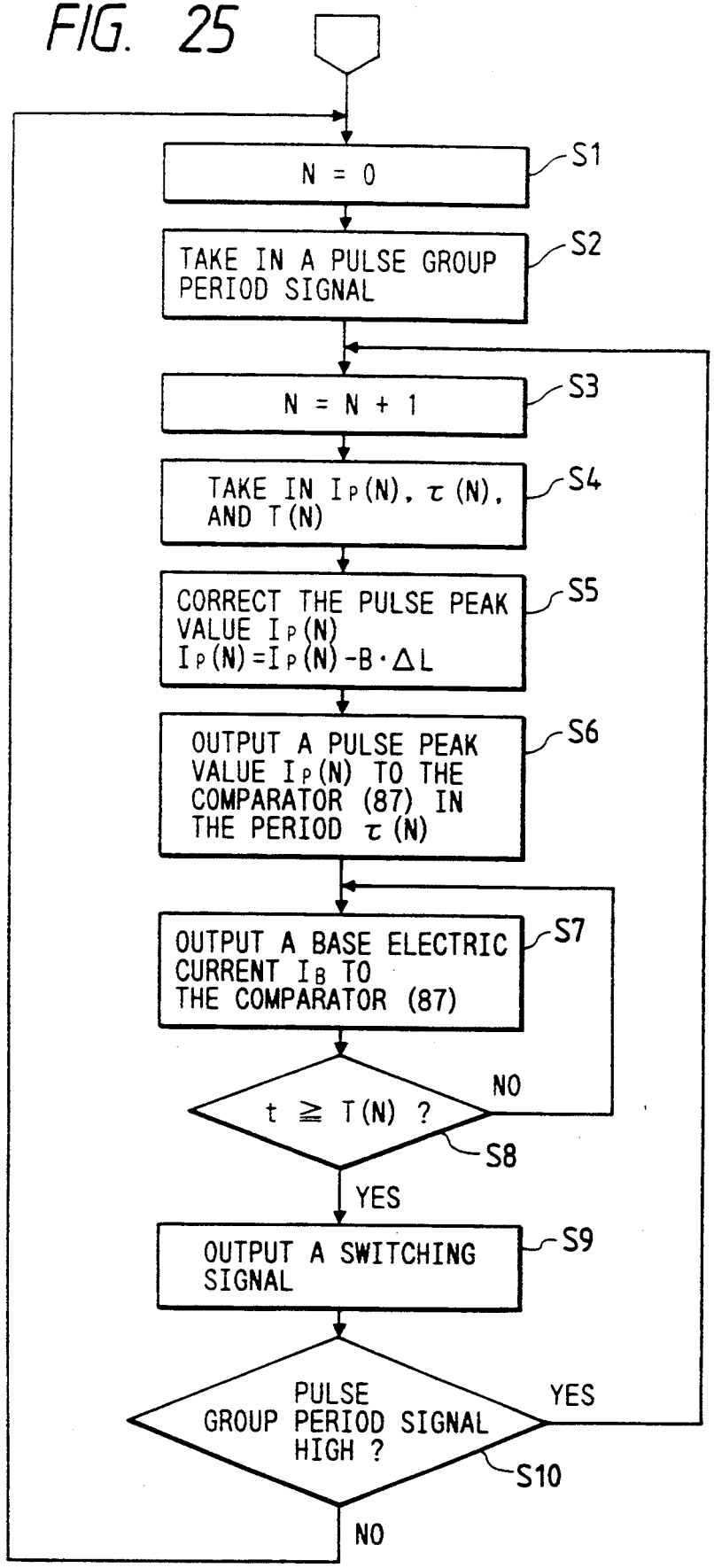

As shown in FIG. 25, the pulsed electric current waveform shaping device (81) is first initialized by setting the repeating loop N at N=1 of the input via the pulse group period signal (steps S1 through S3). The pulsed electric current waveform shaping device (81) then obtains the pulse peak value $I_P(1)$, the pulse width $\tau$ (1), and the pulse interval T (1) from the pulse group waveform setting device (82), the pulse width setting device (83), and the pulse interval setting device (88), respectively, (step 54). At step S5, the pulsed electric current waveform shaping device (81) also corrects the pulse peak value $I_P$ (1) according to the equation, $I_P$ (N)=$I_P$ (N)$-$B$\cdot\Delta L$ (wherein, B expresses a proportional constant $\Delta L$ expresses the differential output, which is sent out from the pulse peak value controlling circuit (99)). Specifically, the pulsed electric current waveform shaping device (81) corrects the pulsed electric current value $I_P$ in the pulse period with the differential output $\Delta L$ which indicates the difference between the detected arc length signal L (l) and the target arc length signal $L_0$ (N). The pulsed electric current waveform shaping device (81) then outputs this corrected pulse peak value $I_P(1)$ to the to the comparator (87) during the period $\tau$ (1) (step S6).

With the pulsed electric current $I_0$ output from the pulsed electric current waveform shaping device (81) to the comparator (87), a pulsed arc discharge (53) is generated between the wire electrode (52) and the base metal (54) as in the examples of the preferred embodiment above, and the pulsed arc discharge (53) fuses the base metal (54) and the tip of the wire electrode (52) together.

Next, the pulsed electric current waveform shaping device (81) obtains the prescribed base electric current $I_B$ (N) from the built-in base electric current output device (not shown) and continually conducts the base electric current until the prescribed pulse interval T (N) is attained (steps S7 and S8). Thereafter, the pulsed electric current waveform shaping device (81) outputs switching signals to the pulse group waveform setting device (82), the pulse width setting device (83), the pulse interval setting device (88), and target arc length setting device (85) (step S9). As a result, the pulsed electric current waveform shaping device (81) renews the repeating loop N, and then continues steps S1 through S10 until the pulse group period signal assumes a low level (step S10).

In this manner, the example of preferred embodiment above corrects the pulse peak value $I_P$ (N) set in the pulse group waveform setting device (82) the differential output $\Delta L$ found between the detected arc length signal L (l) and the target arc length signal $L_0$(N). Thus, the welding system prevents the molten globule from being lifted by the magnetic arc blow of the arc and thus maintains the regularity in the separation of the molten globule.

Therefore, according to the seventh embodiment in the example of preferred embodiment given above, the equipment performs control over for the correction made of the peak value of the pulsed electric current $I_P$ in the pulse period on the basis of the signal indicating the difference between the detected arc length signal and the target arc length signal. The welding system also determines by the detected arc length signal, the lift of the molten globule by the electromagnetic force at work in the pulse period. Therefore, this system can therefore control the arc length with favorable responsiveness.

Figure 26:
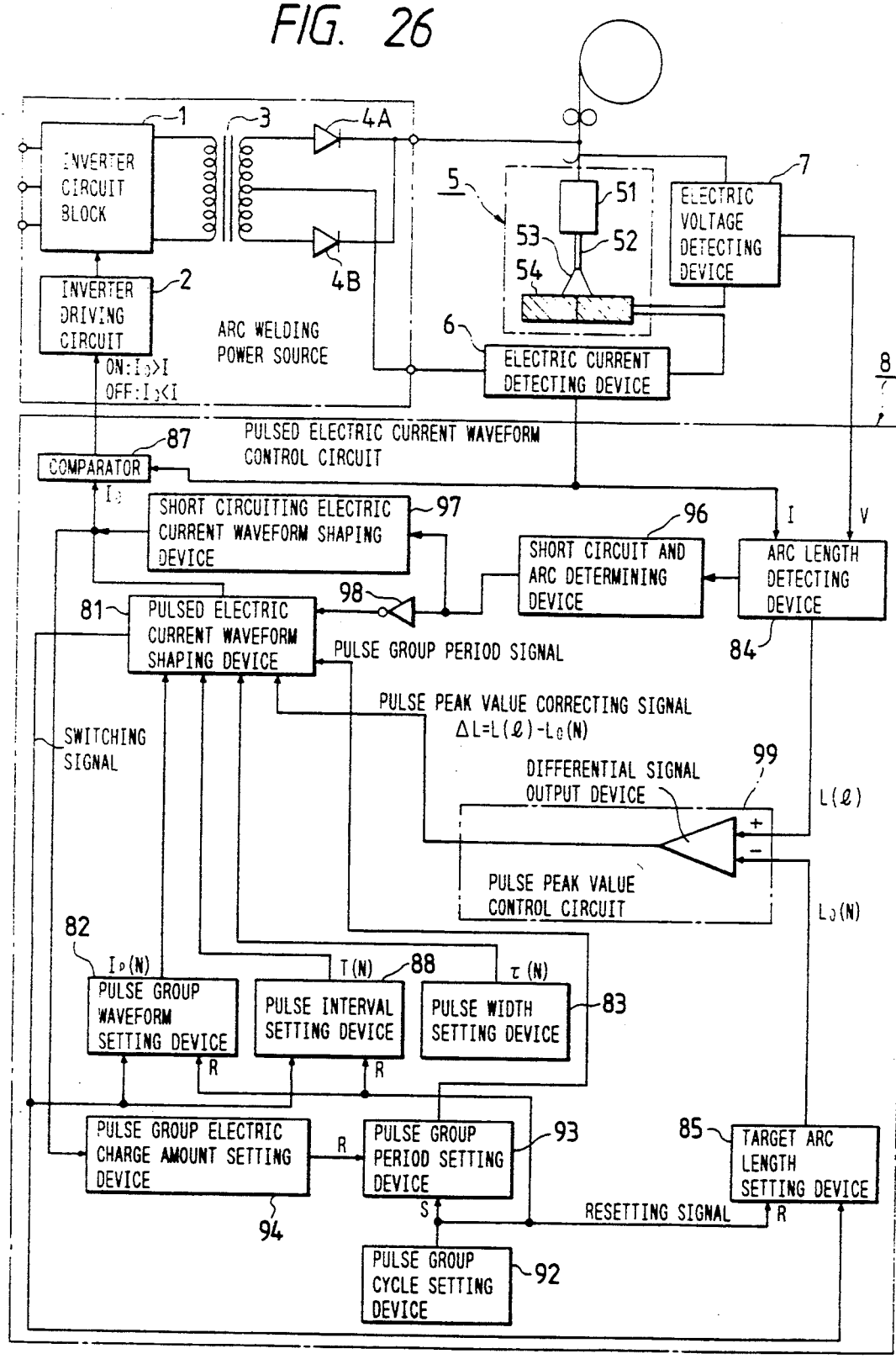
FIG. 26 and FIG. 27, FIG. 28 and FIG. 29, and FIG. 30 and FIG. 31 are drawings respectively corresponding to FIG. 24 and FIG. 25 and illustrating the eighth embodiment, the ninth embodiment, and the tenth embodiment, respectively.

Next, FIG. 26 illustrates one example of the eighth embodiment. The differences between the eighth embodiment and the seventh invention are that the pulsed electric current waveform control circuit (8) a short circuit and arc determining device (96), a short circuiting electric current waveform shaping device (97), and an inverter (98), which are similar to those according to the sixth invention. In addition, these devices, together with others, are formed into a short circuiting transfer arc welding system. In this short circuiting transfer arc welding system, the short circuiting electric current $I_S$, is outputted from the short circuiting electric current waveform shaping device (97) according to a short circuit determining signal that is generated by the short circuit and arc determining device (96) during initialization. The short circuiting electric current $I_S$ is transmitted to the comparator (87). An arc is generated when the molten globule at the tip of the wire electrode (52) is burned out by the conduction of the short circuiting electric current $I_S$ and when the detected electric voltage in the electric voltage detecting device (7) rises. As a result, the short circuit determining signal generated by the short circuit and arc determining device (96) changes from HIGH to LOW, and the inverted signal (i.e., the arc determining signal), which is fed via the inverter (98), shifts from the LOW level to the HIGH level. When this arc determining signal arrives, the pulsed arc electric current is outputted from the pulsed electric current waveform shaping device (81) is given to the comparator (87) in the same way as the sixth embodiment. At this time, the pulsed electric current waveform shaping device (81) receives, as the pulse peak value correcting signal, the differential output $\Delta L$ from the pulse peak value control circuit (99). The pulse peak value control circuit (99) comprises a differential signal output device which calculates the differential output $\Delta L = L(l) - L_0(N)$. The differential output $\Delta L$ is the difference between the detected arc length value $L$ (l), which is output from the arc length detecting device (84), and the target arc length $L_0(N)$, which is output from the target arc length setting device (85). The pulsed electric current waveform shaping device (81) corrects the pulse peak value $I_P(N)$ set in the pulse group waveform setting device (82) according to the differential output $\Delta L$. At the time the pulsed electric current is outputted, the pulsed electric current waveform shaping device (81), outputs switching signals to the pulse group waveform setting device (82), the pulse interval setting device (88), the target arc length setting device (85), and the pulse width setting device (83), respectively. As a result, the pulsed electric current waveform shaping device (81) renews the peak value $I_P(N)$, the pulse interval $T(N)$, the target arc length $L_0(N)$, and the pulse width $\tau(N)$ in a manner suitable for the next pulsed electric current.

Next, the operations of the operations of the pulsed electric current waveform shaping device (81) of the system in this preferred embodiment are described with reference to the flow chart in FIG. 27.

Figure 23:
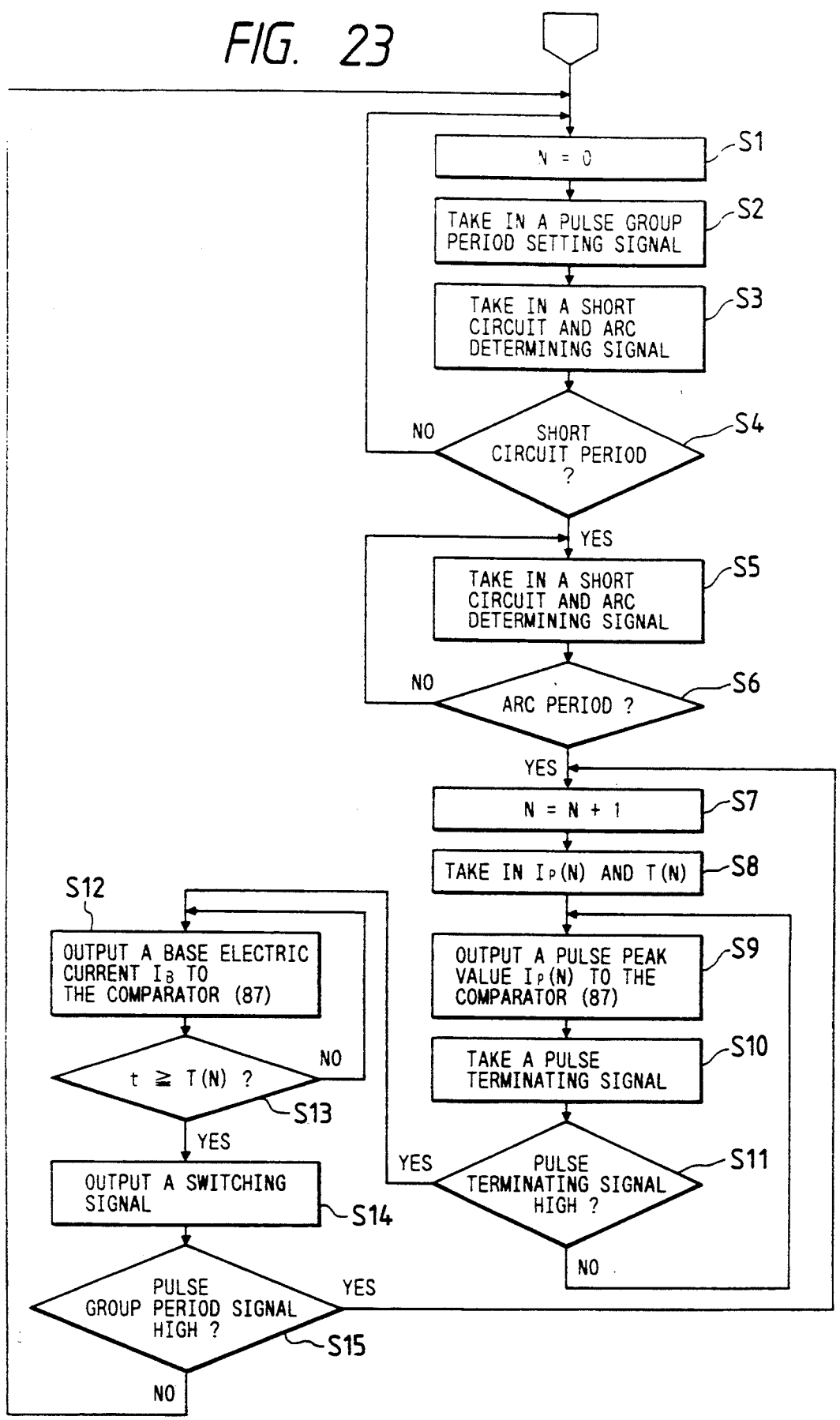
Figure 27:
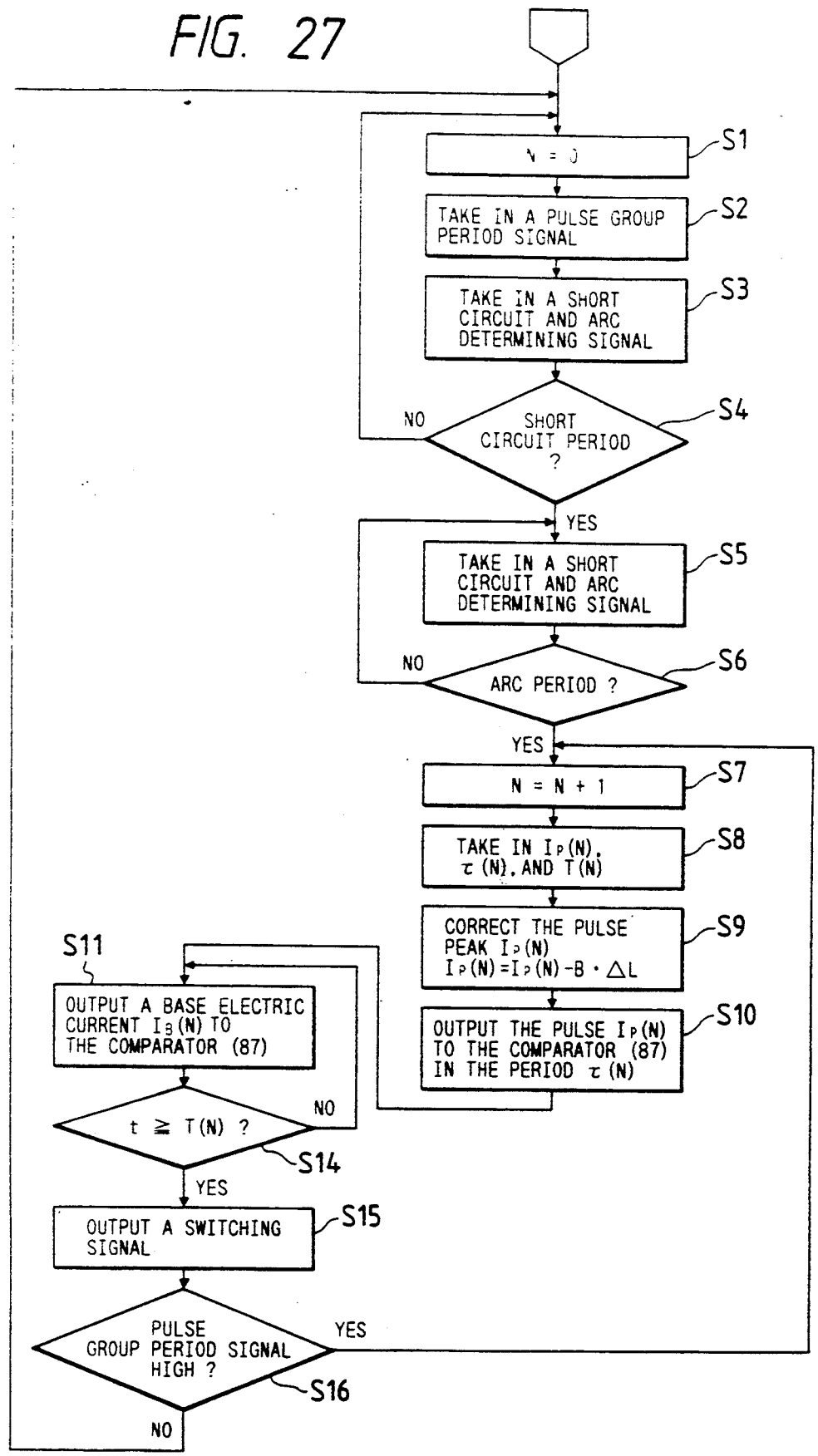

As shown in FIG. 27, the operations performed during steps S1 through S6 in the short circuit period by the pulsed electric current waveform shaping device (81) are the same steps S1 through S6 in FIG. 23. In other words, the short circuit and arc determining device (96) sends out a short circuit determining signal in the initial-phase state when the switch (not shown) of the power source is first turned on, and the tip of the wire electrode (52) is short-circuited with the base metal (54). The pulsed electric current waveform shaping device (81) does not operate until it receives of an inverted signal of the short circuit determining signal (i.e., the arc determining signal). When the short circuiting electric current waveform shaping device (97) receives the short circuit determining signal, it outputs a short circuiting electric current $I_s$ to the comparator (87) (steps S1 through S6).

The short circuiting electric current $I_s$ is output from the short circuiting electric current waveform shaping device (97) the weld zone (5). Consequently, the molten globule which has grown at the tip of the wire electrode (52) is burned out for its transfer onto the base metal (54).

The short circuit and arc determining device (96) stops sending the short circuit determining signal (i.e., the arc determining signal) due to the output from the arc length detecting device (84) (step S6). As a result, the short circuiting electric current waveform shaping device (97) stops outputting the short circuiting electric current $I_s$ and shifts from the short circuit period to the arc period.

After receiving the inverted signal of the short circuit determining signal (i.e., the arc determining signal), the pulsed electric current waveform shaping device (81) performs the same operations as those in the arc period at the steps S3 through S10 shown in FIG. 25. Specifically, the pulsed electric current waveform shaping device (81) prevents the phenomenon of the lift of the molten globule which is due to the magnetic arc blow of the arc. Thus, the pulsed electric current shaping device (81) secures the regularity in the separation of the molten globule correcting the pulse peak value $I_P(N)$, which is set in the pulse group waveform setting device (82) according to the differential output $\Delta L$ found between the detected arc length signal $L$ (l) and the target arc length signal $L_0(N)$ (steps S7 through S14).

Therefore, the welding system is capable of determining the short circuit period and furnishing a flow of a short circuiting electric current $I_S$ in the short circuit period. Therefore, the welding system is capable of accurately and quickly controlling the arc length, not only in the pulsed arc welding process, but also in the short circuiting transfer arc welding process, which achieves the separation of the molten globule by the effect of a short circuit. Consequently, the welding system is capable of welding with small fluctuations in the short circuit period and the arc period. Thus, the system can weld with small irregularity in the formation of the welding beads and with small fluctuations in the depth of the weld penetration.

Figure 28:
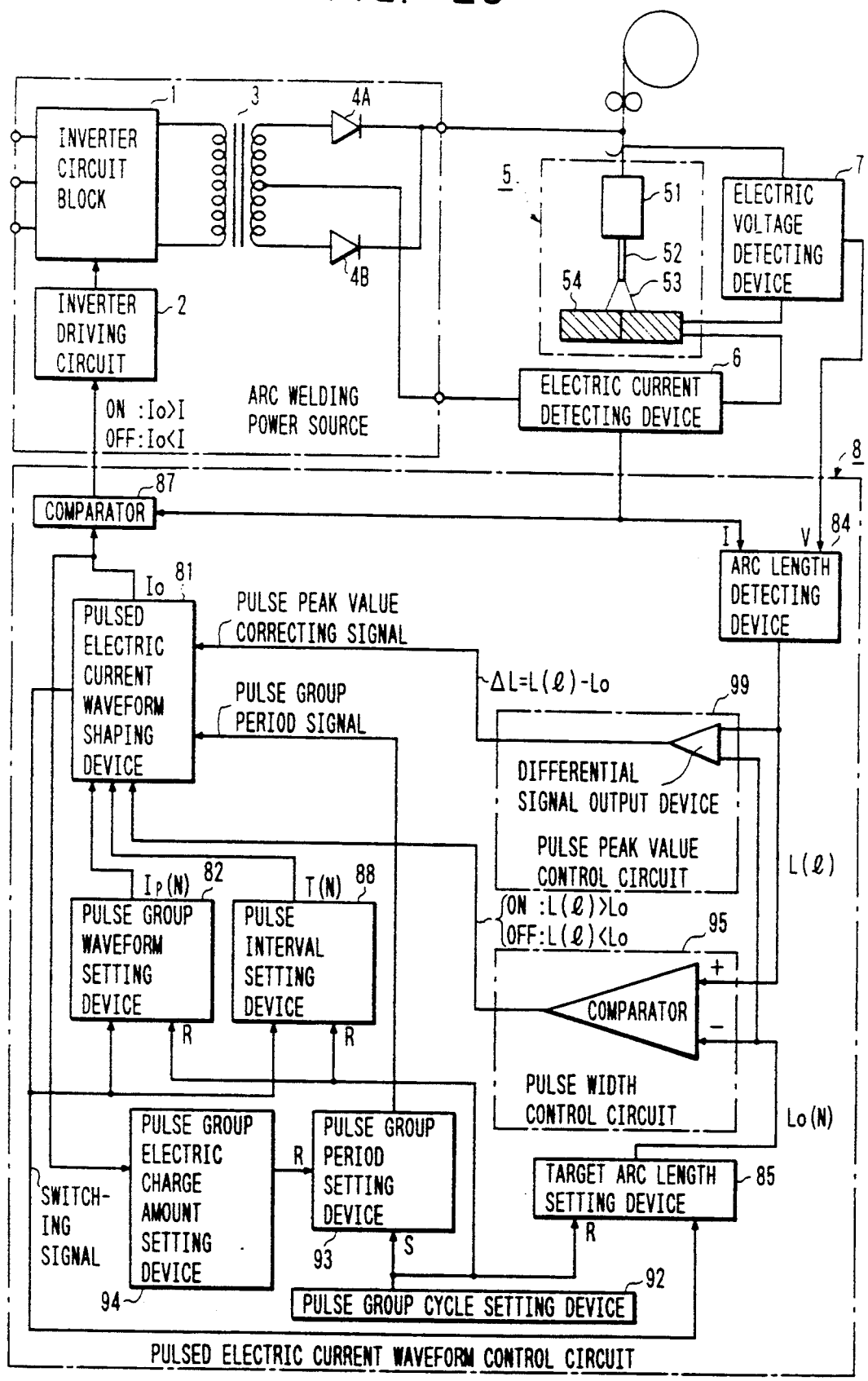

FIG. 28 illustrates one example of the ninth embodiment. This embodiment is different from the pulsed arc welding system described in the fifth embodiment shown in FIG. 15 because the pulse peak value control circuit (99) similar to that in the example of seventh embodiment, has been added to this welding system. The pulse peak value control circuit (99) of this pulsed arc welding system controls the pulse width on the basis of the pulse terminating signal output from the pulse width control circuit (95) and also controls the pulse peak value $I_P(N)$ on the basis of the correcting signal output from the pulse peak value control circuit (99).

Next, the operations of the pulsed electric current waveform shaping device (81) of the welding equipment in this embodiment are described with reference to the flow chart given in FIG. 29.

The pulsed electric current waveform shaping device (81) corrects the pulse peak value $I_P(N)$ according to the equation, $I_P(N) = I_P(N) - B \cdot \Delta L$. B expresses a proportional and $\Delta L$ expresses the differential output transmitted from the pulse peak value control circuit (99), in the same manner as the seventh embodiment. In other words, the pulsed electric current waveform shaping device (81) corrects the pulsed electric current $I_P$ in the pulse period according to the differential output signal $\Delta L$ which the difference between the detected arc length signal $L$ (l) and the target arc length signal $L_0(N)$. Afterwards, the pulsed electric current waveform shaping device (81) outputs the corrected pulse peak value $I_P(N)$ to the comparator (87) (steps S1 through S6).

After the pulsed electric current $I_P$ is sent in this manner to the comparator (87), a pulsed arc discharge (53) is formed between the wire electrode (52) an the base metal (54). Consequently, the base metal (54) and the tip of the wire electrode (52) are fused by the pulsed arc discharge (53) in the same manner as the preferred embodiments described above.

The arc length detecting device (84) detects the arc length L (l) according to the signals I and V which are detected by the electric current detecting device (6) and the electric voltage detecting device (7), respectively. Then, the arc length detecting device (84) outputs the detected arc length L (l) to the pulse width control circuit (95). The pulse width control circuit (95) receives the target arc length signal $L_0$ (1) from the target arc length setting device (85) compares the detected arc length L(l) and the target arc length $L_o$(1). If L (l) > $L_0$, the arc length detecting device (84) outputs a HIGH pulse terminating signal to the pulsed electric current waveform shaping device (81).

The pulsed electric current waveform shaping device (81) receives the pulse terminating signal mentioned above (steps S7 and S8) the pulsed electric current waveform shaping device (81). Also receives the prescribed base electric current $I_B$ (N) which it receives from a built-in base electric current output device (not shown). The pulsed electric current waveform shaping device (81) continues receiving the prescribed base electric current $I_B$ until the pulse interval T (N) is attained (steps S9 and S10). (steps S9 and S10 are analogous to steps S9 and S10 of the fifth embodiment) Thereafter, pulsed electric current waveform shaping device (81) outputs switching signals to the pulse group waveform setting device (82), the pulse interval setting device (88), and the target arc length setting device (85) (step S11). These switching signal renew the repeating loop N, and the pulsed electric current waveform shaping device continues executing steps S1 through S12 until the pulse group period signal is changed to the low level (step S12).

Thus, the welding system is capable of preventing the phenomenon of the lift of the molten globule by the magnetic arc blow of the arc. Therefore, the welding system can maintain the regularity in the separation of the molten globule since it variably controls the pulse interval according to the detected arc length by correcting the pulse peak value $I_P$ (N). The pulse peak value $I_P$ (N) is set in the pulse group waveform setting device (82) according to the differential output $\Delta L$ found between the detected arc length signal L (l). The welding system is capable of the target arc length signal $L_0$ (N) and also continuing to furnish the flow of the pulse $I_0$ until the detected arc length signal L (l) attains the value of the target arc length signal $L_0$ (N). After the value of the target arc length $L_0$ (N) is attained, the welding system transmits the base electric current $I_B$ in the period for the pulse interval T (N) set in the pulse interval setting device (88).

Therefore, according to the ninth embodiment, the welding system is capable of accurately and quickly welding with an arc length that corresponds to the target arc length. Consequently, the system can separate the molten globule and its transfer to the base metal with improved regularity. The system is also capable of accurately and quickly restraining the lift up of the molten globule in the pulse period by maintaining the arc length close to the target arc length. and also stopping the pulse after a confirmation by the arc length to that the molten globule is lifted up a maximum limit. Once the system has detected that the molten globule has been lifted, the maximum amount in the pulse period corrects the peak value in the pulsed electric current $I_P$ in the pulse period according to the differential output signal $\Delta L$, and sets the maximum limit to the lift molten globule in the pulse period as the target arc length signal, the welding system stops the pulse and furnishes the flow of the base electric current when the arc length detecting device becomes equivalent to the target arc length.

Figure 30:
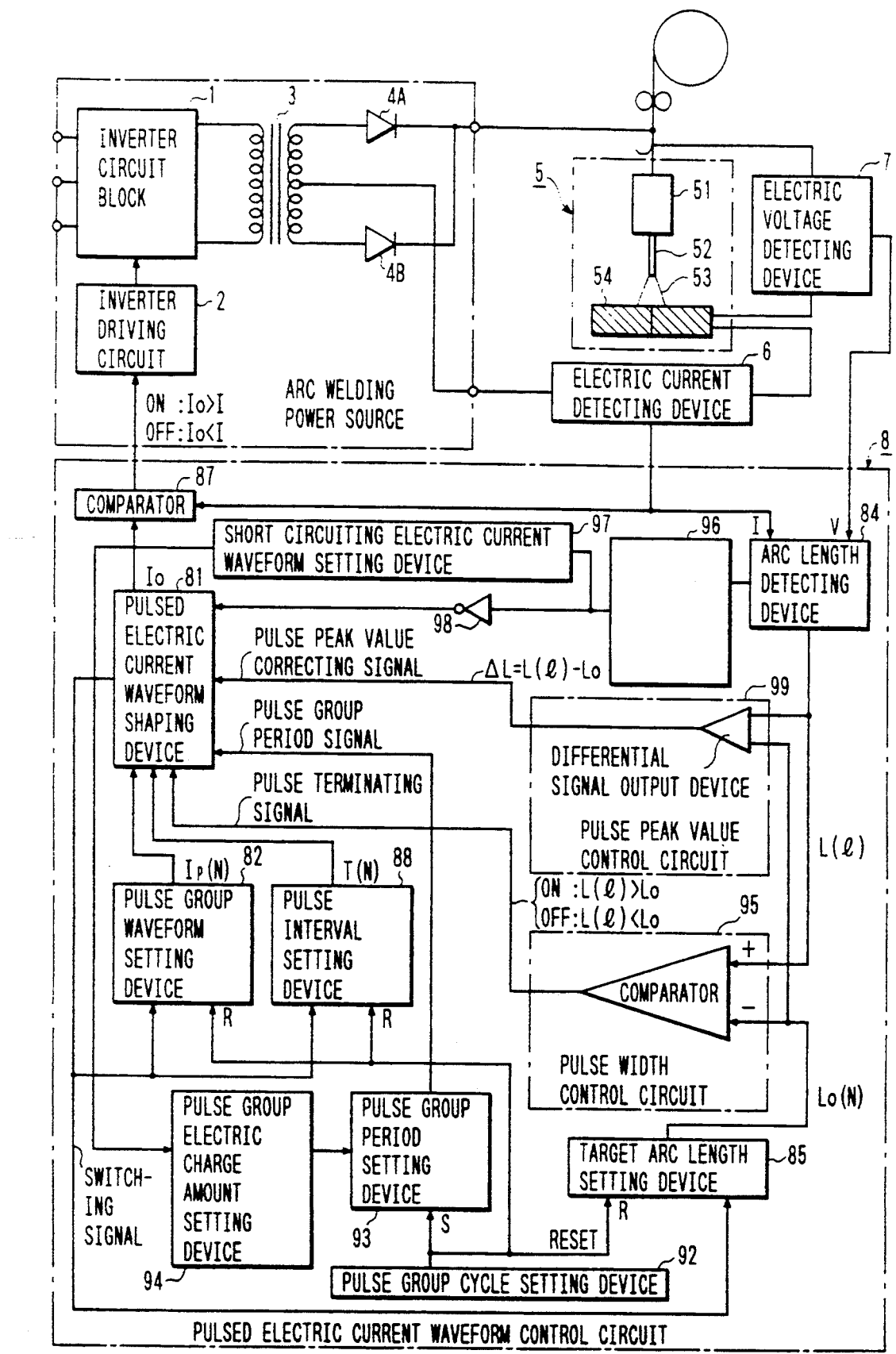

Next, FIG. 30 illustrates one example the tenth embodiment. The welding equipment in this example is different from the short circuiting transfer arc welding system described in the example of the sixth embodiment in FIG. 20 because this welding system additionally comprises a pulse peak value control circuit (99). This pulse peak value control circuit (99) is similar to such a circuit in the example of the seventh embodiment FIG. 24. In the tenth embodiment, the short circuiting transfer arc welding system controls the pulse width according to a pulse terminating signal outputted from the pulse width control circuit (95). The welding system controls the pulse peak value according to the correcting signal outputted from the pulse peak value control circuit (99). The corrected signal is output after the short circuit period shifts to the arc period.

Figure 31:
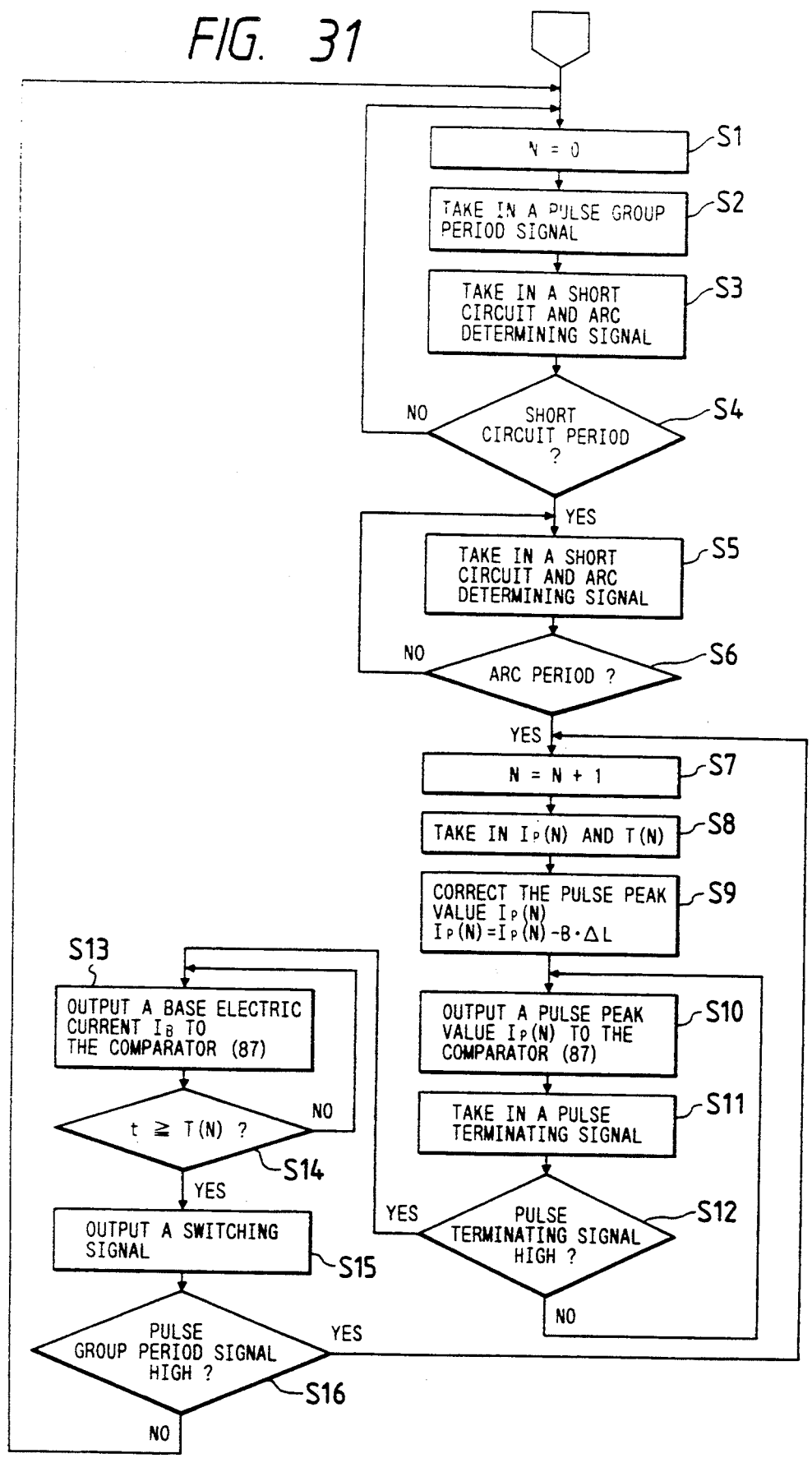

Next, the operations of the operations of the pulsed electric current waveform shaping device (81) of the welding system are described in reference to the flow chart shown in FIG. 31 in illustration.

As shown in FIG. 31, the pulsed electric current waveform shaping device (81) performs the same operations at these steps S1 through S6 in the short circuit period as those steps S1 through S6 in FIG. 23 with respect to the sixth embodiment. In other words, the short circuit and arc determining device (96) outputs a short circuit determining signal during the initial-phase state when the switch of the power source (not shown) is turned on. As a result, the tip of the wire electrode (52) is short-circuited with the base metal (54). The pulsed electric current waveform shaping device (81) remains non-operational until it receives the inverted signal of the short circuit determining signal, (i.e., the arc determining signal). Meanwhile, the short circuiting electric current waveform shaping device (97), outputs the short circuiting electric current $I_S$ to the comparator (87) on the basis of the short circuit determining signal (steps S1 through S6).

The short circuiting electric current $I_S$ is outputted from the short circuiting electric current waveform shaping device (97) to the weld zone (i.e., that is, to the weld zone (5)). As the short circuiting electric current $I_S$ is outputted, the welding system separates the molten globule growing on the tip of the wire electrode (52) by burning out the molten globule by applying this short circuiting electric current to it. Consequently, the welding system transfers the molten globule to the base metal (54).

Then, the short circuit and arc determining device (96) stops outputting the short circuit determining signal (i.e., the device outputs an arc determining signal) (step S6) on the basis of the output from the arc length detecting device (84) the basis of the arc determining signal, the short circuiting electric current waveform shaping device (97) stops outputting the short circuiting electric current $I_S$. Consequently, the short circuiting shifts from the short circuit period to the arc period.

Figure 29:
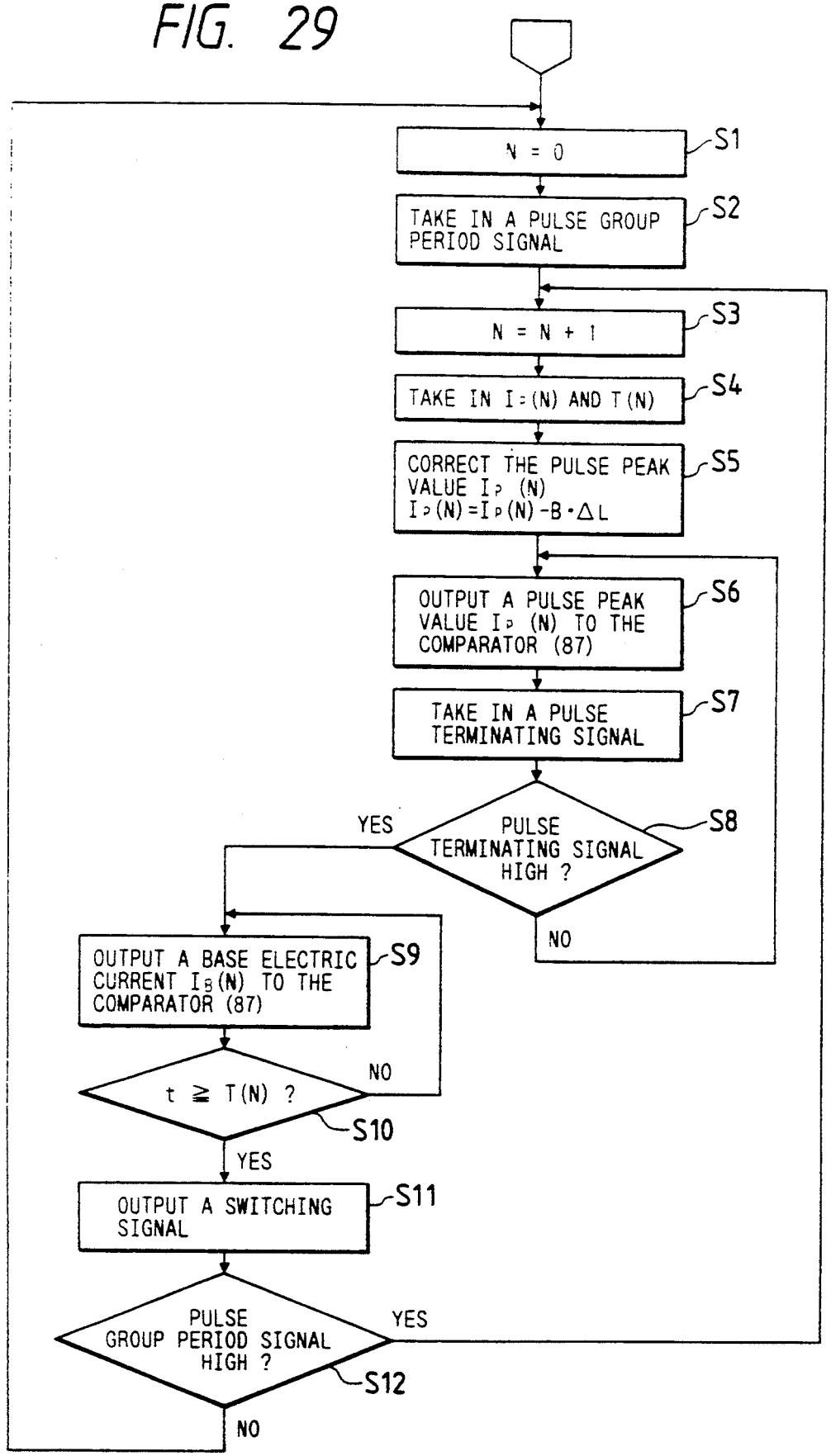

Next, the pulsed electric current waveform shaping device (81) executes steps S7 through S16 in FIG. 31, which are the same as the steps S3 through S12 shown in FIG. 29. These steps are executed upon the reception of the input of the inverted signal of the short circuit determining signal (i.e., the arc determining signal). Specifically, in the arc period in which the steps S7 through S16 are performed, the pulsed electric current waveform shaping device (81) corrects the pulse peak value $I_P$ (N) set in the pulse group waveform setting device (82) according to the differential output $\Delta L$. The differential output $\Delta L$ is the difference between the detected arc length signal L (l) and the target value arc length signal $L_0$ (N). The pulse group waveform setting device (82) also continues to furnish the flow of the pulse $I_0$ until the detected arc length signal L (l) attains the length of the target arc length signal $L_0$ (N). After the target arc length is attained, the pulse group waveform setting (82) outputs the base electric current $I_B$ in the period during the pulse interval T (N) set in the pulse interval setting device (88). As a result, the pulse group waveform setting device (82) is able to control the pulse interval according to the detected arc length. Consequently, the device prevents the phenomenon of the lift of the molten globule due to the magnetic arc blow of the arc and secures the regularity in the separation of the molten globule.

Therefore, the tenth embodiment accurately performs the welding process by accurately and quickly controlling the arc length, not only in the pulsed arc welding process, but also in the short circuiting transfer arc welding process. The short circuit transfer arc welding process separates the molten globule by short circuiting. Furthermore, the welding system reduces fluctuations in the short circuit period and the arc period. As a result, the welding system reduces the fluctuations in the uniformity of the shape of the welding beads and in the depth of the weld penetration. These advantages are in addition to the effects achieved by the ninth embodiment, since the equipment is designed to be capable of finding the short circuit period and furnishing the flow of the short circuiting electric current in the short circuit period.

Figure 32:
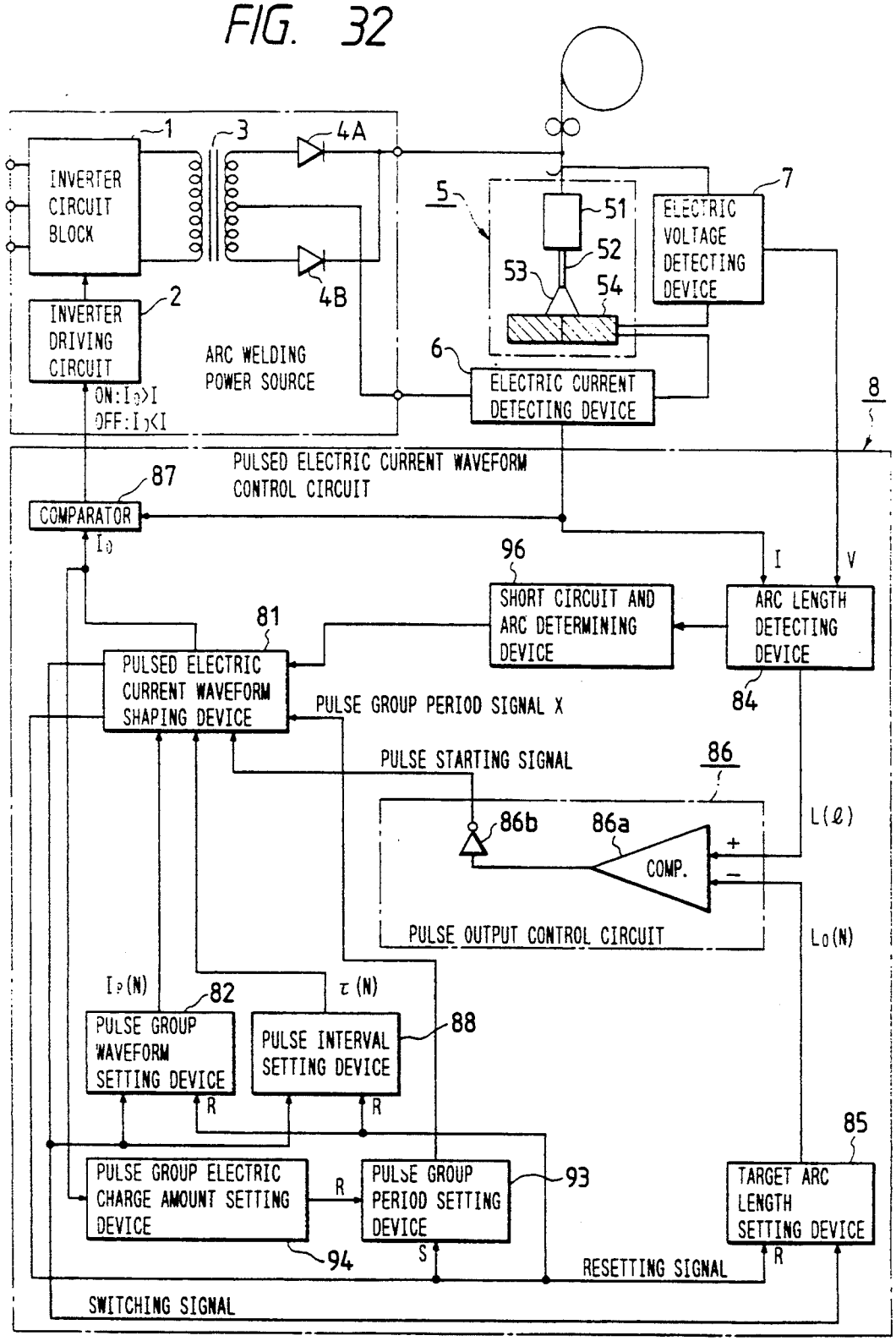
FIG. 32 through FIG. 35 illustrate the eleventh embodiment.

FIG. 32 is a drawing illustrating the pulsed arc welding system in one example the eleventh embodiment. This circuiting transfer arc welding equipment, differs from the embodiment (shown in FIG. 1) because the pulsed electric current waveform control circuit (8) additionally comprises a pulse group period setting device (93). The pulse group period setting device (93) comprises a flip-flop, a pulse group electric charge amount setting device (94), which is identical to such a device shown in FIG. 16, and a short circuit and arc determining device (96), which is identical to such a device shown in FIG. 21 (a). In addition, this embodiment is different in that the pulsed electric current waveform shaping device (81) is provided with a built-in short circuiting electric current waveform shaping device (not shown) incorporated which transmits a short circuiting electric current $I_s$ (N) when a short circuit determining signal is input from the short circuit and arc determining device (96). With the conduction of this short circuiting electric current, the molten globule at the tip of the wire electrode (52) is burned out and as a result, an arc is generated. When an arc is thereby generated, the electric voltage detecting device (7) detects a rise in the detected electric voltage. Consequently, the short circuit determining signal generated from the short circuit and arc determining device (96) changes from the HIGH level to the LOW level. The inverted signal of the short circuit determining signal, (i.e., the arc determining signal) is received, the pulsed arc electric current is output to the comparator (87).

Next, the operations of the operations of the pulsed electric current waveform shaping device (81) of the welding system will be described with reference to the flow charts FIG. 33 and in FIG. 34 in and the waveform chart in FIG. 32.

In this short circuiting transfer arc welding, the tip of the wire electrode (52) is short-circuited with the base metal (54) when the switch for the power source is turned on. In such an initial-phase state, the short circuit and arc determining device (96) outputs a short circuit determining signal, and the pulsed electric current waveform shaping device (81), which sends out an arc electric current, remains in its non-operating state. In its non-operating state, the device (81) does not output a pulsed arc electric current until the inverted signal of the short circuit determining signal, (i.e., the arc determining signal) is received. Meanwhile, the short circuiting electric current $I_s$ (N) is output from the built-in short circuiting electric current waveform shaping device to the comparator (87) on the basis of the short circuit determining signal (steps S1 through S5).

As a result of the short circuiting electric current $I_s$, the welding system separates the molten globule growing on the tip of the wire electrode (52) by burning out the molten globule transfers the molten globule to the base metal (54) in the same manner as in the the individual examples of preferred embodiments of the short circuiting transfer arc welding system.

At such a time, the short circuit and arc determining device (96) stops outputting the short circuit determining signal (i.e., the device outputs an arc determining signal) (step S3) on the basis of the output from the arc length detecting device (84). On the basis of this signal, the pulsed electric current waveform shaping device (81) stops the short circuiting electric current $I_s$ (N), thus shifting from the short circuit period to the arc period.

Next, the pulsed electric current waveform shaping device (81) outputs reset signals to the pulse group waveform setting device (82) and the pulse width setting device (83) receiving upon the inverted signal of the short circuit determining signal (i.e., the arc determining signal). The pulsed electric current waveform shaping device (81) also outputs a setting signal to the pulse group period setting device (93) (step S6). As a result of these signals the repeating loop N at N=1 is reset (step S7) and a pulse peak value $I_P(1)$ and a pulse width $\tau$ (1) from the pulse group waveform setting device (82) and the pulse width setting device (83), respectively, are obtained. Then, the device (81) outputs a pulsed electric current which has the pulse peak value $I_P(1)$ and the pulse period $\tau$ (1) to the comparator (87) (steps S8 through S11). After the pulse is thus sent out, the pulsed electric current waveform shaping device (81) determines the prescribed base electric current $I_B$ (N) and outputs the determined base electric current to the comparator (87) (the step S12).

With the pulsed electric current $I_0$ is output to the comparator (87), a pulsed arc discharge (53) is formed between the wire electrode (52) and the base metal (54) by the pulsed electric current, in the same manner as consequently, the base metal (54) and the tip of the wire electrode (52) are fused by the pulsed arc discharge (53).

The arc length detecting device (84) detects the arc length L (l) on the basis of the signals I and V detected by the electric current detecting device (6) and the electric voltage detecting device (7), respectively. The arc length detecting device (84) outputs the detected arc length L (l) to the pulse output control circuit (86). At the same time, the pulse output control circuit (86) receives the target arc length signal $L_0$ (1) from the target arc length setting device (85) and compares the two signals. If, L (l)<$L_0$, the target length setting device (85) outputs a HIGH pulse starting signal to the pulsed electric current waveform shaping device (81).

The pulsed electric current waveform shaping device (81) inputs the pulse starting signal (steps 513). When the pulse starting signal is HIGH (step S14), the device (81) renews the repeating loop N (step S15) and outputs switching signals to the pulse group waveform setting device (82), the pulse width setting device (83), and the target arc length setting device (85) (the steps S16). As a result, the pulsed electric current waveform shaping device (81) determines a pulse peak value $I_P$ (N) and a pulse width $\tau$ (N) the renewal of the loop N. The device (81) then outputs a pulse peak value $I_P$(N) to the comparator (87) inputs the pulse group period signal X pulsed electric current waveform shaping device (81) continues sending out the pulse peak value $I_P$(N) in the $\tau$ (N) period as long as the pulse group period signal X remains at the LOW level. (steps S17 through S22).

When the period T (N) has elapsed while the pulse group period signal X remains at the LOW level, the pulsed electric current waveform shaping device (81) receives the prescribed built-in base electric current $I_B$ (N) from the base electric current output device and continues to output the base electric current to the comparator (87). (steps S23 through S25). When the pulse starting signal attains the HIGH level, the pulsed electric current waveform shaping device (81) returns to step S15 and renews the repeating loop N and repeats the process from step S15.

On the other hand, if the pulse starting signal X is at the HIGH step S21, the pulsed electric current waveform shaping device (81) continues to output the prescribed base electric current value $I_B$(N) to the comparator (87) until a short circuit state is attained. Afterwards, the pulsed electric current waveform shaping device (81) returns to the step S4, resets the repeating loop N at 0, and shifts to the short circuit period. Consequently, the pulsed electric current waveform shaping device (81) repeats the processes from step S4 (steps S26 and S29), thereby outputting the pulsed electric current to the arc loading zone (5) as shown in FIG. 34.

Figure 34:
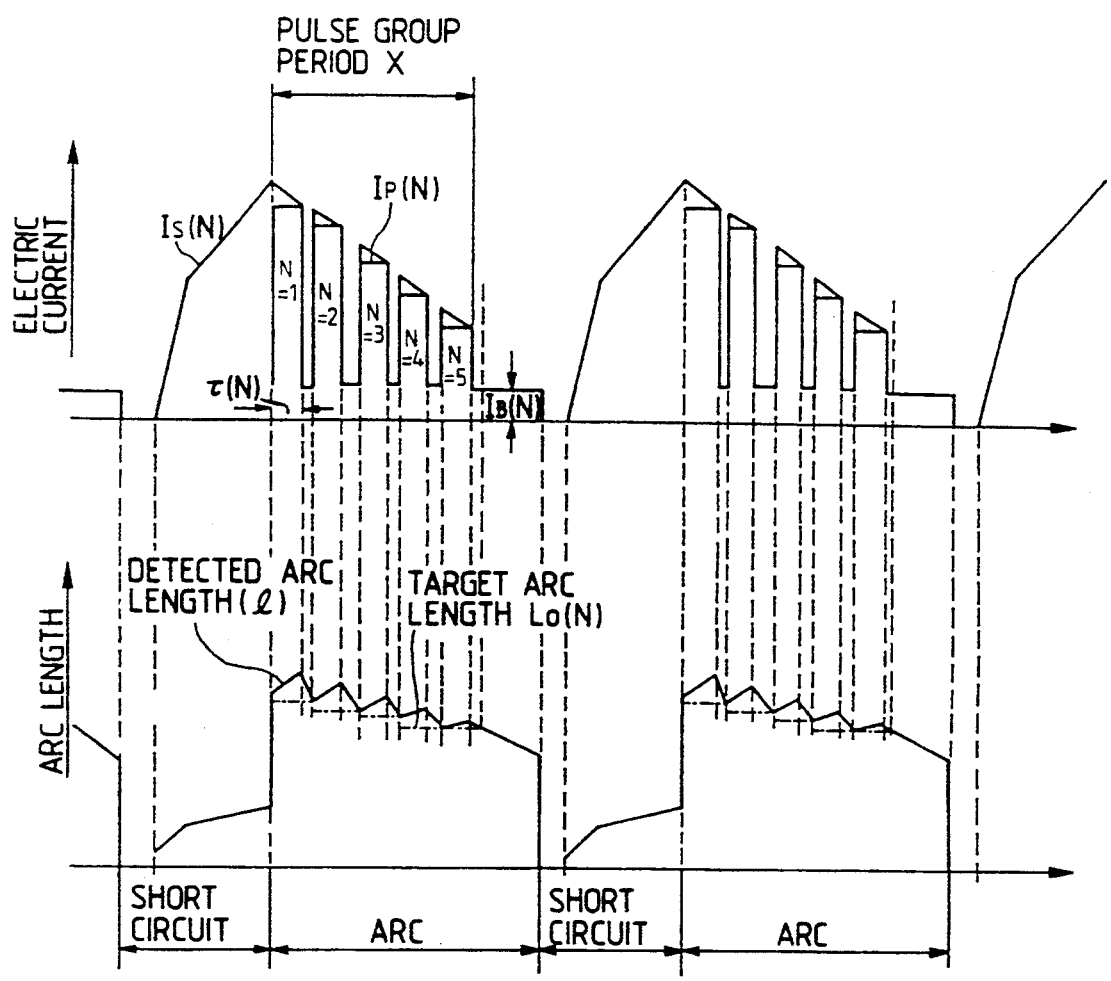
Figure 35:
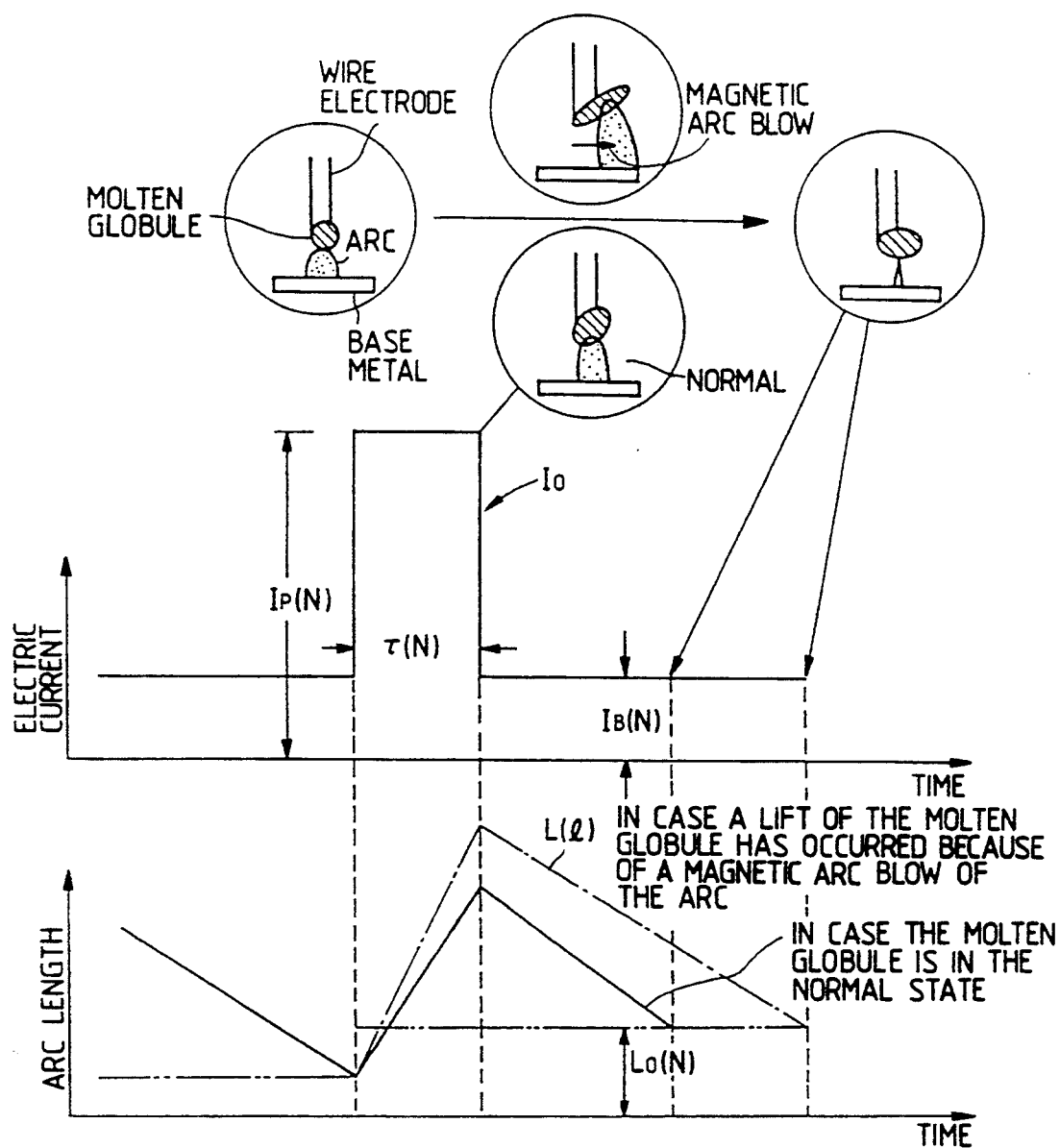

Thus, according to the eleventh embodiment, the welding system is capable of determining the short circuit period and furnishing the flow of the short circuiting electric current in the short circuit period, as shown in FIG. 34. Also the welding system is capable of controlling the base electric current period in the arc period by sending out the next pulse when the detected arc length signal becomes equal to or less than the target arc length signal, as shown in FIG. 35. In addition, the system is capable of obtaining the state of the molten globule lifted up by the electromagnetic force in the pulse period on the basis of a signal corresponding to the detected arc length in the base electric current period. Therefore, this welding equipment is capable of preventing the irregular lift of the molten globule by any external disturbance in the arc period and is capable of accurately welding with reduced fluctuations in the short circuit period and the arc period during the short circuiting transfer arc welding process. In the short circuiting transfer arc welding process the separation of the molten globule is achieved by short circuiting and with reduced fluctuations in the uniformity of the shape of the welding beads and in the depth of the weld penetration.

Figure 36:
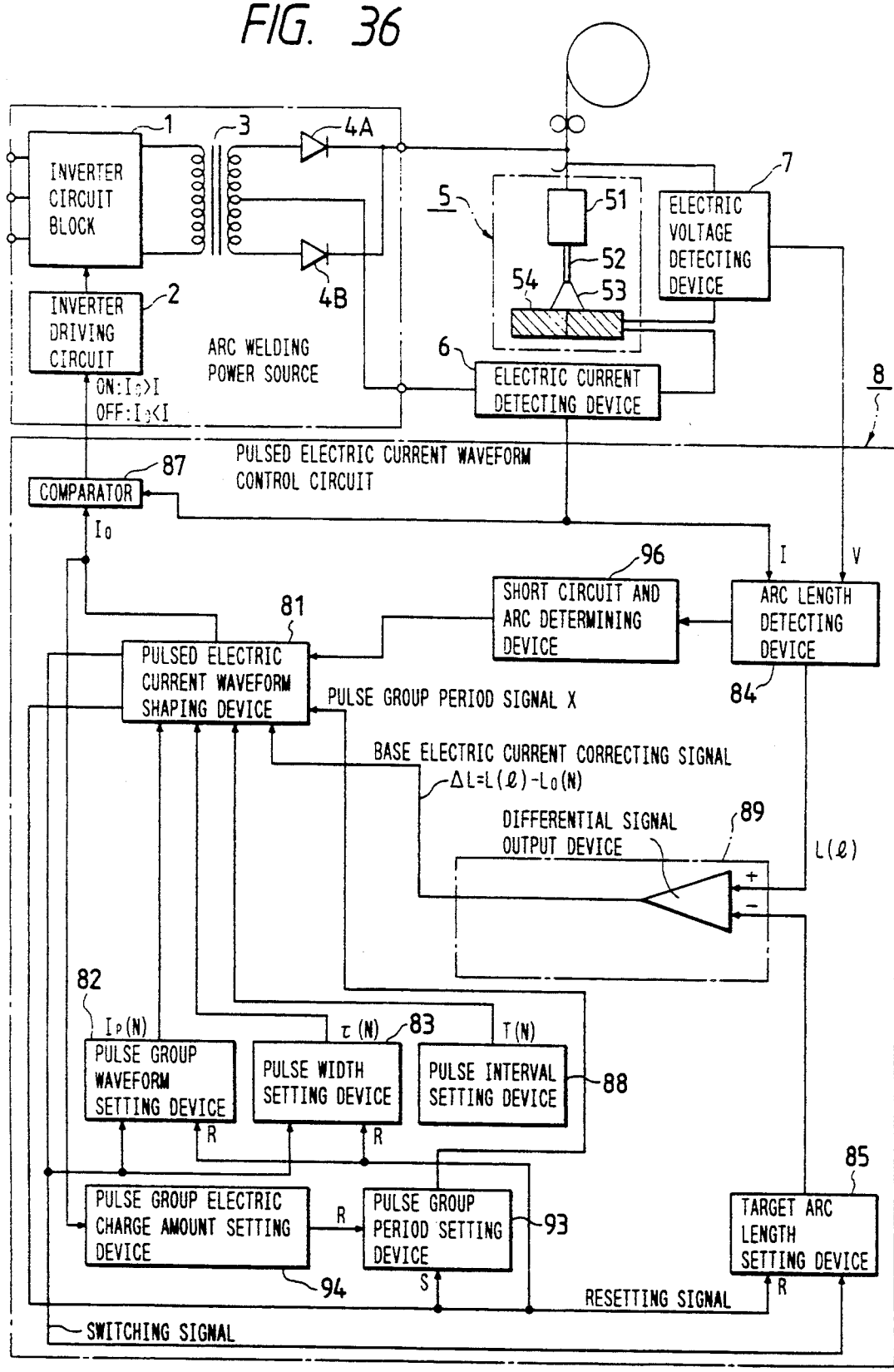
FIG. 36 and FIG. 37 illustrate the twelfth embodiment and are drawings corresponding to FIG. 32 and FIG. 33, respectively.

Next, FIG. 36 illustrates one example of the twelfth embodiment. The construction of this circuit transfer arc welding system, is different from the preferred embodiment the example of preferred embodiment eleventh embodiment shown in FIG. 32 because the pulse output control circuit (86) has been eliminated. The welding system is also different because the pulsed electric current waveform control circuit (8) additionally comprises a pulse interval setting device (88) and the differential signal output device (89) described in the example of the second embodiment as shown in FIG. 6. This short circuiting transfer arc welding system regulates the base electric current $I_B$(N), which is output for each pulse interval and for each pulse group interval set for the group of pulsed electric currents. The system corrects the base electric current $I_B$ according to the equation $I_B$ (N)=$I_B$ (N)−K·$\Delta$L. In this equation, K expresses a constant and $\Delta$L expresses differential output $\Delta$L inputted from the differential signal output device (89). The differential signal output device (89), operating with the pulsed electric current waveform shaping device (81), obtains the differential output $\Delta L = L$ (l)−$L_0$ (N) by calculating the difference between the detected arc length signal L (l) detected by the arc length detecting device (84) and the target arc length signal $L_0$ (N) detected by the target arc length setting device (85). The differential output $\Delta$L is detected when the operation of the system has shifted to the arc welding process.

Figure 37:
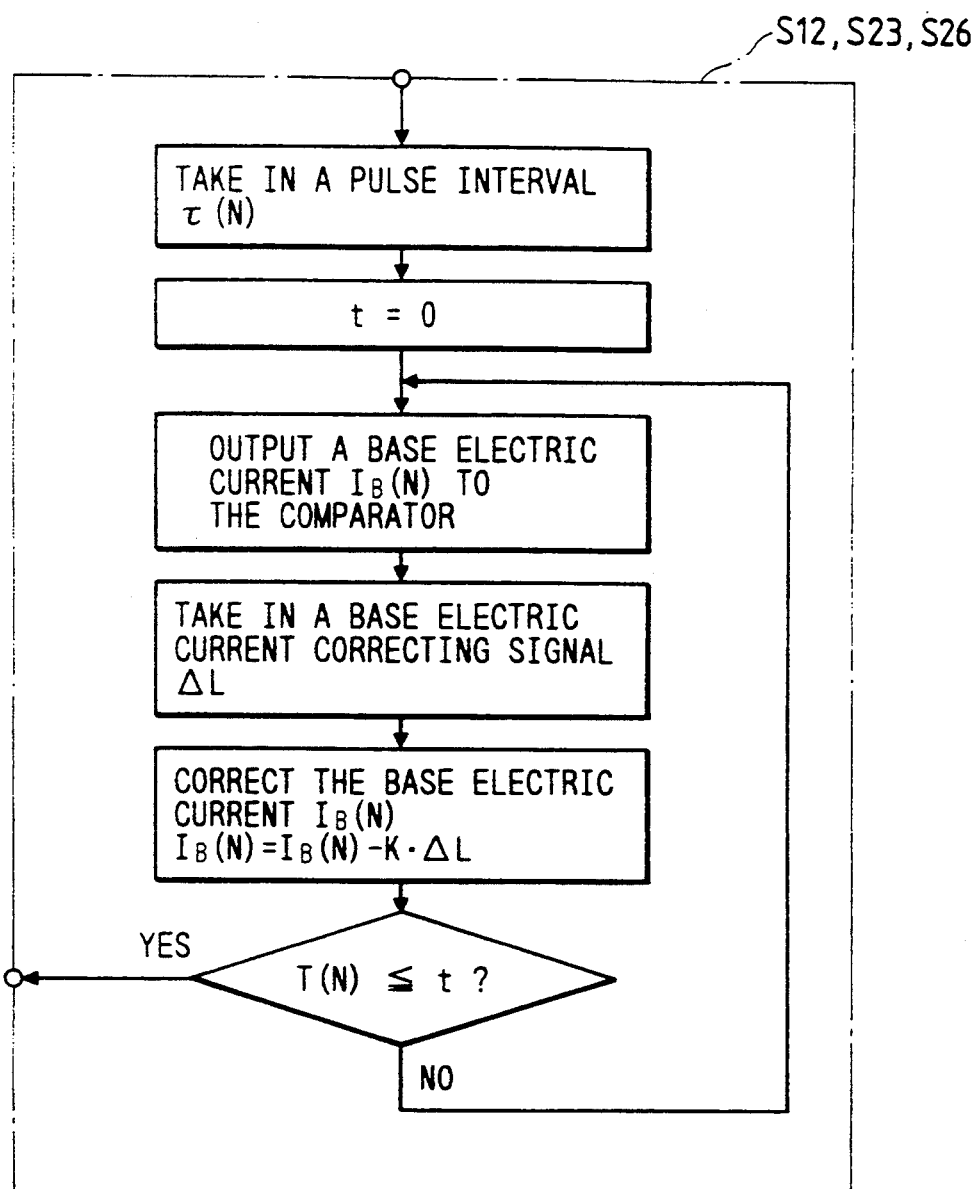

Then, the operations of the operations of the pulsed electric current waveform shaping device (81) of the welding system of this embodiment are described with reference to the partial flow chart. FIG. 37 in.

Figure 33:
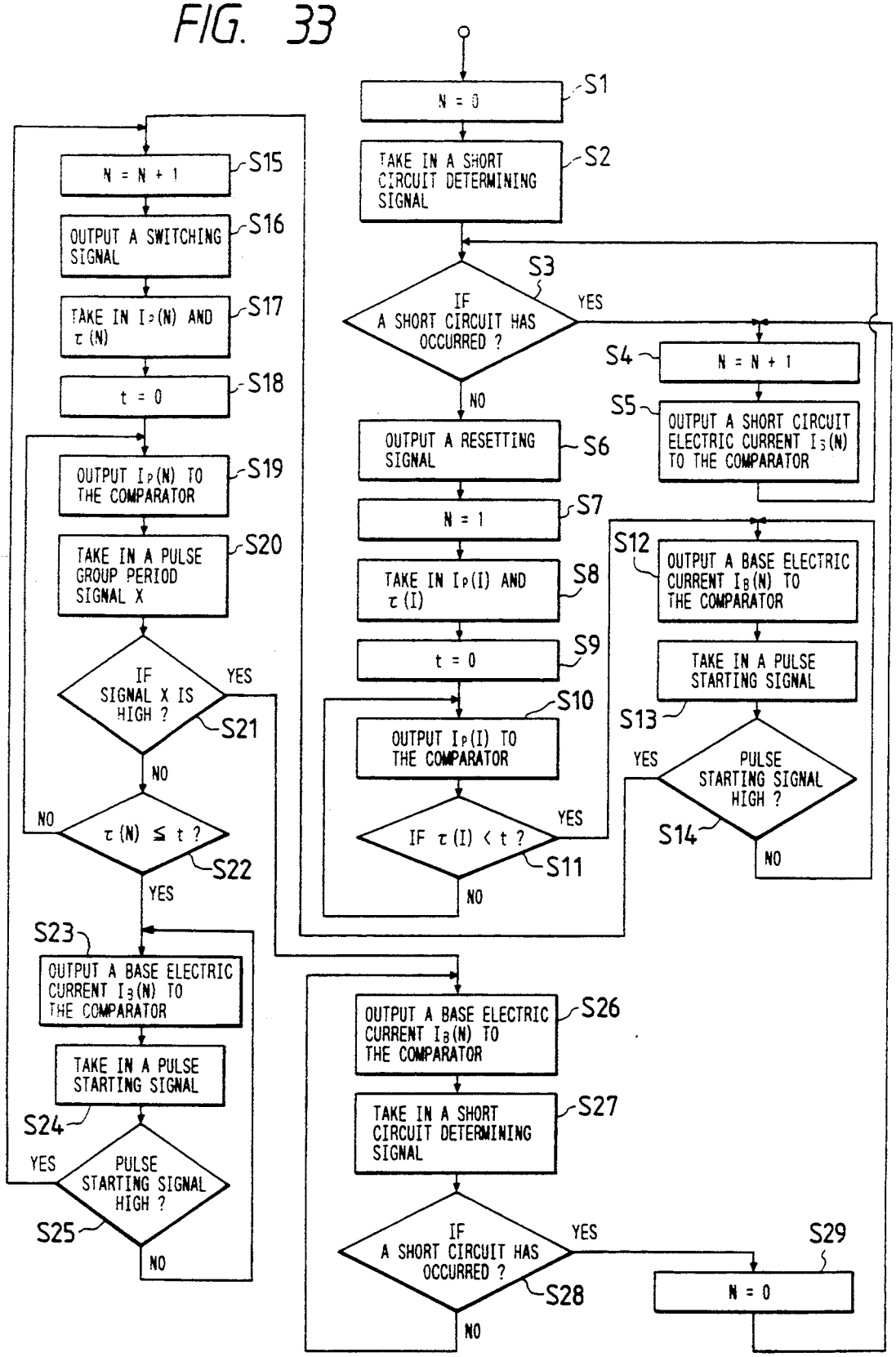

FIG. 37 represents the control of the flow for the base electric current value relating to steps S12, S23, and S26 in the flow chart illustrated in FIG. 33. The other processing steps of the system are performed in the same manner as the other step in FIG. 33. In other words, when the base electric current $I_B$(N) is output to the comparator (87), the pulsed electric current waveform shaping device (81) adjusts the values of the base electric current $I_B$ (N) according to the equation $I_B$ (N)=$I_B$(N)−K·$\Delta$L by receiving the differential output $\Delta$L from the differential signal output device (89). The base electric current $I_B$ is regulated during the period t=T (N) until the pulse interval T (N)=0, as shown in FIG. 37.

Thus, according to the twelfth embodiment, the welding system is capable of determining on the basis of the arc length, the state of the molten globule lifted up by the electromagnetic force generated by the magnetic arc blow of the arc in the pulse period. The system is also capable of correcting the base electric current value $I_B$ (N) according to the equation $I_B$ (N)=$I_B$ (N)−K·$\Delta$L during the base period by the differential signal $\Delta$L. The differential signal $\Delta$L is the difference between the arc length L (l) and the target arc length $L_0$ (N). Consequently, the welding system can restore the molten globule from its lifted state to its original arc length by placing restraint on the lift of the molten globule. Furthermore, the system can perform this process without changing the pulse intervals in the pulse group and can accurately and quickly restore the molten globule to its original state. Therefore, the welding system can control the arc length in accordance with the target arc length.

Figure 38:
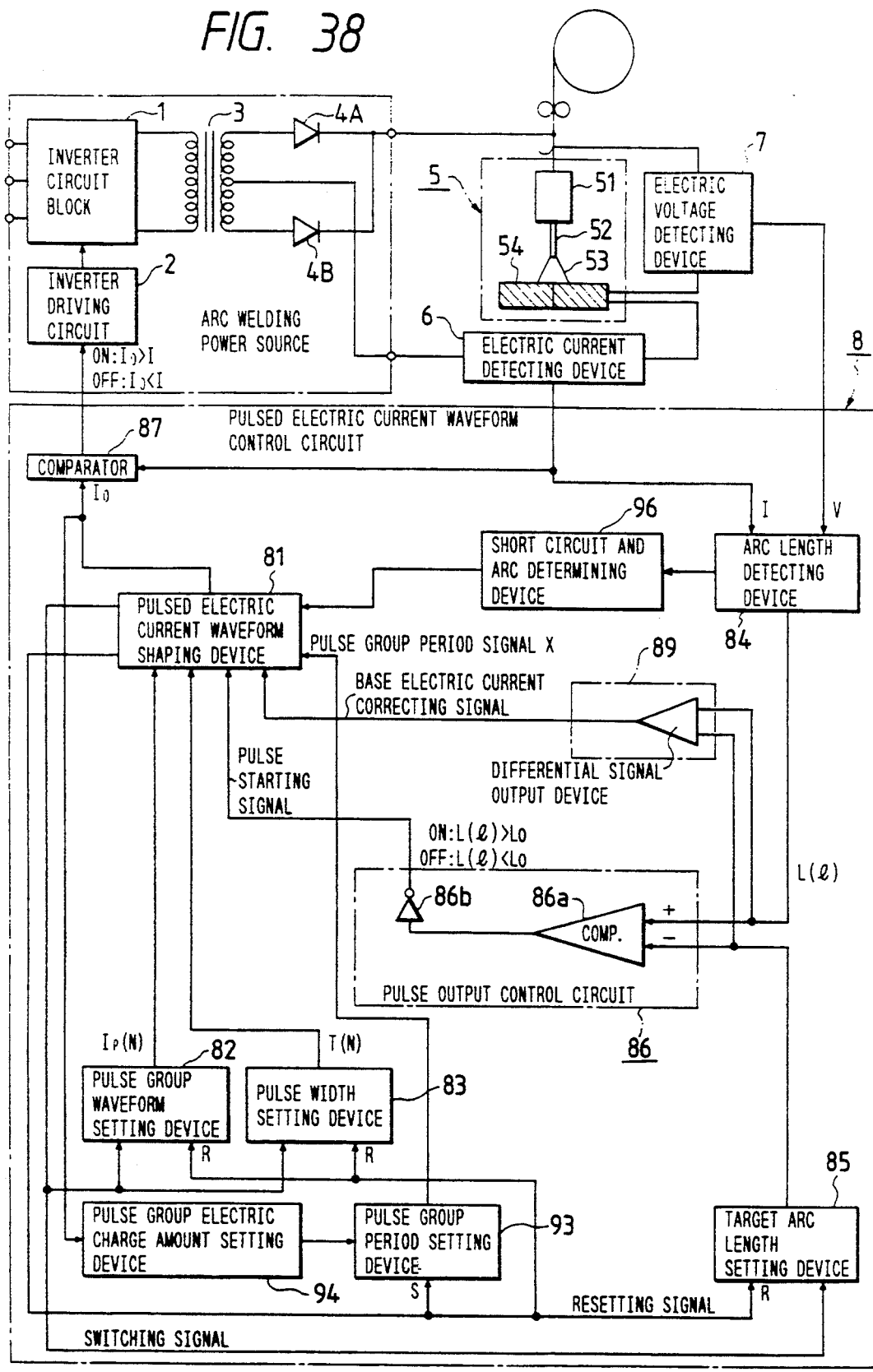
FIG. 38 and FIG. 39 illustrate the thirteenth embodiment and are drawings corresponding to FIG. 32 and FIG. 33, respectively.
Figure 39:
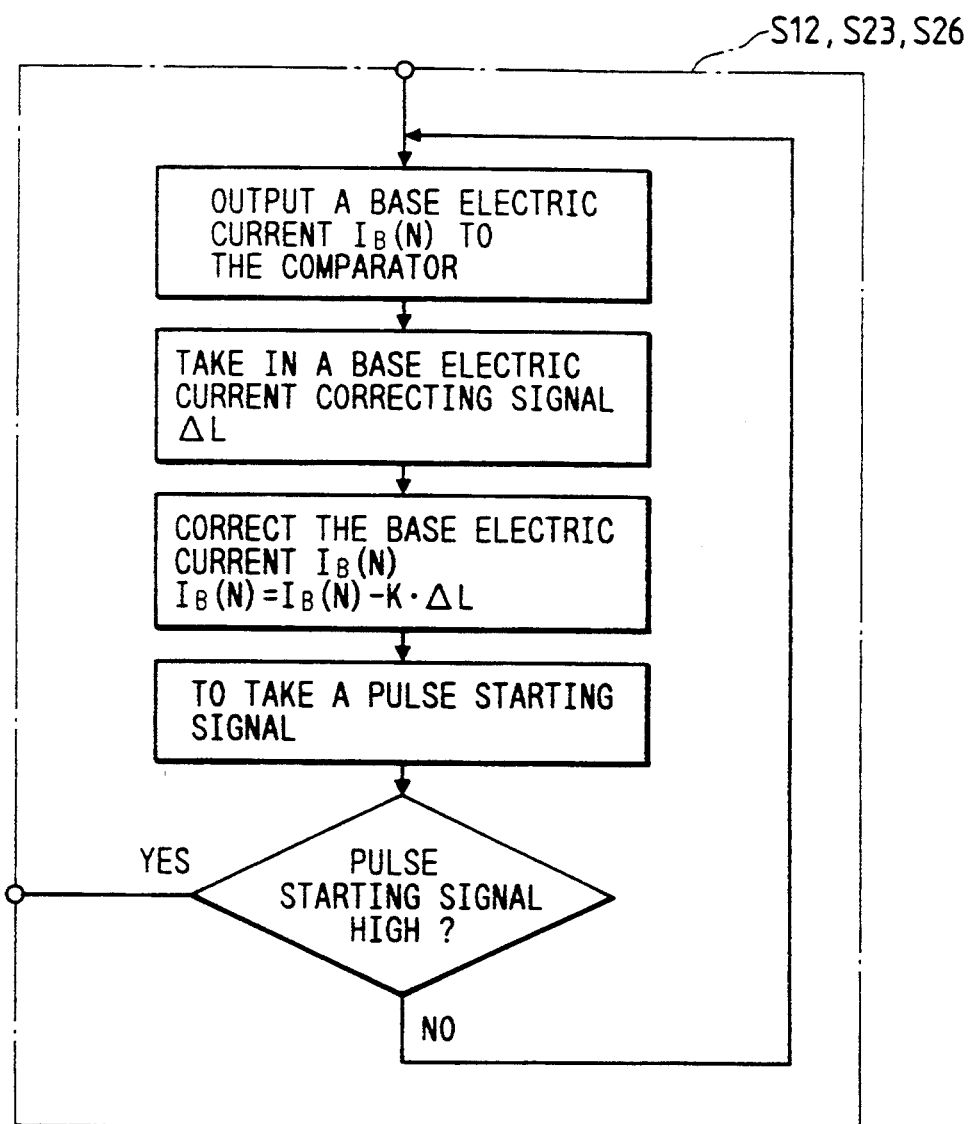

Next, FIG. 38 illustrates one example of the thirteenth embodiment. This embodiment differs the example of of the eleventh embodiment in FIG. 32 because the pulsed electric current waveform control circuit (8) additionally comprises the differential signal output device (89) described in the second embodiment as shown in FIG. 6. With this addition, the system in this system is formed into a short circuit transfer arc welding system. As illustrated in the configuration in FIG. 32, this welding system controls the pulse interval (i.e., the period of the base electric current) according to the detected arc length and controls over the value of the base electric current according to the detected arc length as shown in the configuration presented in FIG. 36, and the pulsed electric current waveform shaping device (81) controls the pulse intervals (i.e., the period of the base electric current) of the pulsed electric current $I_0$ to be outputted by applying the pulse starting signal. The pulse starting signal is applied according to the comparison of the detected arc length signal L (l) and the target arc length signal $L_0$ (N) from the pulse output control circuit (86). The welding system also controls the value of the base electric current in accordance with the differential output ΔL outputted from the differential signal output device (89). The differential output ΔL is the difference between the detected arc length signal L (l) from the and the target arc length signal.

In this embodiment, the flow chart showing the operations of the pulse group period setting device (93) is almost the same as that in FIG. 33. However, at the steps S12, S23, and S26 in FIG. 33, the pulse group period setting device (93) adjusts the base electric current value $I_B$ (N) to the value $I_B$ (N)=$I_B$ (N)−K·ΔL. Thus, the device (93) adjusts the base electric current value $I_B$ (N) according to the input of the differential output ΔL from the differential signal output device (89), as shown in FIG. 9.

Thus, the welding system is capable of determining on the basis of the arc length, the state of the molten globule lifted up in the pulse period by the electromagnetic force generated by the magnetic arc blow of the arc. Also, the welding system can correct the base electric current value $I_B$ in the base period by the differential output signal. The differential output signal ΔL represents difference between the detected arc length signal and the target arc length signal. Also, the welding system controls the starting time of the pulse in such a manner that the next pulse is sent out when the arc length signal becomes equal to or below the target arc length signal. Thus, the welding equipment can accurately and quickly approximate the target arc length and can also output pulses with certainty by confirming the target arc length. Accordingly, the welding system can output pulses in a manner suitable for dealing properly with the fluctuations in the phenomena even if the phenomena should undergo their fluctuations under the influence of external disturbances. Consequently, this welding equipment is able to perform the welding process with higher stability.

Figure 40:
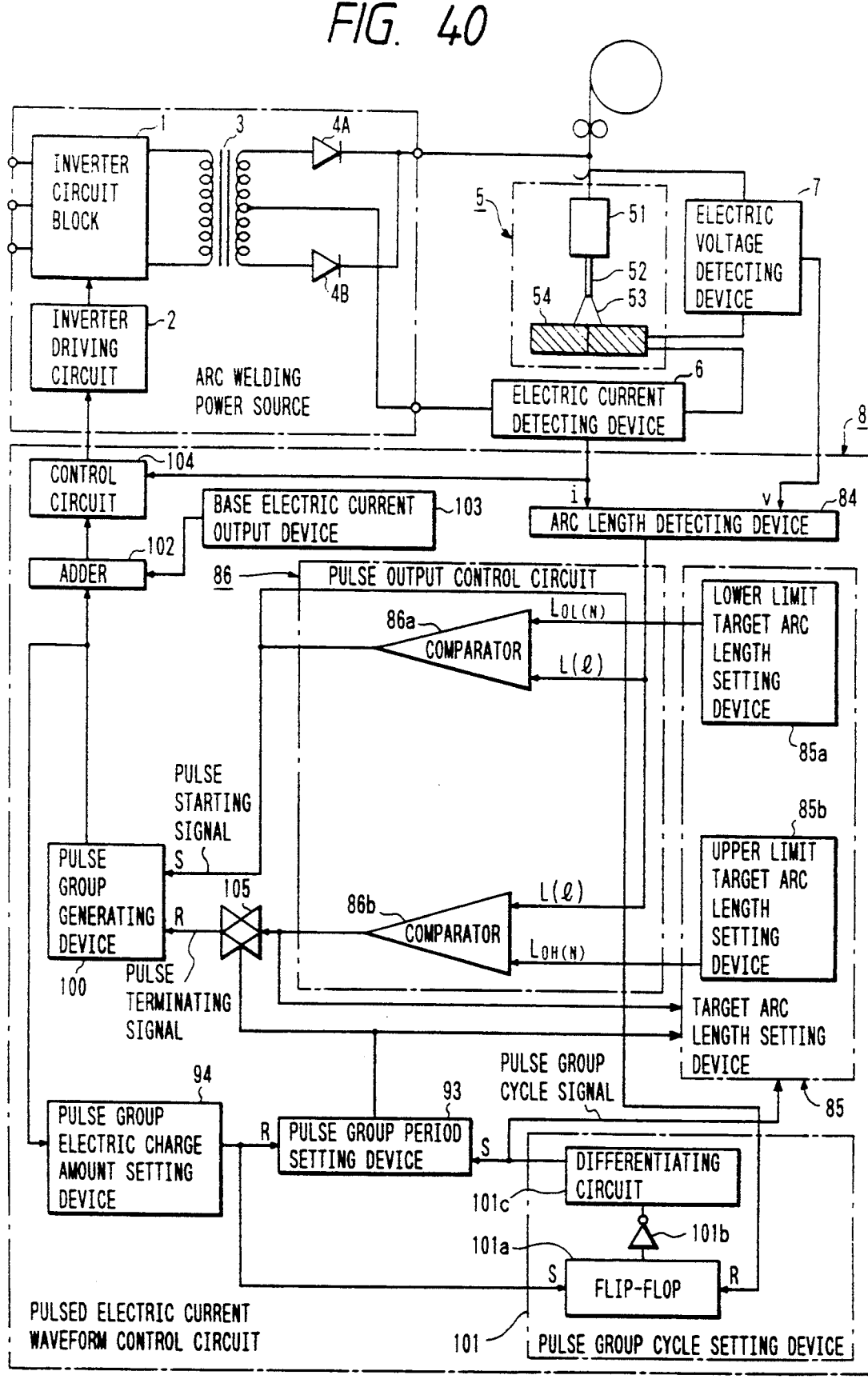
FIG. 40 through FIG. 44 illustrate the fourteenth embodiment.

Next, FIG. 40 is a configuration illustrating the pulsed arc welding system in one example of the fourteenth embodiment. The pulsed electric current waveform control circuit (8) comprises an arc length detecting device (84) which is similar to such a device described in the example of the eleventh embodiment illustrated in FIG. 32. The pulsed electric current waveform control circuit (8) further comprises a pulse group electric charge amount setting device (94) and a pulse group period setting device (93). The pulse group period setting device comprises a flip-flop. The pulsed electric current waveform control circuit (8) also has a pulse group generating device (100), a pulse group cycle setting device (101) having a flip-flop (101a), an inverter (101b). In addition, the control circuit (8) and a differentiating circuit (101c), a target arc length setting device (85), which has a lower limit target arc length setting device (85a) and an upper limit target arc length setting device (85b) containing the lower limit target arc length $L_{0L}$ (N) and the upper limit target arc length $L_{0H}$(N), respectively. The lower limit target arc length $L_{0L}$ (N) and the upper limit target arc length $L_{0H}$ (N) are set therein for the purpose of controlling the pulse width and pulse interval of each pulse that is output. The pulsed electric control circuit (8) contains a pulse output control circuit (86), which has a comparator (86a) compares the detected arc length value L (l) and the lower limit target arc length $L_{0L}$ (N) and that outputs a pulse starting signal ON when if L (l)<$L_{0L}$ (N) and a pulse starting signal OFF if L (l)>$L_{0L}$ (N). The pulse output control circuit (86) has another comparator (86b) that compares the detected arc length value L (l) and the higher limit target arc length $L_{0H}$ (N) and that outputs a pulse terminating signal ON if L (l)>$L_{0H}$ (N) and a pulse terminating signal OFF if L (l)<$L_{0H}$ (N). The comparator (86a) outputs a pulse starting signal in order to initiate the output of the pulsed electric current output from the pulse group generating device (100) when the detected arc length value L (l) falls to or below the lower limit target arc length $L_{0L}$ (N). Also, the comparator outputs a pulse terminating signal in order to terminate the output of the pulsed electric current when the detected arc length value L (l) attains the upper limit target arc length $L_{0H}$ (N), and this pulsed electric current waveform control circuit (8) furnish the control circuit (104) with a pulsed electric current $I_0$. The pulsed electric current $I_0$ is obtained by superposing the pulsed electric current obtained after the pulse group generating device (100) shapes its waveform on the base electric current $I_B$ sent out by the adder (102) from the base electric current output device (103). The control circuit (104) compares the pulsed electric current $I_0$ with the detected electric current value i and outputs a control signal to the inverter driving circuit (2) on the basis of the difference found by the comparison. Moreover, an analog switch which permits the passage of a pulse terminating signal. The analog switch (105) is controlled by the output from the pulse group period setting device (93). The pulse group setting device (93) is set by the output from the pulse group cycle setting device (101) and reset by the output from the pulse group electric charge amount setting device (94). In this regard, the target arc length setting device (85) renews the lower limit target arc length value $L_{0L}$ (N) and the upper limit target arc length value $L_{0H}$ (N) according a pulse terminating signal.

Figure 41:
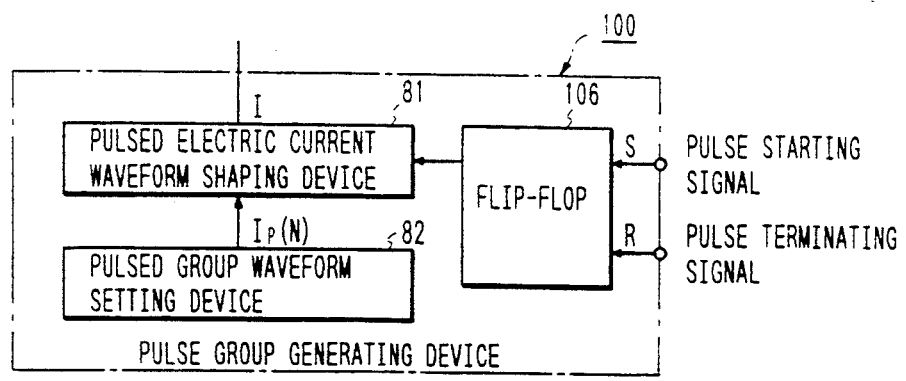

As shown in FIG. 41, the pulse group generating device (100) comprises a pulsed electric current waveform shaping device (81), which is similar to such a device described in the first embodiment, a pulse group waveform setting device (82), which contains predetermined pulse peak values $I_P$ (N), and an RS flip-flop (106), which is set on the basis of the pulse starting signal and reset on the basis of the pulse terminating signal. The pulsed electric current waveform shaping device (81) outputs a pulse $I_0$ for the peak value set in the pulse group waveform setting device (82) according to the RS flip-flop (106), renews the pulse peak value $I_P$ (N) in synchronization with the pulse $I_0$ in order to correct the value for the next pulse.

Figure 42:
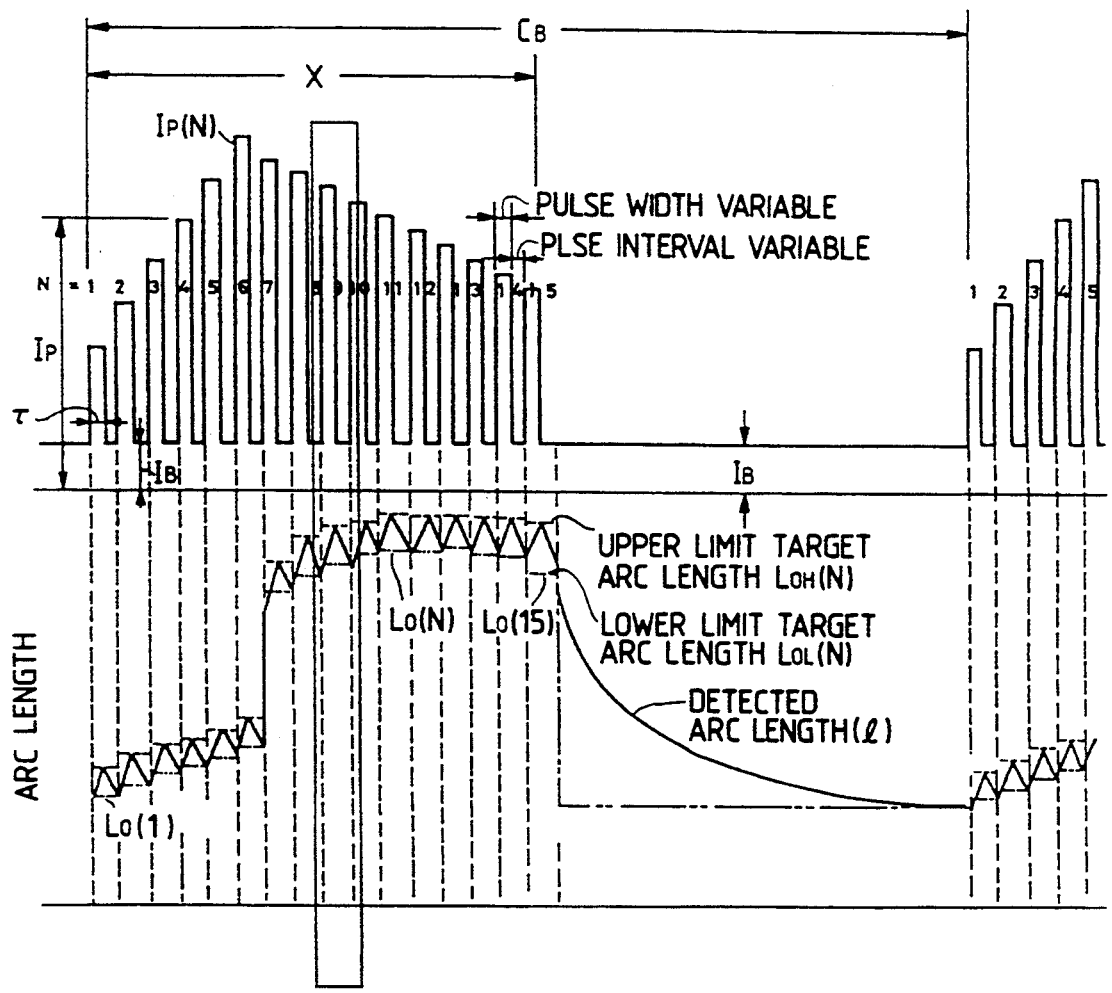

Next, the operations of the target arc length setting device (85) of the equipment in this example embodiment are described with reference to the waveform charts shown in FIG. 42 and FIG. 44 and with reference to the flow chart given in FIG. 43. First, the pulse group waveform setting device (82), the lower limit target arc length setting device (85a), and the upper limit target arc length setting device (85b) contain the peak values $I_P$ (N) for the individual pulsed electric currents. These values $I_P$(N) form the groups of pulsed electric currents for the range N=1 through 15, as shown in FIG. 42. Similarly, also the lower limit target arc length setting device (85a) and the upper limit target arc length setting device (85b) contain a plural number of signals $L_{0L}$(N) and $L_{0H}$(N), which correspond to the target arc lengths for the range N=1 through 15.

According to the construction shown in FIG. 40, the base electric current output device (103) outputs the base electric current $I_B$ to the side of the arc welding power source via the control circuit (104). The arc length detecting device (84) detects the arc length on the basis of the base electric current. Also, the pulse group period setting device (93) is set on the basis of the output from the pulse group cycle setting device (101). Also the target arc length setting device (85) is reset therewith to assume the initial-phase state (N=1). At this moment, the pulse group cycle setting device (101) outputs a pulse group period signal which enables the target arc length setting device (85) to operate.

Figure 43:
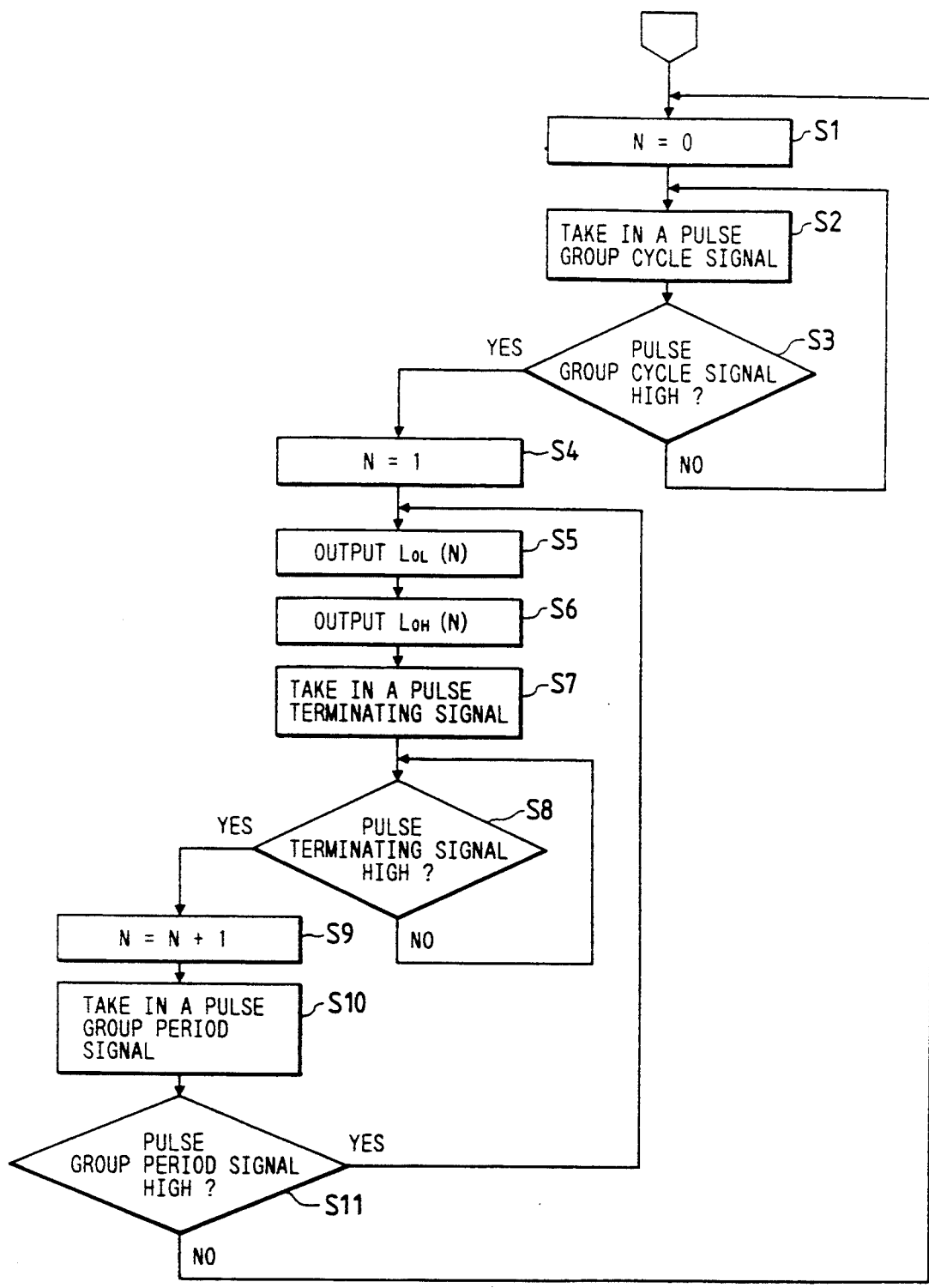

The target arc length setting device (85) is initialized on the basis of the input of the pulse group cycle signal $C_B$ and sets the repeating loop N at N=1, as shown in FIG. 43 (steps S1 through S4). Then, the target arc setting device (85) outputs the lower limit and upper limit target arc lengths $L_{0L}$ (1) and $L_{0H}$ (1) respectively from the lower limit target arc length setting device (85a) and the upper limit target arc length setting device (85b) (steps S5 and S6). As the result of the input of the lower limit and upper limit target arc lengths $L_{0L}$ (1) and $L_{0H}$ (1) into the comparators (86a) and (86b) of the pulse output control circuit (86), the arc length signal L (l) is set a small value at during initialization. Then, signal is sent out of the comparator (86a), and the pulse group generating device (100) outputs a pulse $I_0$ having the peak value $I_P$ (1) on the basis of the pulse starting signal. The pulsed electric current $I_0$ is then output from the pulse group generating device (100) to the control circuit (104) via the adder (102). Consequently, an inverter driving signal is thereby generated and inputted to the inverter driving circuit (2) and then transferred from the inverter driving circuit (2) to the inverter circuit block (1). A pulsed arc electric current is output to the weld zone, (i.e., the weld zone (5)), in the same manner as in the examples of embodiments described hereinabove. The pulsed arc electric current forms a pulsed arc discharge (53) between the wire electrode (52) and the base metal (54), and the pulsed arc discharge (53) fuses the base metal (54) and the tip of the wire electrode (52).

The arc length detecting device (84) detects an arc length L (l) on the basis of the signals I and V which are detected by the electric current detecting device (6) and the electric voltage detecting device (7), respectively. The arc length detecting device outputs the detected arc length L(l) to the pulse output control circuit (86). The comparator (86b) in the pulse output control circuit (86) compares the arc length L (l) with the upper limit target arc length $L_{0H}$(1). If, L (l)>$L_{0H}$(1), the comparator (86b) outputs a HIGH pulse terminating signal to the pulse group generating device (100) via the analog switch (105). The analog switch is controlled by the output from the pulse group period setting device (93).

The pulse group generating device (100) stops sending out the pulse when it receives the pulse terminating signal. After the pulse group generating device (100) receives the pulse terminating signal, the base electric current output device (103) continues conducting a prescribed base electric current $I_B$.

Then, the target arc length setting device (85) renews the repeating loop N when the pulse terminating signal HIGH (step S9). The target arc length setting device (85) continues executing steps S5 through S11 until the pulse group period signal assumes its low level (steps S10 and S11).

Figure 44:
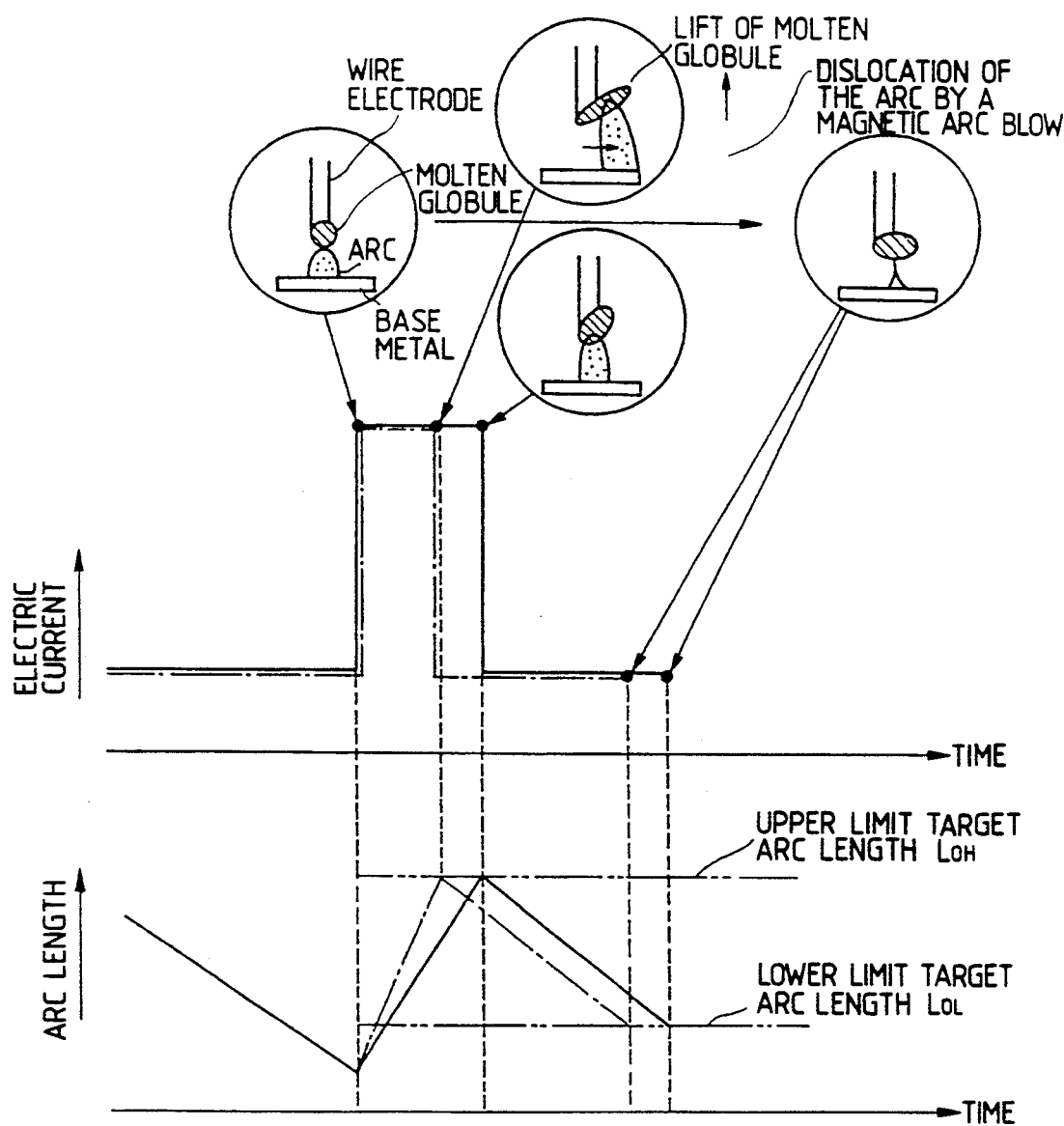

In this manner, the system of this embodiment given above continues to output the pulse $I_0$ having the pulse peak value $I_P$ (N) set by the pulse group waveform setting device (82), as shown in the enlarged waveform chart in FIG. 44, until the detected arc length signal L (l) equals the upper limit target arc length signal $L_0$(N). After the detected arc length equals the target arc length, welding system outputs the next pulse when the detected arc length signal L (l) equals the lower limit target arc length $L_{0L}$ (N), and consequently, the welding system variably controls the pulse width and the pulse interval according to the detected arc length. Thus, the system is designed to prevent the phenomenon of a lift of the molten globule due to the magnetic arc blow of the arc and thereby to maintain the accurate separation of the molten globule.

The target arc length setting device (85) is reset when the pulse group period signal X assumes the low level, and returns from step S11 to the step S1, shown in FIG. 43.

Therefore, according to the fourteenth embodiment, the welding system is capable of preventing welding defects such undercuts and a lack of uniformity in the welding beads. Thus, the welding system produces welded works that have improved quality since the system can eliminate any lift of the molten globule beyond the prescribed range regardless of of external disturbances in the course of the welding process. This is true because the equipment controls the pulse width and the pulse intervals in the pulse group in such a manner that the detected arc length signal will be kept within the range between the upper limit target arc length signal and the lower limit target arc length signal. As a result, the system is capable of determining if the molten globule is lifted up by the electromagnetic force of the group of pulses in the arc period.

Figure 45:
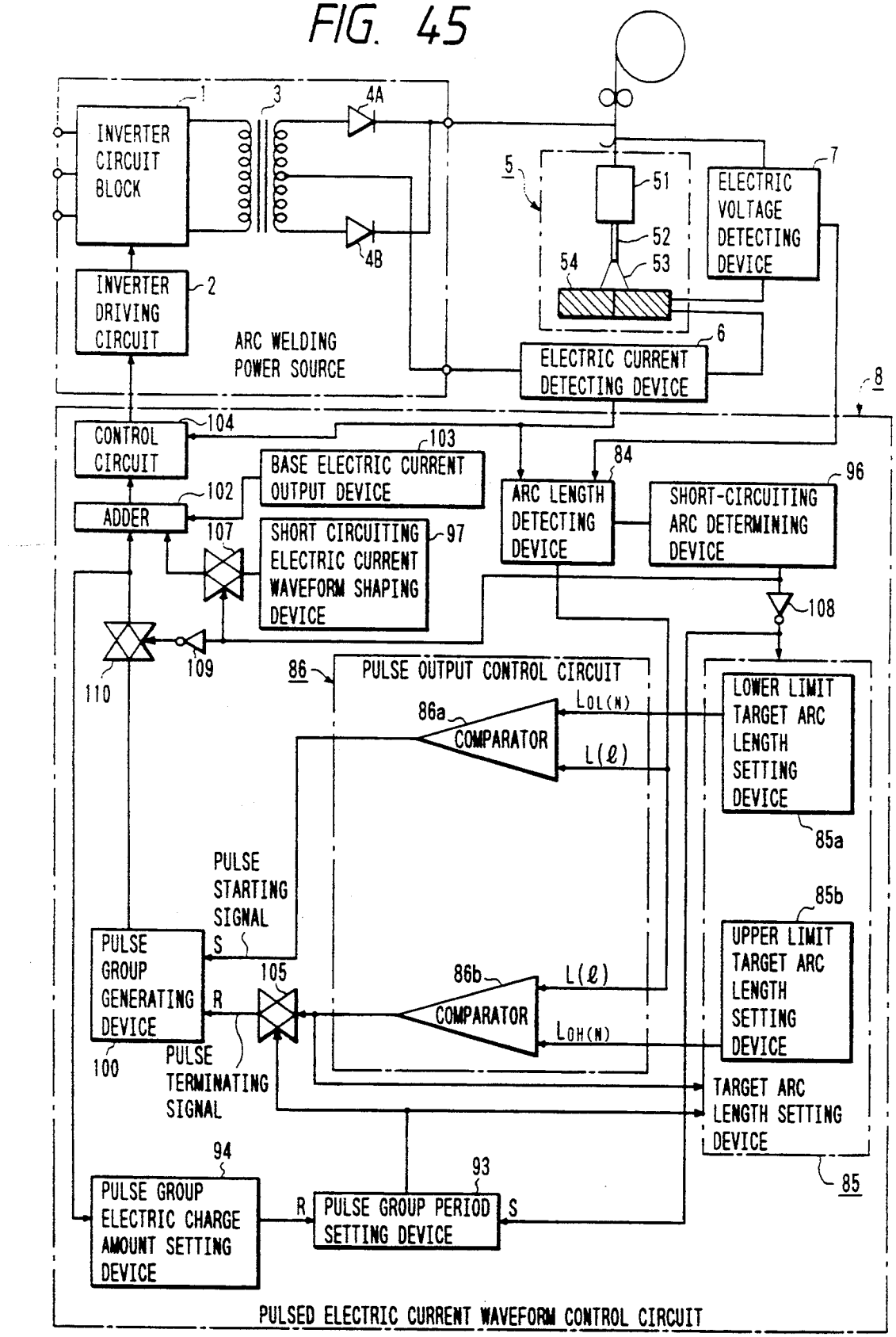
FIG. 45 and FIG. 46 illustrate the fifteenth embodiment.

Next, FIG. 45 illustrates one example of the fifteenth embodiment. In FIG. 45, the welding system is different from the fourteenth embodiment shown in FIG. 40 because that the pulsed electric current waveform control circuit (8) additionally comprises circuit and arc determining device (96), which is similar to such a device shown in FIG. 21 (a) and FIG. 21 (b), and a short circuiting electric current waveform shaping device (97). The welding system transforms into a short circuiting transfer arc welding system. This system is designed to supply a short circuiting electric current $I_s$ to the adder (102) via of the analog switch (107). The output of the analog switch (107) is controlled by a short circuit determining signal. The system also supplies the pulsed arc electric current from the pulse group generating device (100) to the adder (102), in the same way as the example of the fourteenth embodiment shown in FIG. 40. The system transforms into a short circuiting transfer arc welding system when the arc determining signal which changes from its LOW level to its HIGH level, (i.e., when the short circuit determining signal from the short circuit and arc determining device (96) shifts from its HIGH level to its LOW level). These signals shift when the electric voltage detected by the electric voltage detecting device (7) rises. The electric voltage rises upon the generation of an arc as the molten globule at the tip of the wire electrode (52) is burned out as a result of the conduction of the short circuiting electric current. Regard, the reference numbers (109) and (110) denotes an the inverter (109), which inverts the short circuit determining signal, thereby creating the arc determining signal. This arc determining signal is input by an analog switch (110).

Figure 46:
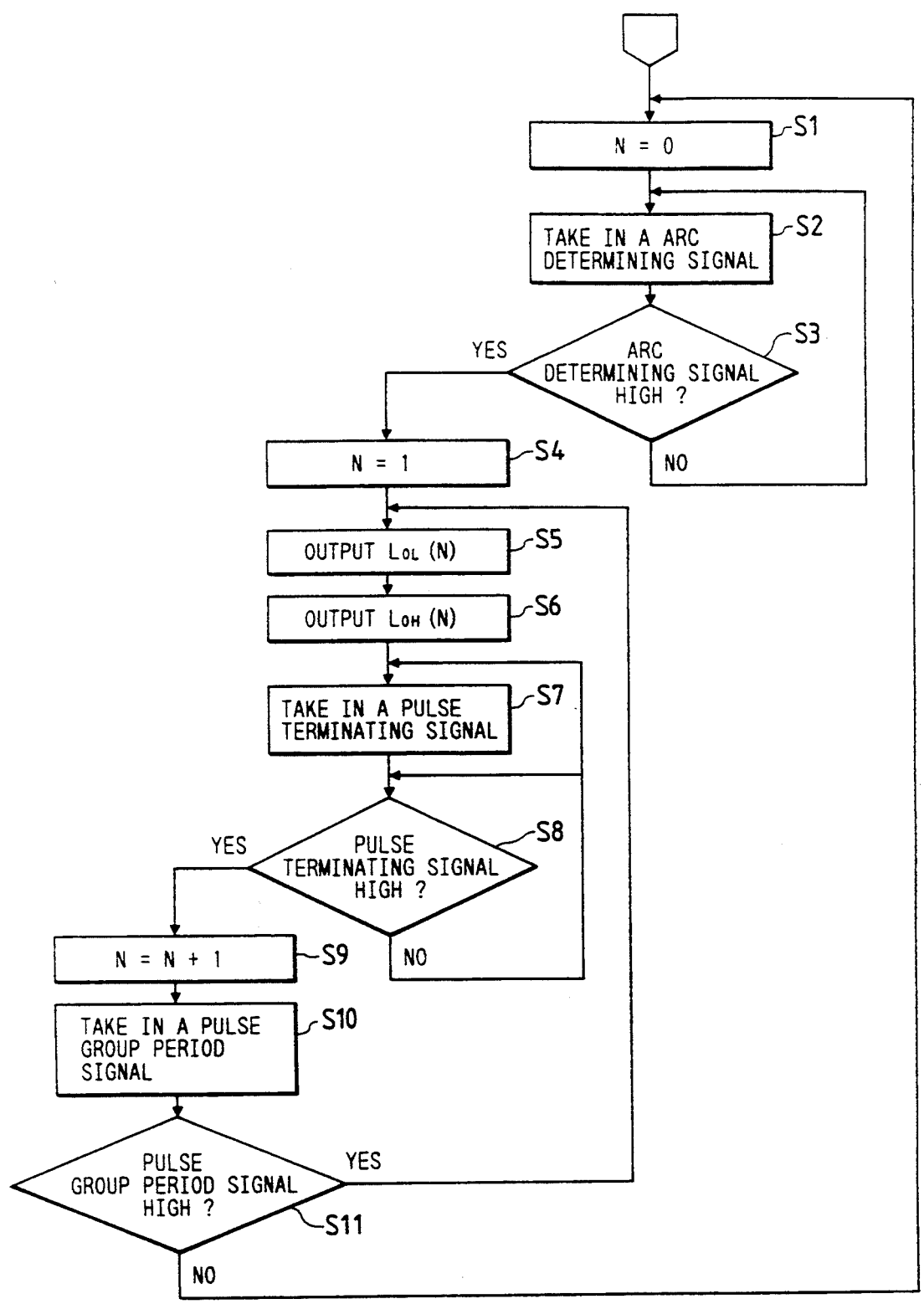

Next, the operations of the operations of the target arc length setting device (85) of the welding system in this embodiment are described with reference to the flow chart given in FIG. 46. First, in this short circuiting transfer arc welding system, the tip of the wire electrode (52) is short-circuited to the base metal (54) when the switch of the power source (not shown) is initially turned on. In this initial state, the short circuit and arc determining device (96) outputs a short circuit determining signal. Also the pulse group generating device (100), which sends out the arc electric current, remains inoperable until it receives the inverted signal of the short circuit determining signal, (i.e., the arc determining signal). On the other hand, and the short circuiting electric current waveform shaping device (97), outputs the short circuiting electric current $I_s$ to the adder (102) the short circuit determining signal.

After the short circuiting electric current $I_s$ is output from the short circuiting electric current waveform shaping device (97) being to the adder (102), an inverter driving signal is output from the inverter driving circuit (2) to the inverter circuit block (1). This inverter drives signal drives the inverter. Consequently, as shaped alternating current waveform is output to the high frequency transformer (3), and the signal output from the high frequency transformer (3) is rectified into a direct current waveform by the high frequency diodes (4A) and (4B). The short circuiting electric current waveform $I_s$ is output to the weld zone (i.e., weld zone (5)). As a result, the molten globule growing at the tip of the wire electrode (52) is burned out and is separated and transferred to the base metal (54).

At this time, the short circuit and arc determining device (96) stops outputting the short circuit determining signal the output from the arc length detecting device (84) (i.e., the short circuit and arc determining device (96) outputs an arc determining signal) (step S6). As a result of the arc determining signal, the short circuiting electric current waveform shaping device (97) stops outputting the short circuiting electric current $I_s$. Consequently, the operation shifts from the short circuit period to the arc period.

Then, the target arc length setting device (85) receives the input of the inverted signal of the short circuit determining signal mentioned above (i.e., the arc determining signal) and sets the repeating loop N at N=1 (steps S1 through S4). At steps S5 through S11, the target arc length setting device (85) continues supplying the flow of the pulse $I_0$ which has the pulse peak value $I_P$ (N) set in the pulse, group waveform setting device (82). The device (85) supplies the pulse $I_0$ until the detected arc length signal L (l) equals the upper limit target arc length signal $L_{OH}$ (N). The device (85) outputs the next pulse after the pulse $I_0$ equals the lower limit target arc length $L_{OL}$ (N), in the same manner as shown in FIG. 43. Thus, the system variably controls the pulse width and the pulse interval according to the detected arc length and prevents the phenomenon of a lift of the molten globule due to the magnetic arc blow of the arc. Consequently, the target arc length setting device (85) maintains the regularity in the separation of the molten globule.

Therefore, according to the fifteenth embodiment, the welding system, is able to determine the short circuit period and to furnish the flow of the short circuiting electric current in the short circuit period. Also, the welding system is capable of performing the welding process in a favorable condition, not only in the pulsed arc welding process, but also in the short circuiting transfer arc welding process. In the short circuiting transfer arc welding process, the separation of the molten globule is achieved by short circuiting. The welding system can also performing the welding process with reduced fluctuations in the short circuit period and the arc period. As a result, there are reduced fluctuations in the uniformity in the shape of the welding beads and in the depth of the weld penetration, in addition to the effects achieved by the welding system of the fourteenth embodiment.

Figure 47:
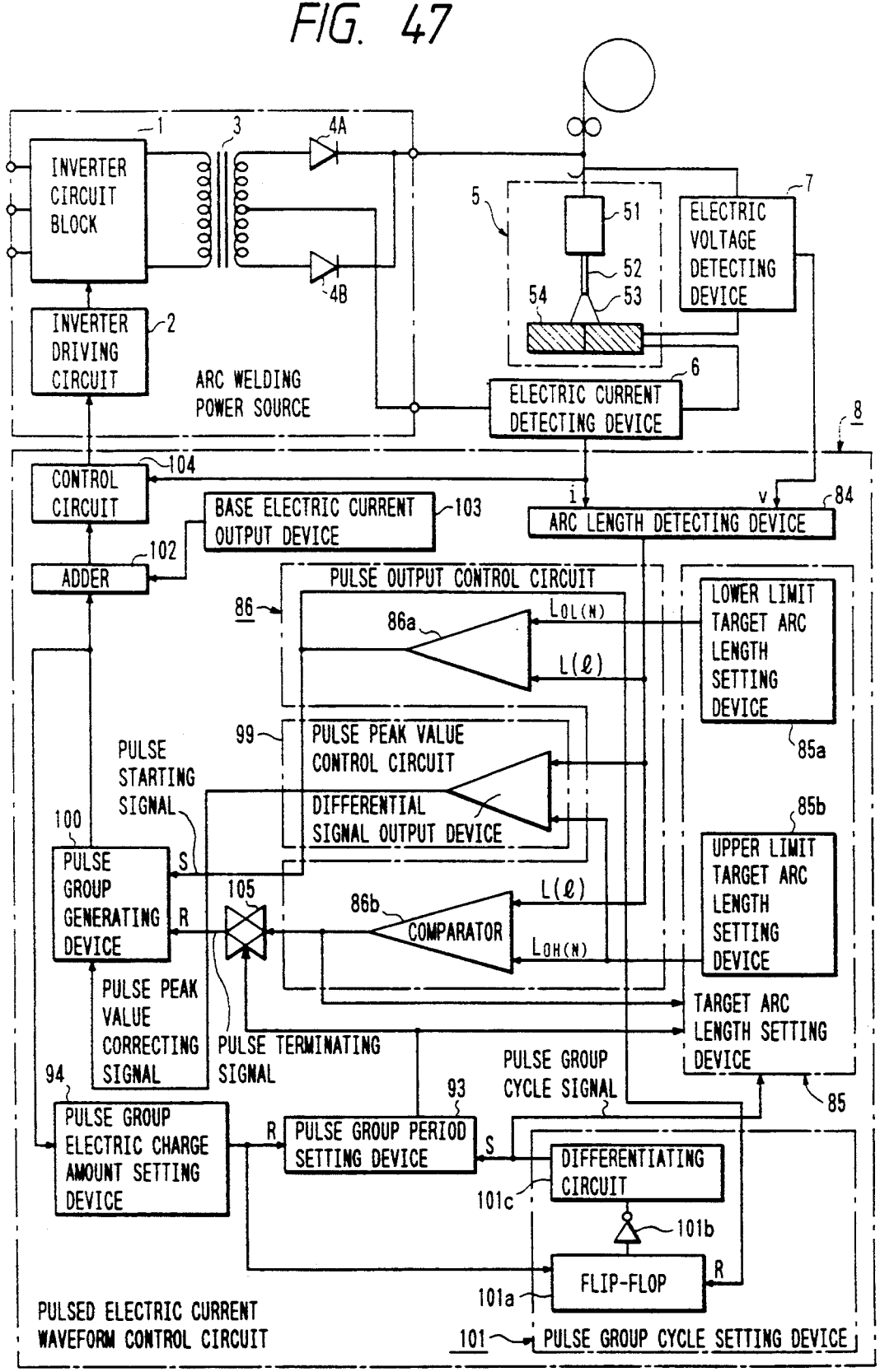
FIG. 47 and FIG. 48 are configuration drawings respectively illustrating one example each of the sixteenth embodiment and the seventeenth embodiment.

Next, FIG. 47 illustrates one example of the sixteenth embodiment. In FIG. 47, the construction of the welding system is different from the construction of the fourteenth embodiment shown in FIG. 40 because the pulsed electric current waveform control circuit (8) additionally comprises a pulse peak value control circuit (99). A pulsed peak value control circuit (99) comprises a differential signal output device for finding the differential output, $\Delta L = L (l) - L_0 (N)$. The differential output $\Delta L$ is the difference between the detected arc length value L (l) output from the arc length detecting device (84) and the upper target arc length $L_{OH}$ (N) output from the upper limit target arc length setting device (85b) of the target arc length setting device (85). It should be noted that the arc length detecting device (84) is similar to such a device mentioned in the seventh embodiment in FIG. 24. This pulse peak value control circuit (99) is thus designed to correct the pulse peak value $I_P$ (N) set with the pulse group waveform setting device (82) according to the equation, $I_P (N) = I_P (N) - A \cdot \Delta L$. In the equation, A expresses a constant and $\Delta L$ expresses the differential output. The differential output $\Delta L$ represents the pulse peak value correcting signal and in output to the pulsed electric current waveform shaping device (81) in the pulse group generating device (100).

Then, in this embodiment as shown in FIG. 47, the target arc length setting device (85) performs its operations in the same manner as illustrated in the flow chart presented in FIG. 43. In other words, the system is designed to correct the pulse peak value $I_P$ (N) in the pulse group generating device (100) set by the pulse group waveform setting device (82). The system corrects the pulse peak value $I_P$ (N) in accordance with the differential output ΔL. The differential output ΔL is the difference between the detected arc length signal L (l) and the upper limit target arc length signal $L_{0H}$ (N). Consequently, the welding system can prevent the phenomenon of the lift of the molten globule due to the magnetic arc blow of the arc and secure the regularity in the separation of the molten globule.

Therefore, according to the sixteenth embodiment the welding system can accurately and quickly control the arc length by correcting the pulsed electric current $I_0$ according to the differential output signal ΔL. Thus, the system can determine the lift of the molten globule due to the electromagnetic force in the pulse period on the basis of the arc length detecting signal which corresponding to the arc length.

Figure 48:
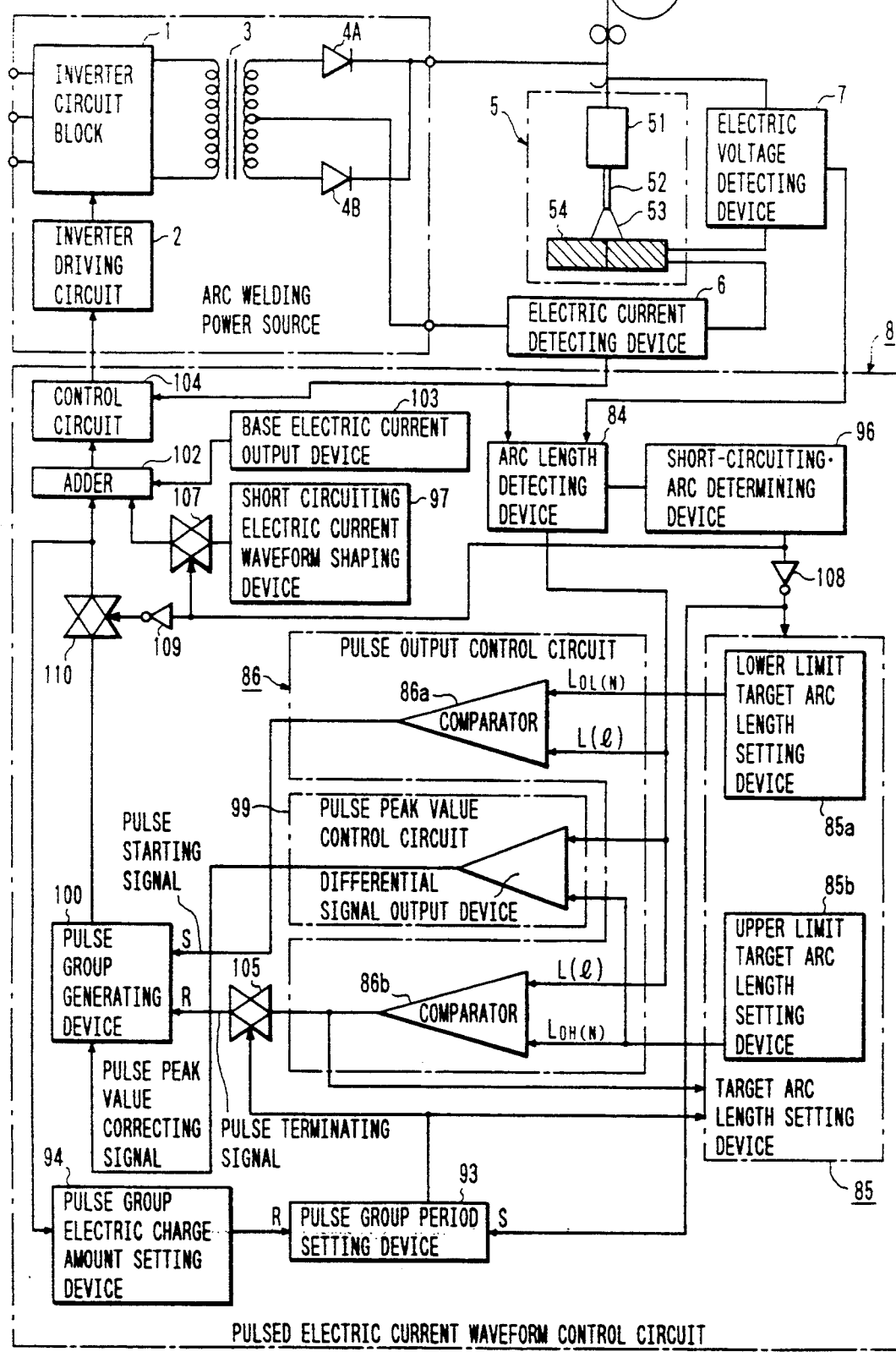

FIG. 48 illustrates the configuration of one example of the seventeenth embodiment. The construction of the welding system in this embodiment is different from the construction of the short circuiting transfer arc welding system of the fifteenth embodiment shown in FIG. 45 because the pulse peak value control circuit (99) has been added. In addition, the pulse peak value control circuit (99) is similar to such a circuit of the sixteenth embodiment illustrated in FIG. 47. In this short circuiting transfer arc welding system, a short circuiting electric current $I_s$ is generated by the short circuit and arc determining device (96) at the time the initial-phase state is applied to the adder (102). The short circuiting electric current $I_s$ is output from the short circuiting electric current waveform shaping device (97) in the initial-phase state on the basis of the short circuit determining signal. As a result of the conduction of the short circuiting electric current $I_s$, the molten globule at the tip of the wire electrode (52) is burned out and an arc is generated. Consequently, the electric voltage detected by the electric voltage rises and in detecting device (7). Then, short circuit determining signal from the short circuit and arc determining device (96) changes from its HIGH level to the LOW level. Along with this change, the signal passes through the inverter (109) and the arc determining signal changes from its LOW level to the HIGH level. When this arc determining signal is received, the pulsed arc signal is output from the pulse group generating device (100) in the same way as in the fifteenth embodiment. Then, the pulsed arc signal is output to the adder (102). At this moment, the pulse group generating device (100) receives as a pulse peak value correcting signal. The pulse peak value correcting signal is a differential output signal from the pulse peak value control circuit (99). The pulse peak value control circuit (99) comprises a differential signal output device. The differential signal output device obtains the differential output, ΔL=L (l)−$L_0$ (N). The differential output ΔL is the difference between the arc length detecting value L (l) which is output from the arc length detecting device (84) and the upper limit target arc length $L_0$ (N), which is output from the upper limit target arc length setting device (85b). The pulse group generating device (100) corrects the pulse peak value $I_P$ (N), which is set with the pulse group waveform setting device (82) according to the differential output mentioned above. Also, similar to the operation of the fifteenth embodiment, the pulse group generating device (100) continues to supply the flow of the pulse $I_0$ having the pulse peak value $I_P$(N) until the detected arc length signal L (l) equals the upper limit target arc length signal $L_0$ (N). Also, the pulse group generating device (100) outputs the next pulse after the pulse equals the lower limit target arc length L0L (N). Consequently, the system variably controls the pulse width and the pulse interval according to the detected arc length. As a result, the welding system prevents the phenomenon of the lift of the molten globule due to the magnetic arc blow of the arc and maintains the regularity in the separation of the molten globule.

Therefore, the seventeenth embodiment accurately performs the welding process accurately and quickly controlling the arc length, not only in the pulsed arc welding process, but also in the short circuiting transfer arc welding process. The short circuiting transfer arc welding process performs the separation of the molten globule by short circuiting, Thus, the welding system accurately controls the welding process by reducing the fluctuations in the short circuit period and the arc period. Consequently, the system reduces the fluctuations in the uniformity of the shape of the welding beads and the fluctuations in the depth of the weld penetration, as well as the effects achieved by the sixteenth embodiment shown in FIG. 47. Also, the system is capable of determining the short circuit period and furnishing the flow of the short circuiting electric current in the short circuit period.

Moreover, in the individual examples of the first through seventeenth embodiments, a group of pulsed electric currents in conical shapes are transmitted to ensure that the electromagnetic pinching force generated by the pulsed electric currents will attain the maximum level when a constriction is formed on the molten globule in the course of the growth and separation phenomena of the molten globule at the tip of the wire electrode when the pulsed arc welding process is performed. Consequently, the constriction in the boundary region between the solid part and the molten globule of the wire electrode is increase and the molten globule can be separated with certainty and transferred to the base metal. Furthermore, the peak value waveform of the pulse group is lowered after the separation of the molten globule. This reduction of the peak value waveform minimizes the phenomenon of a lift of the molten globule freshly formed on the wire electrode and maximizes the growth of the molten globule. Therefore, the separation of the molten globule with the next group of pulses can be achieved with greater ease.

Figure 49:
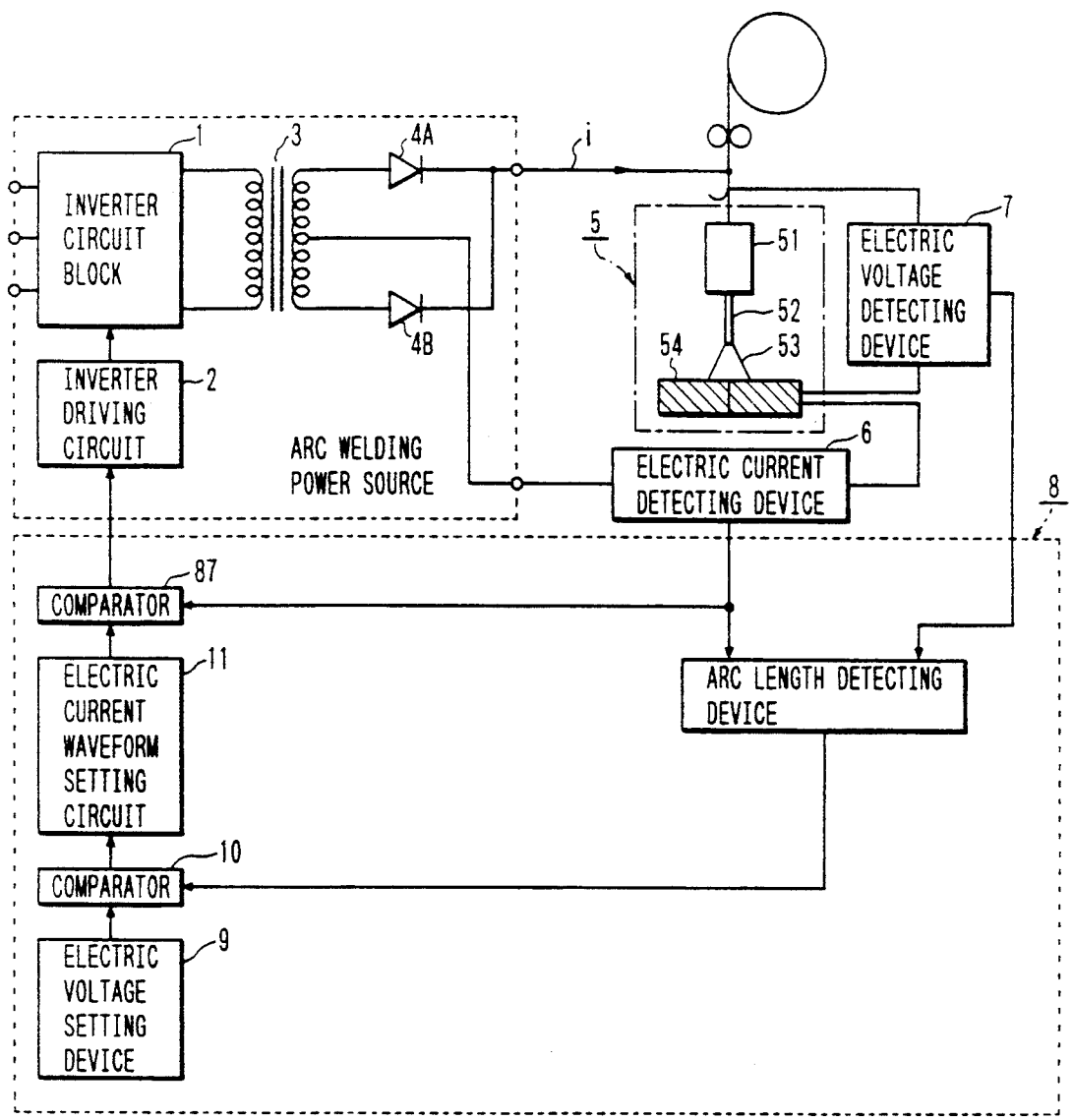
FIG. 49 is a configuration drawing illustrating the pulse welding equipment in one example of the eighteenth embodiment.

FIG. 49 illustrates the pulse welding system in one example of the eighteenth embodiment. In the welding system shown in this FIG. 49, the pulsed electric current waveform control circuit (8) an arc length detecting device (84) and a comparator (87). These devices are similar to such devices described in the first embodiment in FIG. 1. The pulsed electric current waveform control circuit (8) also comprises an electric voltage setting device (9) and a comparator (10). The comparator (10) compares the arc length signal L (l) generated by the above-mentioned arc length detecting device (84) and the electric voltage value $V_o$ set by the electric voltage setting device (9) and sends out its output when the arc length signal ≦ set electric voltage value. The pulsed electric current waveform control circuit further comprises an electric current waveform setting circuit (11), which generates groups of prescribed pulsed electric currents on the basis of the output from the comparator. The groups of pulsed electric currents output from the electric current waveform setting circuit (11) are controlled in such a manner that their conduction when the arc length signal falls to or below the set electric voltage value or. In other words, the pulsed electric currents are controlled in such a manner that the conduction of the groups of the pulsed electric currents begins when the arc length signal attains the predetermined minimum arc length value. As a result, the short circuiting of the wire electrode and the base metal is prevented.

Figure 50A:
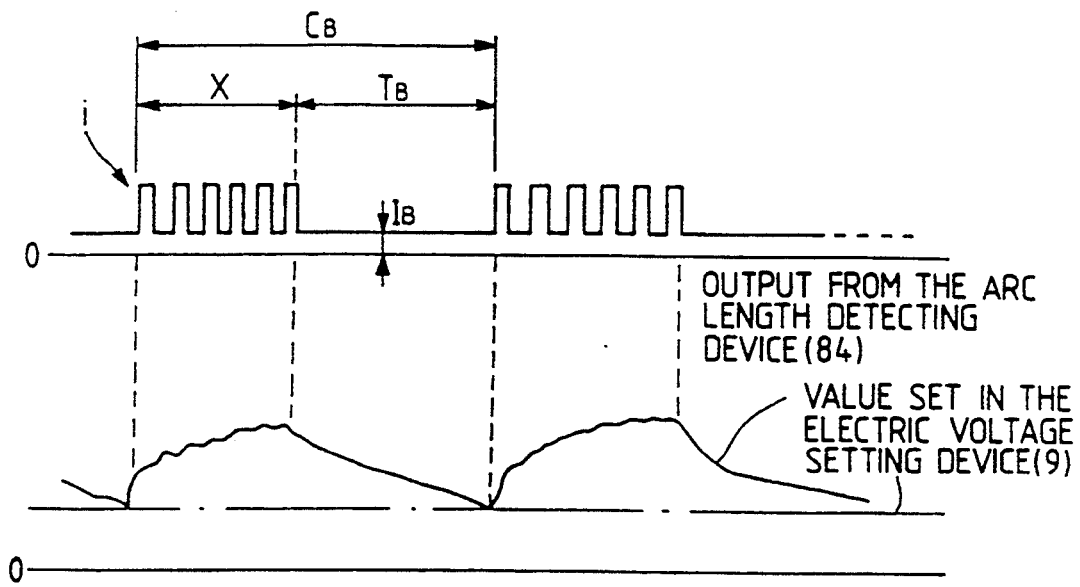
FIG. 50 (a) through FIG. 50 (c) are operating waveform charts illustrating the eighteenth embodiment through the twenty-first embodiment.
Figure 50B:
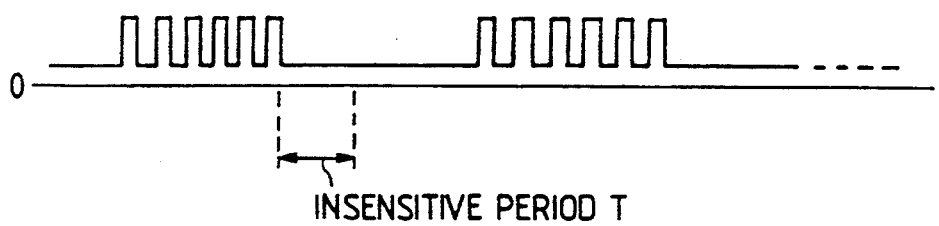
Figure 50C:
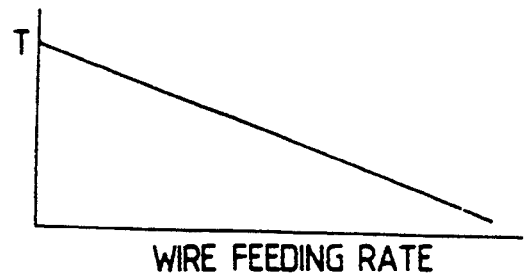

Next, the operations of the system of this embodiment are described with reference to the waveform chart given in FIG. 50. A pulsed electric current i composed of a plural number of pulse groups is superposed on the base electric current $I_B$. Then, the pulse electric current i is output from the electric current waveform setting circuit (11), as shown in FIG. 50 (in x expresses the pulse group interval, $C_B$ expresses the pulse group cycle, and $T_B$ expresses the base electric current period.

This set pulse group electric current signal and the electric current signal, which is detected by the electric current detecting device (6), compared by the comparator (87). The signal outputted by the comparator (87) (i.e., the comparison difference signal) is input into the inverter driving circuit (2). An inverter driving signal corresponding to the pulsed arc electric current waveform i, shown in FIG. 50, is transferred from the inverter driving circuit (2) to the inverter circuit block (1). The inverter driving signal drives the inverter.

After driving of the inverter, a shaped alternating current waveform is output to the high frequency transformer (3). Furthermore, the signal output from the high frequency transformer (3) is rectified into a direct current waveform by means of the high frequency diodes (4A) and (4B). Then, the pulsed arc electric current waveform i shown in FIG. 50, is fed to the weld zone (i.e., the weld zone (5)).

In the arc loading zone (5), a wire electrode (52) is fed continuously by a motor (not shown) as the pulsed arc electric current waveform i is input. Therefore, a pulsed arc discharge (53) is generated between the wire electrode (52) and the base metal (54) by the pulsed arc electric current waveform i, and the base metal (54) and the tip of the wire electrode (52) are fused by the pulsed arc discharge (53). The welding process is performed by continually dropping the fused part of this wire electrode (52) onto the base metal (54). As a result of this operation, the wire electrode (52) is continually consumed. In order to replenish the consumed quantity of the wire electrode (52), the wire electrode (52) is fed continually by the above-mentioned motor to the welding torch (51).

Since the pulse group arc electric currents are applied in a cyclical mode, the molten globule formed on the wire electrode in synchronization with the pulse group is separated easily. This is due to the increase of the growth of the molten globule by fusion and constriction achieved by the vibrations of the molten globule along with the arc discharge which occurs in correspondence with the pulse group. After the molten globule is separated, a new molten globule is formed again and grows and is also lifted up on the tip of the wire electrode. Subsequently, in the base electric current period $T_B$, the lifted up molten globule hangs downward, and the the molten globule is shaped in time for the start of the next pulse group. Thus, the growth and separation of the molten globule are repeated in a regular way.

On the other hand, the output from the arc length detecting device (84) will decline gradually after the application of the group of pulsed electric currents between the electrodes because of the suspension of the molten globule at the tip of the wire electrode (52). The output from the arc length detecting device (84) and the value set with the electric voltage setting device (9) are compared by the comparator (10). In order to prevent a short circuit with the base metal (54) during the separation and transfer of the molten globule from the tip of the wire electrode (52) to the side of the base metal (54), a HIGH level output signal is transmitted when the output from the arc length detecting device (84) is either smaller than or equal to the set value of the electric voltage setting device (9). On the basis of this output, the group of pulsed electric currents output from the electric current waveform setting circuit (11) will begin to be transmitted. Accordingly, the molten globule will constrict as this group of pulsed electric currents begins to be transmitted, and the molten globule will separate by the increase of this constriction. Consequently, the molten globule will not create a short circuiting with the base metal when the molten globule is separated and is transferred to the base metal. Thus, the growth and separation of the molten globule will be performed smoothly.

Moreover, the wave form of the pulsed electric current group is formed of a plural number of pulsed electric currents. A discharge electric current waveform is create by this group of pulsed electric currents that are repeated cyclically therein. The cyclical repetition produces divides one pulse into a plural number of pulses. As a result of this division of the pulsed electric current waveform, the upward electromagnetic force of the pulsed arc discharge on the wire electrode becomes intermittent and the force which lifts up the molten globule formed on the tip of the wire electrode is reduced. Therefore, the molten globule formed on the tip of the wire electrode will readily separate from the wire electrode before the molten globule grows into a large lump not only in the atmosphere of gas composed mainly of argon but also in the atmosphere of $CO_2$ gas.

Thus, according to the eighteenth embodiment shown in FIG. 49, the welding system is designed to controls the start of the conduction of the pulsed electric currents or the group of pulsed electric currents, and begins conduction when the detected arc length signal falls to or below the prescribed value. Therefore, the welding system is capable of performing the separation and transfer of the molten globule with certainty. Consequently, the system can accurately weld without any detrimental effects due to a short circuiting of the molten globule at the tip of the wire electrode with the base metal.

Figure 51:
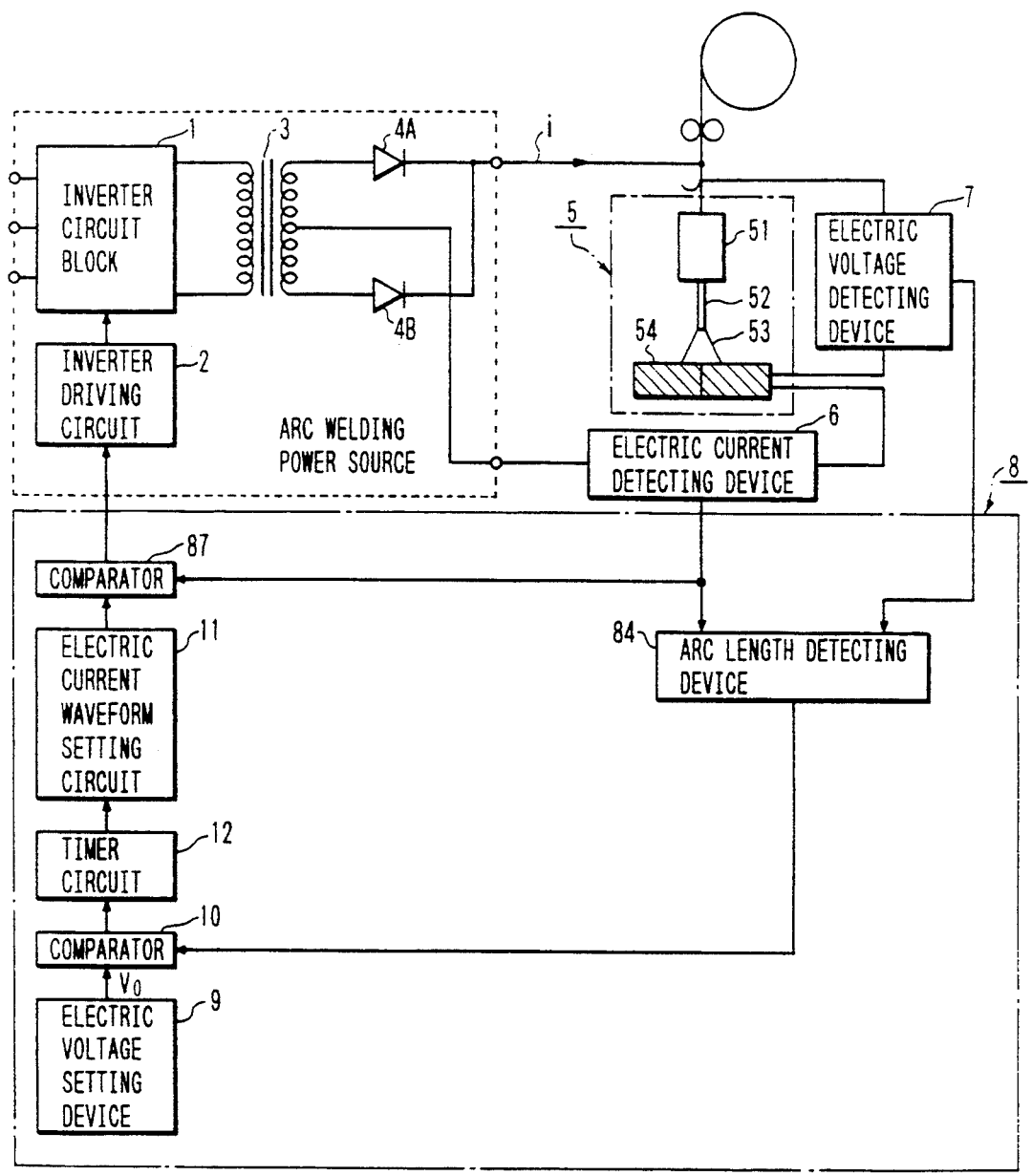
FIG. 51 is a configuration drawing illustrating the pulse welding system in one example of the nineteenth embodiment.

Next, FIG. 51 is a drawing illustrating the pulsed arc welding system in one example embodiment of the nineteenth embodiment. The construction of this system is different from that of the example of the eighteenth embodiment shown in FIG. 49, because this system comprises a timer circuit (12). The timer circuit (12) is located between the comparator (10) and the electric current waveform setting circuit. Another difference is that the welding system controls the start of the conduction of the groups of pulsed electric currents from the electric current waveform setting circuit (11). The welding system begins conduction when the output from the arc length detecting device (84) has been either less than or equal to the value set in the electric voltage setting device (9) for a prescribed duration of time.

According to the nineteenth embodiment, the system is capable of preventing an erroneous start of the conduction of the group of pulsed electric currents when the apparent arc length declines to zero because of an abnormal short circuit phenomenon that occurs in the pulsed electric current group period x. Thus, the system can maintain regularity in the growth and separation of the molten globule. In other words, the nineteenth embodiment is practical since it is capable of preventing an interruption in the arc that would otherwise occur due to an erroneous start of the conduction of the group of pulsed electric currents because the occurrence of a short circuit.

Figure 52:
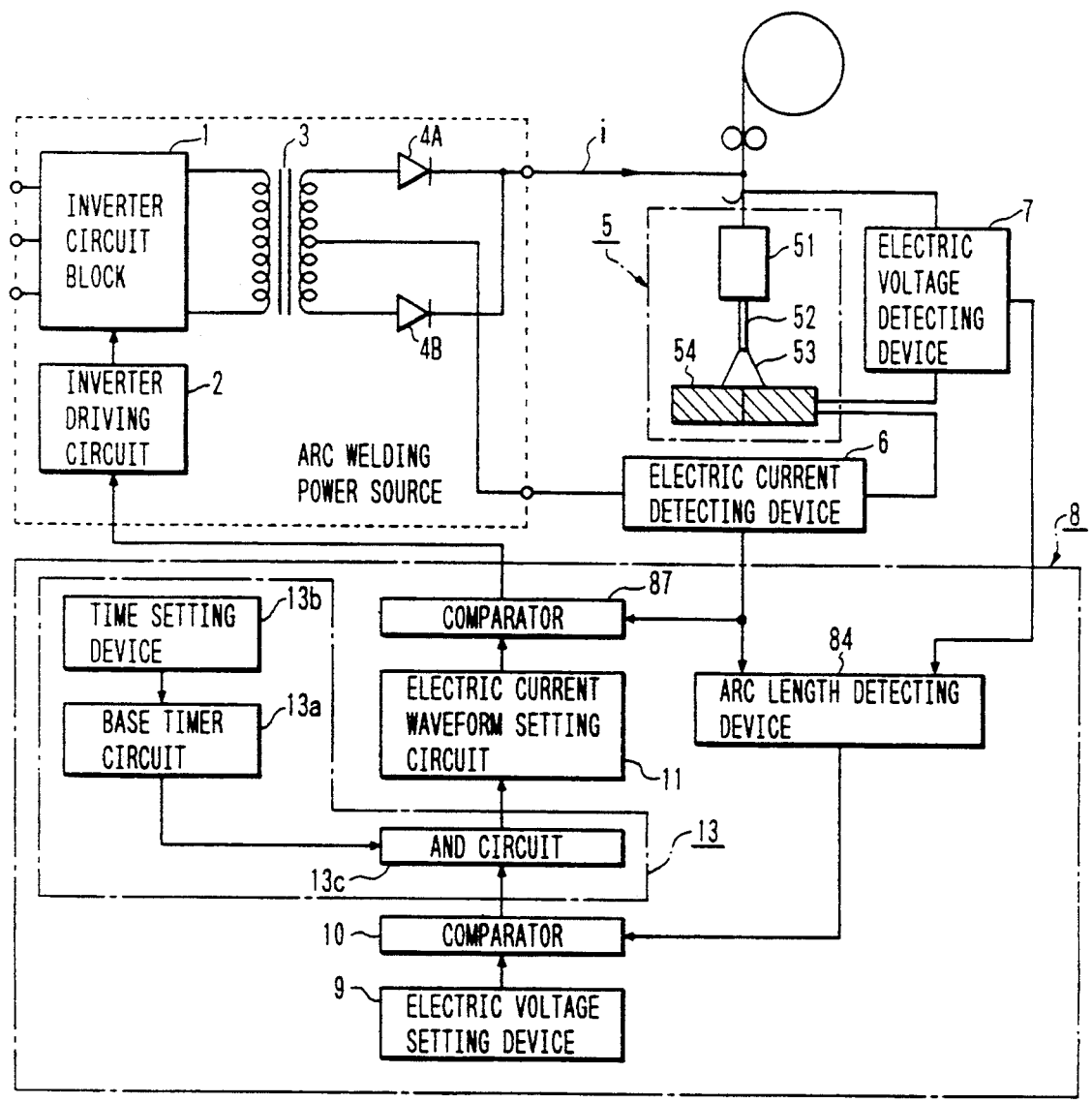
FIG. 52 is a configuration drawing illustrating the pulse welding system in one example of the twentieth embodiment.

Next, FIG. 52 is a drawing illustrating the pulsed arc welding system in one example of the twentieth embodiment. In FIG. 52, the construction of the welding system is different from that of the welding system described in the example embodiment of the eighteenth embodiment as shown in FIG. 49 because the pulsed electric current waveform control circuit (8) additionally comprises a base electric current period maintaining circuit (13). The base electric current period maintaining circuit (13) controls the start of the conduction of the group of pulsed electric currents sent out from the electric current waveform setting circuit (11). This base electric current period maintaining circuit (13) comprises a base timer circuit (13a), which counts the time from the start of the base electric current period. The base timer receives a signal from a time setting device (13b) and sends out an operating signal after a determined time. This base electric current period maintaining circuit (13) further comprises a time setting device (13b), which determines the time just mentioned, and an AND circuit (13c). The AND circuit (13c) obtains the logical product of the output from the comparator (10) and the output from the base timer circuit (13a). The electric current waveform setting circuit (11) generates the prescribed group of pulsed electric currents on the basis of the logical product output.

In other words, the group of pulsed electric currents output from the electric current waveform setting circuit (11) is controlled in such a manner that the start of the conduction of the group of pulsed electric currents is prohibited during the period of the insensitive time set by the base electric current period maintaining circuit (13). This period occurs after the start of a shift from the groups of pulsed electric currents to the base current. However, the conduction of the groups of pulsed electric currents is started when the arc length signal generated from the arc length detecting device (84) falls to or below the set electric voltage value after the time of time when the insensitive period is over. In other words, the molten globule at the tip of the wire electrode may sometimes have a momentary short circuit because of vibrations due to arcing in the molten pool formed in the base metal. These vibrations occurs immediately after the shift of the group of pulsed electric currents from the pulse group electric current period to the base electric current. However, this welding system is designed to prevent the erroneous operations which may occur at the start of the conduction of a group of pulsed electric currents. The welding system can prevent erroneous operations by providing an insensitive period. Therefore, the system prohibits erroneous instructions to start the conduction of the group of pulsed electric currents when the apparent arc length is lowered to or below zero due to an abnormal short circuiting phenomenon. Also, the welding system starts the conduction of a group of pulsed electric currents when the arc length detecting device has fallen to the signal value corresponding to the predetermined minimum arc length after the elapse of the insensitive period (which maintains the base electric current period). Thus, this welding equipment is thus capable of preventing erroneous operations that occur because of phenomena such circuit between the wire electrode and the base metal.

Next, the operations of the system in this embodiment are described with reference to the waveform chart given in FIG. 50. As shown in FIG. 50 (a), a pulsed electric current i created by superimposing a base electric current $I_B$ on a plural number of pulse groups. The pulsed electric current i is output from the electric current waveform setting circuit (11) In FIG. 50, x expresses the pulse group period, $C_B$ expresses the pulse group cycle, and $T_B$ expresses the base electric current period.

Then, the pulse group electric current and the electric current signal detected by the electric current detecting device (6) are compared by the comparator (87). The signal output by the comparator (87) is a comparison difference signal. The comparison difference signal is input into the inverter driving circuit (2) and an inverter driving signal is generated according to the pulsed arc electric current waveform i shown in FIG. 50 (a). The inverter driving signal is output from the inverter driving circuit (2) to the inverter circuit block (1), and the inverter driving signal drives the inverter.

After the inverter is driven, the welding system forms a pulsed arc discharge (53) between the wire electrode (52) and the base metal (54). The pulsed arc discharge (53) fuses the base metal (54) and the tip of the wire electrode (52).

Meanwhile, the output from the arc length detecting device (84) declines gradually along with the suspension of the molten globule at the tip of the wire electrode. This decline of the output occurs as shown in FIG. 50 (a), after the shift from the pulse group electric current period to the base electric current period. However, the vibrations of the molten globule are considerable immediately after the shift to the base electric current period, and a momentary short circuit tends to occur because of such vibrations. Therefore, abnormal decline is liable to occur in the arc length detecting device due to the vibrations of the molten globule at the tip of the wire electrode. This abnormal declines causes errors in the instruction signals that start the conduction of the group of pulsed electric currents. In order to prevent such erroneous operations, the base electric current period maintaining circuit (13), as shown in FIG. 50 (b), prohibits the operations for the conduction of the group of pulsed electric currents of the insensitive period T immediately subsequent to the start of the base electric current period of the group of pulsed electric currents. The base electric current period maintaining circuit (13) outputs at the HIGH signal after the elapse of the insensitive period T when the comparator (10) determines that the output from the arc length detecting device (84) is smaller than or equal to the value set by the electric voltage setting device (9). When the insensitive period T elapses, it is assumed that the vibrations of the molten globule have subsided. Then, the group of pulsed electric currents output from the electric current waveform setting circuit (11) begins to transmitted. Accordingly, the molten globule forms a constriction when this group of pulsed electric currents begins to output and separates because of the increased constriction. When the molten globule is thus separated for its transfer, the separation of the molten globule is achieved smoothly without the occurrence of any short circuiting with the base metal.

Therefore, according to the twentieth embodiment shown in FIG. 52, the system is designed to create a prescribed insensitive period after the start of the shift from the pulsed electric current or a group of pulsed electric currents to the base electric current. As a result, the conduction of the pulsed electric current or the group of pulsed electric currents will be started when the arc length detecting device falls to or below the set value after the elapse of the insensitive period. Consequently, this welding system is capable of preventing erroneous control operations due to phenomena such as a momentary short circuit which occurs because of vibrations in the molten globule at a time immediately after the start of the base electric current due to a shift from the group of pulsed electric currents. Therefore, the welding system can accurately separate and transfer of the molten globule at the tip of the wire electrode with certainty without the occurrence of any short circuit of the molten globule with the base metal. Thus, the system welds in a favorable manner.

Figure 53:
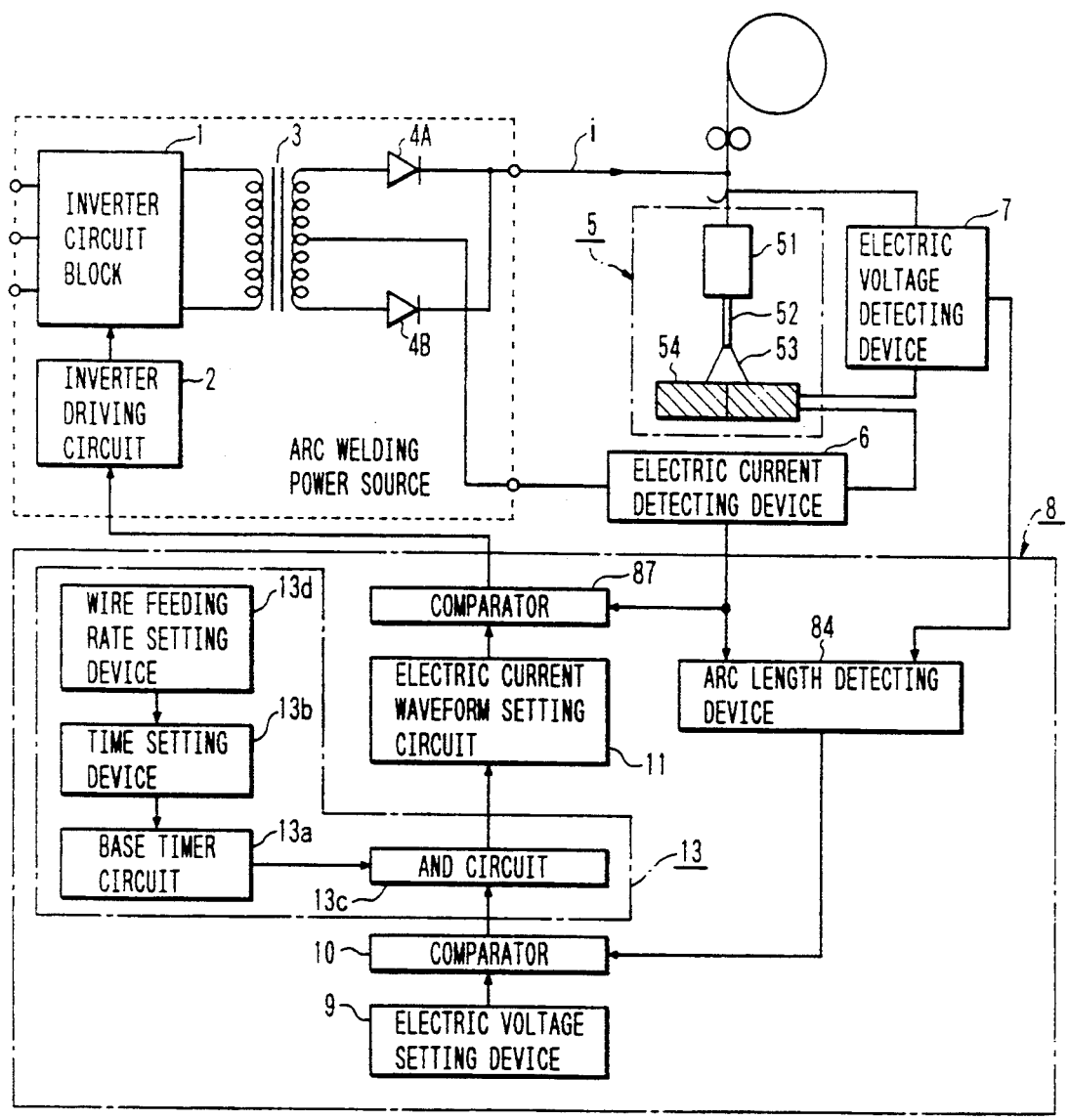
FIG. 53 is a configuration drawing illustrating the pulse welding system in one example of the twenty-first embodiment.
Figure 54A:
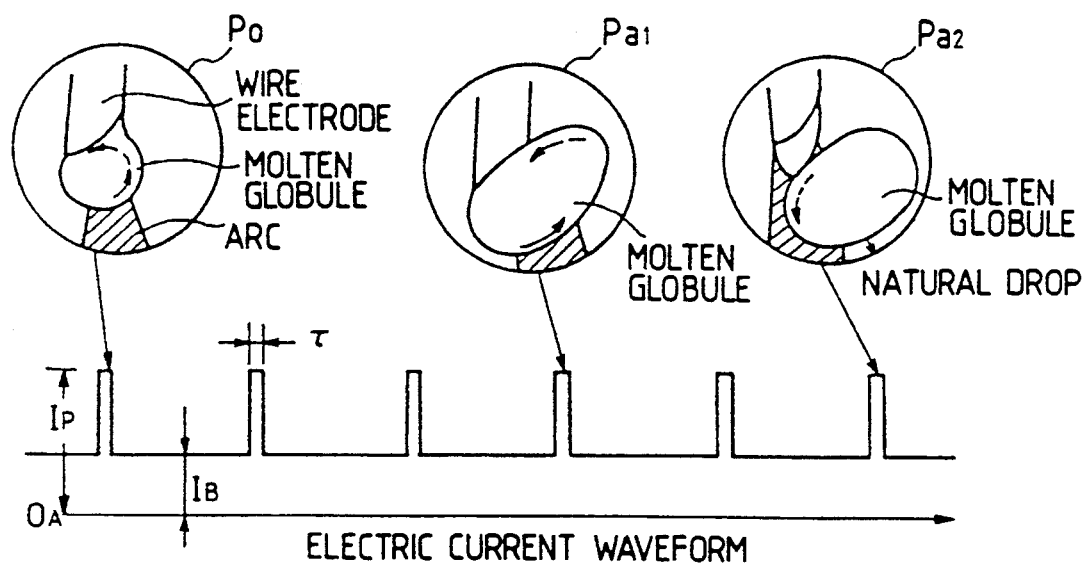
Figure 54B:
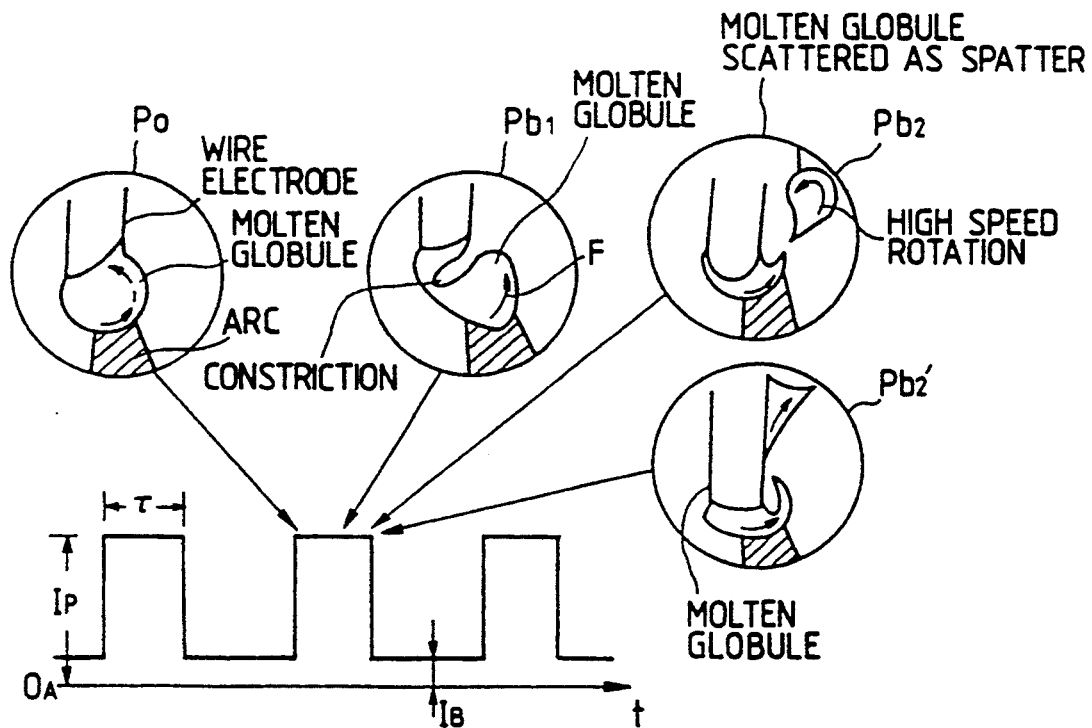
Figure 55:
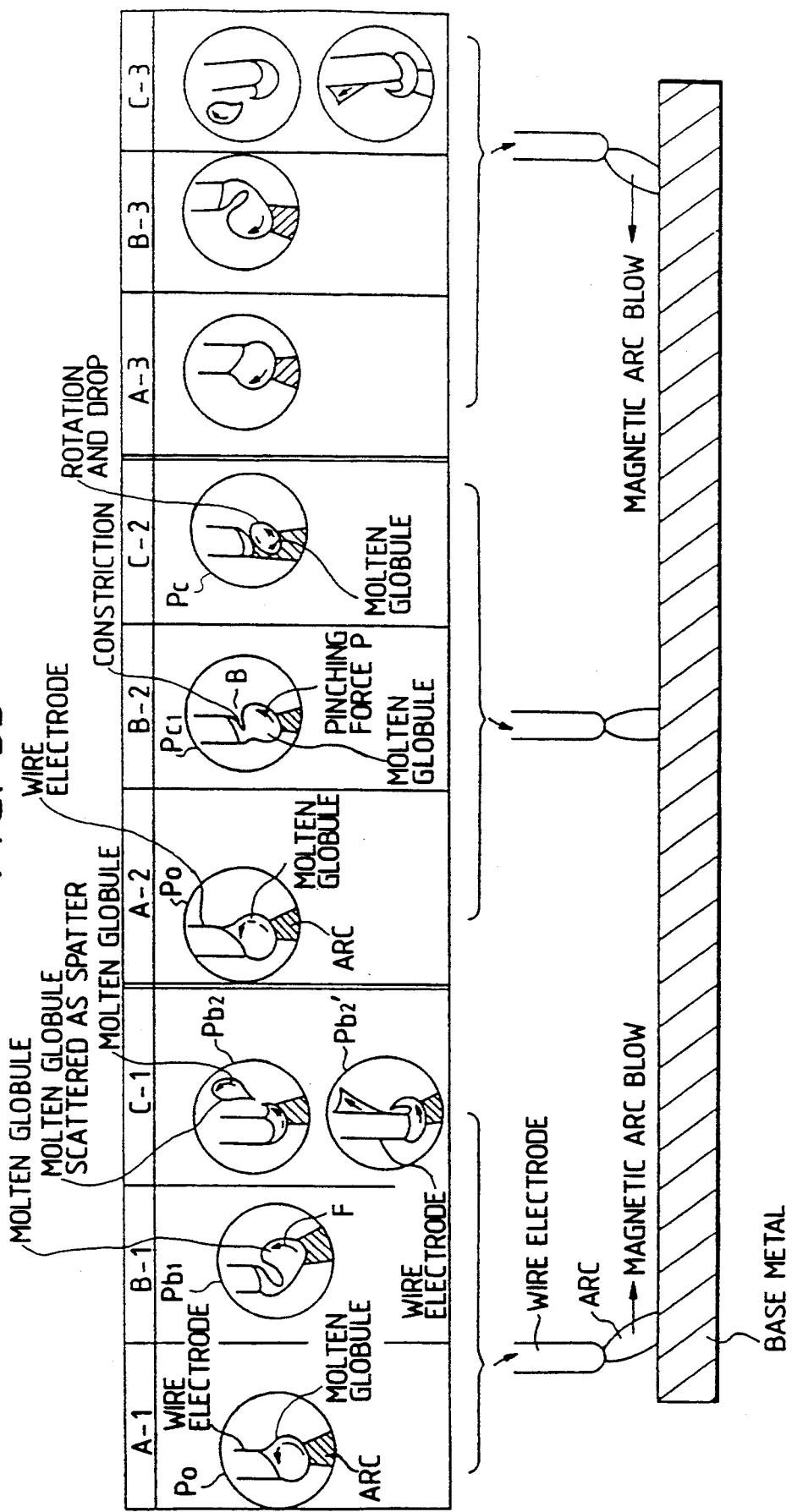

Next, FIG. 53 is a drawing illustrating the pulsed arc welding system in one example of the twenty-first embodiment. The construction of this welding equipment is different from the welding system described in the twentieth embodiment as shown in FIG. 52 because this system can convert the insensitive period T of the base electric current period maintaining circuit (13) by means of a period converting device (13). The operation of the period converting device (13b) depends on the output of a wire feeding rate setting device (13d), which sets the feeding rate for the wire electrode (52). Specifically, as shown in FIG. 50 (c), the insensitive period T is set at a value which is inversely proportional to the wire feeding rate, so that the insensitive period T will be shorter when the wire feeding rate is high and will be longer when the wire feeding rate is low.

Therefore, according to the example of the embodiment, it will be necessary to increase the amount of the wire electrode fused and separated per unit of time when the wire feeding rate increases. By changing the insensitive period T in accordance with this increase, it is possible to make the base electric current period $T_B$ itself. Consequently, it is possible the increase of the number of groups of pulsed electric currents to be applied per unit of time according to the wire feeding rate. Therefore, the system can prevent start of the conduction of the group of pulsed electric currents and maintain regularity in the growth and separation of the molten globule.

Therefore, in addition to the effects achieved by the twentieth embodiment, this twenty-first embodiment is capable of controlling the base electric current period by varying the insensitive period according to the wire feeding rate. Therefore, the welding system can control the number of pulses or groups of pulsed electric currents to be applied per unit of time in such a manner that optimum state can be attained by adjusting the wire feeding rate.

Moreover, in the individual examples of preferred embodiments of the eighteenth through twenty-first embodiment described hereinabove, it is desirable to use the base electric current period $T_B$ as the period detected by the arc length detecting device (84). The reason is as described below. The apparent arc length falls in an instant to or below zero in some cases if any abnormal short circuit has occurred in the pulsed electric current group period X. In this case the group of pulsed electric currents will be started again as from that point in time. This error causes the same phenomenon as the virtual flow of a group of pulsed electric currents with a pulse group electric current period X in an abnormally broad width. If such a phenomenon occurs, the wire electrode will eventually be burned up in an abnormal manner interrupts of the arc in some instances. Thus, the separation of the molten globule from the wire electrode becomes irregular and a lack of uniformity in the welding beads occurs. While the description given above relates to a pulsed arc welding system using a pulse group waveform, the invention may be embodied in a pulsed arc welding system which performs the welding process through its cyclical repetition of a single pulsed electric current waveform. In addition, the welding process with the welding equipment may be performed in an atmosphere gas (sealed gas) composed of a mixture of argon gas and $CO_2$ gas. The welding process thus performed will achieve the same effects as those described in the examples of preferred embodiments given above.

Furthermore, in the individual examples of of the first through twenty-first embodiments, the pulsed electric current waveform is composed of a plural number of pulsed electric currents, and the discharge electric current waveform contains this group of pulsed electric currents in cyclic repetition. This process divides a single pulse into a plural number of pulses. When this division of the pulsed electric current waveform makes the upward electromagnetic force for the pulsed arc discharge intermittent, it produces reduces the force which lifts up the molten globule formed at the tip of the wire electrode. Therefore, the molten globule formed at the tip of the wire electrode will be readily separated, before it grows into a large-sized lump. This ease of separation will occur not only in the atmosphere of a gas composed chiefly with argon, but also in the atmosphere of $CO_2$. Moreover, the examples given above show a process of obtaining a signal corresponding to the arc length by finding the detected arc length signal L (l) on the basis of the value detected of the arc electric current and the arc electric voltage. However, it is also feasible to find an arc electric voltage signal as a value corresponding to the arc length, and it is also feasible to photograph the arc loading zone (5) directly with a video camera and to find a signal corresponding to the arc length as determined on the basis of the photographed state.

We claim:

1. A pulsed arc welding system, comprising:
   a pulse group waveform setting device and a pulse width setting device wherein pulse peak values and pulse durations are respectively set in memory in advance for individual groups of pulsed electric currents having one or more pulse widths and pulse peak values;
   an arc length detecting device which detects a signal corresponding to the arc length between the tip of a wire electrode and a base metal;
   a target arc length setting device wherein target arc length signals are set in memory in correspondence with the groups of pulsed electric currents defined above;
   a pulse output control circuit which outputs a pulse starting signal for the next pulse to be generated when a value detected by the arc length detecting device defined above has attained the length specified by the target arc length signal as found through comparison of the arc length detecting device with the target arc length signal; and a pulsed electric current waveform shaping device which controls the periods of the base electric currents fed for each of the pulse intervals of individual pulses and for each of the intervals of individual groups of pulsed electric currents, by transmitting switching signals to the pulse group waveform setting device, the pulse width setting device, and the target arc length setting device defined above, thereby renewing the contents stored in their respective memories, after the output of a discharge electric current formed of pulses having a pulse peak value and a pulse width set upon the reception of the input of the values set in the pulse group waveform setting device and the pulse width setting device defined above, as well as a base electric current, and by yielding a discharge electric current which is formed of pulses having the renewed pulse peak value and the renewed pulse width, together with a base electric current, on the basis of the input of the pulse starting signal defined above.

2. A pulsed arc welding system according to claim 1, wherein the pulse output control circuit comprises:

a comparator which outputs on- and off-signals on the basis of a comparison between an arc length value detected by the arc length detecting device and a target arc length value set by the target arc length setting device; and an inverter which outputs a pulse starting signal through inversion of the on- and off-signals defined above.

3. A pulsed arc welding system according to either claim 1 or claim 2, wherein said target arc length setting device stores target arc length signals, corresponding to pulsed electric currents, in advance; and further including a differential signal output device which determines a differential output between the detected arc length signal and the target arc length signal as defined above;

the pulsed electric current waveform shaping device defined above outputting a discharge electric current which is formed of a pulse having a pulse peak value and a pulse width respectively set by the reception of an input set by the pulse group waveform setting device and the pulse width setting device and a base electric current to be fed for each pulse interval and for each cycle of a pulsed electric current group; thereafter transmitting switching signals to the pulse group waveform setting device and the pulse width setting device and the target arc length setting device defined above, thereby renewing the contents stored in their respective memories, and outputting a discharge electric current which is formed of a pulse having a renewed pulse peak value and a renewed pulse width and a base electric current, thereby performing control over the base electric current period to be fed for each interval of individual pulses and for each interval of pulsed electric current groups; and also performing control over the above-defined base electric current value in accordance with the differential output from the differential signal output device defined above.

4. A pulsed arc welding system according to either claim 1 or claim 2, further including:

a separation detecting device which detects the separation of the molten tip of the wire electrode on the basis of an arc length detecting signal generated by the arc length detecting device; and a correcting circuit which generates a new target arc length signal with the addition of a correcting signal to a target arc length signal output from the target arc length setting device defined above in the course of the period for outputting a group of pulses in the group of pulsed electric currents defined above after the separation detecting device defined above has detected the separation of a molten globule and outputs such new target arc length signal to the pulse output control circuit.

5. A pulsed arc welding system according to claim 4, wherein the correcting circuit comprises:

a flip-flop which is set on the basis of a separation detecting signal generated by the separation detecting device and reset by a separation resetting signal output by the pulsed electric current waveform shaping device at the time when the final pulse in the pulse group cycle for a group of pulsed electric currents is output;

a direct current power source;

a variable resistor;

an analog switch which is opened on the basis of the output from the flip-flop defined above; and an adder which ordinarily furnishes the pulse output control circuit with a target arc length signal generated by the target arc length setting device and, when a separation detecting signal is sent out from the separation detecting device, furnishes the pulse output control circuit with a new target arc length signal generated by the addition of a correcting signal set by the variable resistor defined above through the above-mentioned analog switch opened on the basis of the output from the flip-flop defined above to the target arc length signal generated by the target arc length setting device defined above, thus offering the new target arc length signal for application as input for comparison with an arc length detecting signal generated by the arc length detecting device.

6. A pulsed arc welding system according to claim 1 or claim 2, further comprising:

a short circuit and arc determining device which determines a short circuit period and an arc period;

the pulsed electric current waveform shaping device having a short circuiting electric current shaping device included therein and performing control over the period of the base electric current fed for each pulse interval of the individual pulses and for each pulsed electric current group interval and causing the conduction of a short circuit electric current in the short circuit period based on the short circuit determining signal defined above and also providing the output of a discharge electric current formed of pulses, said pulses having a pulse peak value and a pulse width set on the basis of an arc determining signal by reception of the inputs from the pulse group waveform setting device and the pulse width setting device defined above, and a base electric current; and thereafter transmitting switching signals to the above-mentioned pulse group waveform setting device, the pulse width setting device, and the target arc length setting device, respectively, thereby renewing the contents in their respective memories; and outputting a discharge electric current formed of pulses with the renewed pulse peak value and with the renewed pulse width and a base electric current in response to the input of the pulse starting signal defined above.

7. A pulsed arc welding system according to claim 6, further including:
a pulse group electric charge setting device comprised of:
an integrating device which integrates the group of pulsed electric currents output from the pulsed electric current waveform shaping device; an electric charge amount setting device wherein a prescribed electric charge amount is set; and a comparator which compares the value integrated by the integrating device defined above with the amount of electric charge set by the electric charge amount setting device defined above and which outputs a resetting signal to the integrating device defined above when the integrated value attains the set electric charge amount; and
a pulse group period setting device which is comprised of a flip-flop which outputs a pulse group period signal to the pulsed electric current waveform shaping device defined above, said flip-flop being set at the time when a group of pulsed electric currents is output, and halting the output of the pulse group period signal defined above when reset by the resetting signal defined above.

8. A pulsed arc welding system according to claim 6 or claim 7, wherein:
the short circuit and arc determining device defined above is comprised of:
a short circuit detecting device which outputs a short circuit detecting signal when the arc length detecting signal is equal to or below a prescribed value;
a separation detecting device which detects a separation; and
a flip-flop which outputs a short circuit determining signal when set by a short circuit detecting signal generated by the short circuit detecting device defined above, and being reset by a separation detecting signal generated by the separation detecting device defined above.

9. A pulsed arc welding system according to any of claim 6 and 7, further comprising:
a differential signal output device which determines a differential output between an output of said arc length detecting device and a target arc length signal;
the pulsed electric current waveform shaping device performing control over the period of the base electric current fed for each pulse interval of the individual pulses and for each interval of the groups of pulsed electric currents and also performing control over the value of the base electric current defined above in accordance with the differential output from the differential signal output device defined above, by conducting a short circuiting electric current in the short circuit period on the basis of the short circuit determining signal defined above; outputting a discharge electric current formed of pulses, which have a pulse peak value and a pulse width set in response to inputs from the pulse group waveform setting device and the pulse width setting device defined above, on the basis of the arc length determining signal, and the base electric current which is to be supplied at each pulse interval and in each cycle of the group of pulsed electric currents, and thereafter transmitting switching signals respectively to the pulse group waveform setting device, the pulse width setting device, and the pulse interval setting device defined above, thereby renewing the contents in their respective memories, and outputting a discharge electric current formed of pulses, which have the renewed pulse peak value and the renewed pulse width, and a base electric current, in response to the input of the pulse starting signal defined above.

10. A pulsed arc welding system, comprising:
a pulse group waveform setting device and a pulse width setting device wherein individual pulse peak values and pulse widths are respectively set in memory in advance for groups of pulsed electric currents having one or more pulse widths and pulse peak values;
a pulse interval setting device wherein pulse intervals are set in memory in advance;
an arc length detecting device which detects a signal corresponding to the arc length between the tip of a wire electrode and a base metal;
a target arc length setting device wherein target arc length signals are set in memory in advance in correspondence with the groups of pulsed electric currents defined above;
a differential signal output device which determines the differential output between the detected arc length signal and the target arc length signal defined above; and
a pulsed electric current waveform shaping device which transmits switching signals to the pulse group waveform setting device, the pulse width setting device, the pulse interval setting device, and the target arc length setting device defined above, thereby renewing the contents stored in their respective memories, after the output of a discharge electric current which is formed of pulses having a pulse peak value and a pulse width set upon the reception of the input of the values set in the pulse group waveform setting device, the pulse width setting device, and the pulse interval setting device defined above, as well as a base electric current which is fed for each of the individual pulse intervals and for each of the periods of the individual groups of pulsed electric currents, then yields a discharge electric current which is formed of a pulse having a renewed pulse peak value and a renewed pulse width, and additionally controls the base electric current in the prescribed pulse intervals, in accordance with the output of the differential output from the differential signal output device defined above, after the pulses are output.

11. A pulsed arc welder which performs a welding process by generating a pulsed arc electric current between a wire electrode and a base material, the welder comprising:
a pulse group waveform setting device and a pulse interval setting device wherein individual pulse peak values and pulse intervals are respectively set in memory for groups of pulsed electric currents having one or more pulse widths and pulse peak values;

an arc length detecting device which detects the arc length of the pulsed arc electric current appearing between the tip of the wire electrode and the base material;

a target arc length setting device wherein a plurality of target arc length signals are set in memory to respectively correspond to the groups of pulsed electric currents set in said pulse group waveform setting device;

a pulse width control circuit which outputs a pulse terminating signal when the arc length detecting device detects an arc length that is substantially the same as that represented by one of said set target arc length signals; and a pulsed electric current waveform shaping device which outputs and controls the pulse width of each pulse of an output group of pulsed electric currents by feeding switching signals to the pulse group waveform setting device, the pulse interval setting device, and the target arc length setting device, so as to control the pulsed arc electric current between the wire electrode and the base material to have an arc length substantially the same as said one target arc length signal.

12. A pulsed arc welder according to claim 11, further comprising:

a pulse group electric charge amount setting device comprising an integrating device performing an integration of the pulsed electric current groups output from the pulsed electric current waveform shaping device; an electric charge amount setting device wherein the prescribed amount of electric charge is set; and a comparator which compares the integrated value found by the integrating device defined above and the amount of electric charge set by the electric charge amount setting device defined above and sends out a resetting signal to the integrating device defined above when the integrated value has attained the set electric charge amount;

and a pulse group period setting device comprised of a flip-flop which, being set when a pulsed electric current group is sent out, sends out a pulse group period signal to the pulsed electric current waveform shaping device defined above, and, being reset by the above-defined resetting signal from the pulse group electric charge setting device defined above, stops the sending of the pulse group period signal defined above.

13. A pulsed arc welder according to claim 12 further comprising:

a pulse group cycle setting device which sends out a renewal signal for each pulse group cycle of the group of pulsed electric currents.

14. A pulsed arc welder according to claim 13, further comprising:

a short circuit and arc determining device which finds a short circuit period and an arc period, and a short circuiting electric current waveform shaping device which outputs a short circuiting electric current on the basis of a short circuit determining signal;

said pulsed electric current waveform shaping device outputting a discharge electric current formed of a pulse having a pulse peak value and a base electric current conducted in the period of the set pulse interval set upon reception of an input respectively from the pulse group waveform setting device and the pulse interval setting device defined above on the basis of the arc determining signal, until a pulse terminating signal is issued, and thereafter performing control over the pulse width of each pulse by providing the pulse group waveform setting device and the pulse interval setting device defined above and the target arc length setting device with switching signals, renewing the contents of their respective memories, and by outputting and stopping the output of pulses having the renewed pulse peak value on the basis of the input of the pulse terminating signal defined above.

15. A pulsed arc welder according to claim 14 wherein the short circuit and arc determining device defined above is comprised of:

a short circuit detecting device which sends out a short circuit detecting signal when the output of the arc length detecting device is either equal to or less than the prescribed value;

a separation detecting device which detects a separation; and a flip-flop which is set on the basis of a short circuit detecting signal from the short circuit detecting device defined above and reset on the basis of a separation detecting signal from the separation detecting device defined above.

16. A pulsed arc welder according to claim 15, characterized in that the short circuiting electric current waveform shaping device is comprised of:

a timer which sends out its output after a prescribed timer duration on the basis of the input of a short circuit determining signal;

an inverter which inverts the short circuit determining signal and resets the above-defined timer with the inverted signal;

an integrating device which performs integrating operations on the basis of the output from the timer defined above;

a Zener diode which regulates the output from the integrating device to keep this output at a constant voltage;

an inverter which obtains an inverted signal of the output from the integrating device; and a transistor controlled on the basis of the output from the inverter, and performing control over the sending out of the output from the integrating device.

17. A pulsed arc welder according to claim 16, further comprising:

a pulse peak value control circuit, which receives the differential output between a detected arc length signal and a target arc length signal and outputs said differential output as a pulse peak value correcting signal;

the pulsed electric current waveform shaping device performing control over the pulse peak value and pulse width of each pulse by:

outputting a discharge electric current formed of pulses, which have the set pulse peak value as corrected in accordance with the differential output defined above, and a base electric current, which is to be conducted in the period of the set pulse interval, until the pulse terminating signal defined above is issued, in the pulse width set by the inputs from the pulse group waveform setting device and the pulse interval setting device defined above and the input of the pulse terminating signal and the correcting signal defined above, on the basis of an arc determining signal;

thereafter transmitting switching signals respectively to the pulse group waveform setting device, the pulse width setting device, and the pulse interval setting device, and the target arc length setting device defined above, thereby renewing the contents in their respective memories; and correcting the renewed pulse peak value in accordance with the differential output defined above and also outputting and halting the output of the pulses having the renewed peak value on the basis of the input of the pulse terminating signal defined above.

18. A pulsed arc welding system according to any of claim 11 through claim 13, further including:

a pulse peak value control circuit, which receives the differential output between an output of the arc length detecting device and a target arc length signal and outputs said differential output as a pulse peak value correcting signal;

the pulsed electric current waveform shaping device performing control over the pulse peak value and pulse width of each pulse by:

outputting a discharge electric current formed of pulses, which have the set pulse peak value corrected in accordance with the differential output defined above, and a base electric current, which is to be conducted in the period of the set pulse interval, until the pulse terminating signal defined above is issued, in the pulse width set by the inputs from the pulse group waveform setting device and the pulse interval setting device defined above and the input of the pulse terminating signal and the corrected signal defined above;

thereafter transmitting switching signals respectively to the pulse group waveform setting device, the pulse width setting device, and the pulse interval setting device, and the target arc length setting device defined above, thereby renewing the contents in their respective memories; and correcting the renewed pulse peak value in accordance with the differential output defined above and also outputting and halting the output of pulses having the renewed peak value on the basis of the input of the pulse terminating signal defined above.

19. A pulsed arc welder according to claim 11, wherein said pulse group waveform setting device comprises a memory for storing said individual pulse peak values and pulse intervals, wherein each of said individual pulse peak values and pulse intervals corresponds to a single target arc length signal set in said target arc length setting device, and wherein each of the pulses of said output group of pulse electric currents has a respective pulse peak value and pulse interval associated with said individual pulse peak values and pulse intervals stored in said memory.

20. A pulsed arc welding system, comprising:

a pulse group waveform setting device, a pulse width setting device, and a pulse interval setting device wherein individual pulse peak values and pulse widths and pulse intervals are set in memory in advance for a group of pulsed electric currents having one or more pulse widths and pulse peak values;

an arc length detecting device which detects a signal in correspondence with the arc length between the tip of a wire electrode and a base metal;

a target arc length setting device wherein target arc length signals are set in memory in advance in correspondence with the group of pulsed electric currents defined above;

a pulse peak value control circuit which receives a differential output between an arc length detecting device output and a target arc length signal; and a pulsed electric current waveform shaping device which controls the pulse peak value of each pulse by transmitting switching signals respectively to the pulse group waveform setting device, and pulse width setting device, the pulse interval setting device, and the target arc length setting device defined above, thereby renewing the contents in the respective memories thereof, and then correcting the renewed peak values in accordance with the differential output defined above, after the output of a discharge electric current formed of a pulse, said pulse having a set pulse peak value as corrected in accordance with the differential output defined above, and a base electric current, which is to be conducted in the period of the set pulse interval, in the pulse width set by the reception of the inputs from the pulse group waveform setting device, the pulse interval setting device, and the pulse interval setting device defined above, as well as the correcting signal defined above.

21. A pulsed arc welding system according to claim 20, further comprising:

a pulse group electric charge amount setting device comprised of an integrating device which integrates the group of pulsed electric currents output from the pulsed electric current waveform shaping device; an electric charge amount setting device wherein a prescribed amount of electric charge is set in memory; and a comparator which compares the value integrated by the integrating device defined above with the amount of electric charge set by the electric charge amount setting device and outputting a resetting signal to the integrating device defined above when the integrated value attains the set amount of electric charge; and a pulse group period setting device comprised of a flip-flop set at the time when a group of pulsed electric currents is sent out to output a pulse group period signal to the pulsed electric current shaping device defined above, and reset on the basis of the above-defined resetting signal of the pulse group electric charge amount setting device defined above to stop outputting the pulse group period signal defined above.

22. A pulsed arc welding system according to claim 20 or claim 21, further comprising:

a pulse group cycle setting device which sends out a renewal signal in each pulse group cycle of a group of pulsed electric currents.

23. A pulsed arc welding system according to claim 20 or claim 21 further comprising:

short circuit and arc determining means which determines a short circuit period and an arc period; and a short circuiting electric current waveform shaping device which outputs a short circuiting electric current on the basis of a short circuit determining signal;

said pulsed electric current waveform shaping device controlling the pulse peak value of each pulse by:

outputting a discharge electric current formed of a pulse which has a set pulse peak value corrected in accordance with the differential output defined above and a base electric current which is to be conducted in the period of the set pulse interval in the duration of a pulse width set by inputs from the pulse group waveform setting device, on the basis of the arc determining signal, and the corrected signal defined above;

thereafter transmitting switching signals respectively to the pulse group waveform setting device, the pulse width setting device, the pulse interval setting device, and the target arc length setting device defined above, thereby renewing the contents of their memories;

and then correcting the renewed pulse peak value in accordance with the differential output defined above.

24. A pulsed arc welding system according to claim 23, wherein the short circuit and arc determining device defined above is comprised of:
   a short circuit detecting device which sends out a short circuit detecting signal when the detected arc length is equal to or less than the prescribed value;
   a separation detecting device which detects a separation; and
   a flip-flop which sends out a short circuit detecting signal when set on the basis of a short circuit detecting signal from the short circuit detecting device defined above, and being reset on the basis of a separation detecting signal from the separation detecting device defined above.

25. A pulsed arc welding system according to claim 23, wherein the short circuiting electric current shaping device defined above is comprised of:
   a timer which generates an output after a prescribed timer period on the basis of the input of a short circuit determining signal; a first inverter which inverts the short circuit determining signal and resets the timer defined above with the inverted signal;
   an integrating device which performs integrating operations on the basis of the output from the timer defined above;
   a Zener diode which regulates the output from the integrating device to a constant electric voltage;
   a second inverter which inverts the timer output defined above; and
   a transistor which controls transmission of the output from the integrating device on the basis of the output from the second inverter.

26. A pulsed arc welding system comprising:
   a pulse group waveform setting device and a pulse width setting device which store the individual pulse peak values and the individual pulse widths set in memory therein in advance for groups of pulsed electric currents having one or more pulse widths and pulse peak values;
   a pulse interval setting device wherein the individual pulse intervals are set in memory in advance;
   an arc length detecting device which detects a signal in correspondence with the arc length between the tip of the wire electrode and the base metal;
   a target arc length setting device which has target arc length signals set therein in memory in advance in correspondence with the groups of pulsed electric currents defined above;
   a differential signal output device which determines a differential output between an output of the arc length detecting device and the target arc length signal defined above;
   a short circuit and arc determining device which determines a short circuit period and an arc period; and
   a pulsed electric current waveform shaping device incorporating a short circuiting electric current waveform shaping device and which outputs a discharge electric current formed of pulses, which have a pulse peak value and a pulse width as set by the inputs from the pulse group waveform setting device, the pulse width setting device, and the pulse interval setting device defined above on the basis of the arc determining signal, and the base electric current, which is to be supplied at each pulse interval and in each cycle of the group of pulsed electric currents; and which thereafter outputs a short circuiting electric current on the basis of the short circuit determining signal, and transmits switching signals respectively to the pulse group waveform setting device, the pulse width setting device, and the pulse interval setting device, and the target arc length setting device defined above, thereby renewing the contents in their respective memories; and outputs pulses having the renewed pulse peak value and the renewed pulse width and also controls the value of the base electric current at the prescribed pulse intervals, after the pulse is sent out, in accordance with the differential output from the differential signal output device defined above.

27. A pulsed arc welding system according to claim 26, further comprising:
   a pulse group electric charge amount setting device comprised of:
   an integrating device which integrates the group of pulsed electric currents output from the pulsed electric current waveform shaping device;
   an electric charge amount setting device wherein a prescribed amount of electric charge is set; and
   a pulse group electric charge amount setting device which compares the value integrated by the integrating device defined above and the amount of electric charge set by the electric charge amount setting device and outputs a resetting signal when the integrated value attains the set amount of electric charge; and
   a pulse group period setting device which is comprised of:
   a flip-flop which outputs a pulse group period signal to the pulsed electric current waveform shaping device defined above, said flip-flop being set when a group of pulsed electric currents is sent out, and which halts output of the pulse group period signal defined above when reset by the above-defined resetting signal generated by the pulse group electric charge amount setting device defined above.

28. A pulsed arc welding system according to claim 26 or 27, wherein:
   the short circuit and arc determining device defined above is comprised of:
   a short circuit device which outputs a short circuit detecting signal when the arc length detecting signal is equal to or below a prescribed value;
   a separation detecting device which detects a separation; and
   a flip-flop which outputs a short circuit determining signal when set by a short circuit detecting signal output from the short circuit detecting device defined above and which is reset by a separation detecting signal output from the separation detecting device defined above.

29. A pulsed arc welding system, comprising:
a pulse group generating device storing individual pulse peak values for groups of pulsed electric currents having one or more pulse widths and pulse peak values set therein in memory in advance, for generating pulses in response to the input of a pulse starting signal, halting generation of pulses in response to the input of a pulse terminating signal, and renewing the stored contents of the pulse peak values after the pulses are output;
an arc length detecting device which detects a signal corresponding to the length of an arc between the tip of a wire electrode and a base metal;
a target arc length setting device which stores upper limit and lower limit target arc length signals in memory in advance in correspondence with the groups of pulsed electric currents defined above and which renews the contents in memory in response to the pulse terminating signal defined above; and
a pulse output control circuit which compares the detected arc length with the upper limit and lower limit target arc length signals defined above and outputs a pulse starting signal when the detected arc length falls to or below the level of the lower limit target arc length signal, and which outputs a pulse terminating signal when the detected arc length attains the upper limit target arc length signal value.

30. A pulsed arc welding system according to any of claims 1, 10, 11, 20, 26 and 29, wherein:
the pulse group waveform setting device is provided with peak values for the individual pulses stored therein in such a manner as to serve the purpose of forming the group of pulsed electric currents in a conical shape.

31. A pulsed arc welding system according to claim 29, wherein the pulse group generating device defined above is comprised of:
a pulse group waveform setting device which stores pulse peak values set therein in memory in advance;
a flip-flop which is set by a pulse starting signal and reset by a pulse terminating signal; and
a pulsed electric current waveform shaping device which outputs pulses at the peak value set by the pulse group waveform setting device in response to the output from the flip-flop defined above.

32. A pulsed arc welding system according to either of claim 29 or claim 31 wherein the target arc length setting device defined above is comprised of:
a lower limit target arc length setting device and an upper limit target arc length setting device which are respectively provided with a lower limit target arc length and an upper limit target arc length set therein for the purpose of controlling the pulse width and the pulse interval for each output pulse.

33. A pulsed arc welding system according to claim 29, wherein the pulse output control circuit defined above is comprised of:
a comparator which outputs a pulse starting signal on the basis of a comparison between a detected arc length value and the lower limit target arc length; and
a comparator which outputs a pulse terminating signal on the basis of comparison between a detected arc length value and the upper limit target arc length.

34. A pulsed arc welding system according to claim 29, further comprising:
a pulse group electric charge amount setting device which is comprised of:
an integrating device which integrates the group of pulsed electric currents output from the pulsed electric current waveform shaping device;
an electric charge amount setting device wherein a prescribed amount of electric charge is set; and
a comparator which compares the value integrated by the integrating device defined above with the amount of electric charge set by the electric charge amount setting device defined above and outputs a resetting signal to the integrating device defined above when the integrated value has attained the set amount of electric charge; and
a pulse group period setting device which is comprised of:
a flip-flop set when a group of pulsed electric currents is sent out to output a pulse group period signal to the pulsed electric current waveform shaping device defined above, and reset by the above-defined resetting signal from the pulse group electric charge amount setting device to halt the output of the pulse group period signal defined above.

35. A pulsed arc welding system according to claim 29, further comprising:
a flip-flop which is set at the time when the sending out of the pulse group is completed and which is reset by a pulse starting signal;
an inverter which inverts the output of said flip-flop; and
a pulse group cycle setting device comprised of a differentiating circuit which differentiates the output from said inverter and thereby produces a control signal for the terminating signal for the pulse group.

36. A pulsed arc welding system according to claim 29, further comprising:
a short circuit and arc determining device which determines a short circuit period and an arc period; and
a short circuiting electric current waveform setting device which outputs a short circuiting electric current in response to a short circuit determining signal;
the pulsed arc welding system performing control for the start of conduction of a pulsed arc electric current from the pulse group generating device when an arc determining signal is received from the short circuit and arc determining device defined above.

37. A pulsed arc welding system according to claim 29, further comprising:
a pulse peak value control circuit which obtains a differential output value between an output of the arc length detecting device and the upper limit target arc length signal and outputs the value as a pulse peak value correcting signal to the pulse group generating device.

38. A welding apparatus comprising:
an electric current waveform setting circuit which sets a prescribed waveform of a pulsed arc electric current applied between a wire electrode and a base material;

an arc length detecting device which receives as inputs a value of said electric current and a value of an arc voltage, and calculates the actual length of an arc formed between the wire electrode and base material on the basis of said current and voltage values; and a comparator ,which compares the output from this arc length detecting device with the set prescribed waveform in the electric current waveform setting device and sends out its output when the detected arc length falls to a level equal to or below the prescribed waveform, and thereby controls the start of the conduction of a pulsed arc electric current output from said electric current waveform setting circuit so as to control the arc length of the arc formed between the wire electrode and the base material to be substantially the same as the prescribed waveform.

39. A pulsed arc welding system according to claim 38, further comprising:

a timer circuit which controls the start of the conduction of a pulsed electric current or a group of pulsed electric currents output from the electric current waveform setting circuit defined above by generating an output after the elapse of a prescribed duration of time, said timer circuit performing the counting operation in response to the output from the comparator.

40. A pulsed arc welding system according to claim 38, further comprising:

a base electric current period maintaining circuit which maintains a base electric current period by prohibiting the transmission of the output from the comparator defined above to the electric current waveform setting circuit during a prescribed period after a changeover of a pulsed electric current or a group of pulsed electric currents to the base electric current period.

41. A pulsed arc welding system according to claim 40, wherein the base electric current period maintaining circuit is comprised of:

a period setting device which sets said prescribed period within the base electric current period;

a base timer circuit which outputs an operating signal after the elapse of said prescribed period, counting the duration of time from the start of tile base electric current period; and an AND circuit which obtains the logical product of the output from the comparator and the output from the base timer circuit.

42. A pulsed arc welding system according to claim 38, further comprising:

a base electric current period maintaining circuit which maintains a base electric current period by prohibiting the transmission of the output from the comparator defined above to the electric current waveform setting circuit during a prescribed period set in accordance with a wire transmission rate, after a changeover of a pulsed electric current or a group of pulsed electric currents to the base electric current period.

43. A pulsed arc welding system according to claim 42, wherein the base electric current period maintaining circuit is comprised of:

a wire transmission rate setting device which sets the wire transmission rate for the wire electrode;

a time duration converting device which converts the set wire transmission rate to a duration of time corresponding to said wire transmission rate;

a base timer circuit which counts the duration of time and outputs an operating signal after the elapse of the duration of time defined above; and an AND circuit which obtains a logical product of the output from the comparator and the output from the base timer circuit.

44. A pulsed arc welding system including an arc length detecting device comprised of:

a positive characteristic constant converter which determines a positive characteristic constant of an electric voltage of an arc by inputting the electric current flowing in a weld zone via an electric current detecting device and multiplying the value of the arc electric voltage with a prescribed positive characteristic constant;

a direct current electric offset electric voltage constant setting device which sets a prescribed offset electric voltage constant;

an adder which sums the individual outputs from the positive characteristic constant converter and the direct current electric voltage constant setting device; and a comparator receiving outputs from said adder and said electric voltage detecting device, for outputting a compared output in accordance with the length of an arc by comparing the added output from said adder and the electric voltage detected by the electric voltage detecting device which detects the electric voltage between the electrodes in the weld zone.

* * * * *